United States Patent
Agee

Patent Number: 6,128,276
Date of Patent: *Oct. 3, 2000

[54] STACKED-CARRIER DISCRETE MULTIPLE TONE COMMUNICATION TECHNOLOGY AND COMBINATIONS WITH CODE NULLING, INTERFERENCE CANCELLATION, RETRODIRECTIVE COMMUNICATION AND ADAPTIVE ANTENNA ARRAYS

[75] Inventor: Brian G. Agee, San Jose, Calif.

[73] Assignee: Radix Wireless, Inc., Mountainview, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/804,904

[22] Filed: Feb. 24, 1997

[51] Int. Cl.[7] .................................................. H04Q 7/00
[52] U.S. Cl. ........................... 370/208; 370/335; 375/347
[58] Field of Search ..................................... 370/206, 208, 370/210, 320, 335, 342, 441; 375/200, 206, 346, 347, 348, 260, 267

[56] References Cited

U.S. PATENT DOCUMENTS

| 4,383,332 | 5/1983 | Glance et al. . |
| 5,255,210 | 10/1993 | Gardner et al. . |
| 5,260,968 | 11/1993 | Gardner et al. .......................... 375/200 |

(List continued on next page.)

FOREIGN PATENT DOCUMENTS

| 0582537A2 | 2/1994 | European Pat. Off. ......... H04L 29/06 |
| 0696856A2 | 2/1996 | European Pat. Off. ........... H04B 1/69 |
| 0668664B1 | 10/1999 | European Pat. Off. ......... H04B 7/005 |
| WO94/05094 | 3/1994 | WIPO ............................... H04B 7/24 |
| WO96/22662 | 7/1996 | WIPO ............................... H04Q 7/20 |
| WO96/31009 | 10/1996 | WIPO ............................ H04B 1/034 |
| WO96/39001 | 12/1996 | WIPO ............................... H04Q 7/38 |
| WO97/05709 | 2/1997 | WIPO ............................. H04B 1/707 |
| WO98/37638 | 8/1998 | WIPO ............................... H04B 1/00 |

OTHER PUBLICATIONS

Kondo, et al., "Multicarrier CDMA System . . . ", IEEE Mar. 1994 #0–7803–1927, pp. 1640–1644.

Chouly, et al., "Orthogonal multicarrier . . . ", IEEE 1993, #0–7803–0917, pp. 1723–1728.

Sourour, et al., "Two Stage Co–channel . . . ", IEEE, PIMRC '94, pp. 189–193.

Boulle, et al., "An Overview of Trellis . . . ", IEEE PIMRC '94, pp. 105–109.

Tangemann, "Influence of the User Mobility . . . ", IEEE, PIMRC '94, pp. 745–749.

Tsoulos, et al., "Application of Adaptive . . . ", IEEE Mar. 1994, #1–7803–1927, pp. 615–619.

(List continued on next page.)

*Primary Examiner*—Chi H. Pham
*Assistant Examiner*—Frank Duong
*Attorney, Agent, or Firm*—Pillsbury Madison & Sutro, LLP

[57] ABSTRACT

A "stacked-carrier" spread spectrum communication system based on frequency domain spreading that multiplies a time-domain representation of a baseband signal by a set of superimposed, or stacked, complex sinusoid carrier waves. In a preferred embodiment, the spreading energizes the bins of a large fast Fourier transform (FFT). This provides a considerable savings in computational complexity for moderate output FFT sizes. Point-to-multipoint and multipoint-to-multipoint (nodeless) network topologies are possible. A code-nulling method is included for interference cancellation and enhanced signal separation by exploiting the spectral diversity of the various sources. The basic system may be extended to include multi-element antenna array nulling methods also for interference cancellation and enhanced signal separation using spatial separation. Such methods permit directive and retrodirective transmission systems that adapt or can be adapted to the radio environment. Such systems are compatible with bandwidth-on-demand and higher-order modulation formats and use advanced (maximum-SINR) despreader adaptation algorithms.

84 Claims, 31 Drawing Sheets

U.S. PATENT DOCUMENTS

| | | | |
|---|---|---|---|
| 5,299,148 | 3/1994 | Gardner et al. | |
| 5,504,775 | 4/1996 | Chouly et al. | 375/205 |
| 5,548,582 | 8/1996 | Brajal et al. | 370/206 |
| 5,584,057 | 12/1996 | Dent. | |
| 5,592,471 | 1/1997 | Briskman. | |
| 5,612,978 | 3/1997 | Blanchard et al. | 375/350 |
| 5,663,990 | 9/1997 | Bolgiano et al. | 375/200 |
| 5,706,275 | 1/1998 | Zhengdi | 370/210 |
| 5,742,583 | 4/1998 | Scott | 375/200 |
| 5,757,766 | 5/1998 | Sugita | 375/261 |
| 5,771,224 | 6/1998 | Seki et al. | 370/206 |
| 5,781,845 | 7/1998 | Dybdal et al. | 375/343 |
| 5,799,000 | 8/1998 | Hoole | 370/210 |
| 5,864,543 | 1/1999 | Hoole | 370/280 |
| 5,872,814 | 2/1999 | McMeekin | 375/296 |
| 5,889,814 | 3/1999 | Simmons | 375/200 |
| 5,896,425 | 4/1999 | Hirano et al. | 375/354 |
| 5,907,577 | 5/1999 | Hoole | 375/200 |
| 5,909,641 | 6/1999 | Simmons | 455/78 |
| 5,914,981 | 6/1999 | Veintimilla | 375/200 |
| 5,923,700 | 7/1999 | Zhang | 375/200 |
| 5,933,421 | 8/1999 | Alamouti et al. | 370/330 |

OTHER PUBLICATIONS

Chandler, et al., "An ATM–CDMA Air Interface . . . " IEEE PIMRC '94, pp. 110–113.

Bar–Ness, et al., "Synchronous Multi–User . . . ", IEEE PIMRC '94, pp. 184–188.

Liu, et al., "Experimental Studies of Space . . . ", 1994 IEEE #0–7803–1825, pp. 800–804.

van de Wiel, "Adaptive Equalization Structures . . . ", IEEE PIMRC '94, pp.253–255.

Naguib, et al., "Performance of CDMA Cellular . . . ", 1994 IEEE #0–7803–1825, pp. 795–799.

Weis, "A Novel Algorithm for Flexible Beam Forming . . . ", IEEE PIMRC '94, pp. 729a–729e.

Talwar, et al., "Reception of Multiple Co–Channel . . . ", 1994 IEEE #0–7803–1825, pp. 790–794.

Forssen, et al., "Adaptive Antenna Arrays for GSM900/DCS1800", Mar. 1994 IEEE, pp. 605–609.

Kaiser, "On the Performance of Different Detection Techniques . . . ", 1995 unpublished report.

Yee, et al., "BER of Multi–Carrier CDMA in an Indoor . . . ", IEEE Mar. 1993 #1058–6393, pp. 426–430.

Yee, et al., "Controlled Equalization of Multi–Carrier . . . ", Mar. 1994 IEEE 0–7803–1927, pp. 1665–1669.

Cacopardi, et al., "Channel Equalization of Indoor . . . ", 1994 unpublished report.

Agee, "The Property–Restoral Approach to Blind Adaptive Signal . . . ", 1989 dissertation.

Yee, et al., "Multi–Carrier CDMA in Indoor Wireless . . . ", IEICE Jul. 1994 vol. E77–B, pp. 900–904.

Reiners et al., "Multicarrier Transmission Technique . . . ", Mar. 1994 IEEE 0–7803–1927, pp. 1645–1649.

DaSilva, et al., "Multicarrier Orthogonal CDMA Signals . . . ", Jun. 1994 IEEE #0733–8716, pp. 842–852.

Rappaport, et al., "Wireless Personal Communications . . . ", 1994 report.

Kaleh, "Frequency–Diversity Spread–Spectrum Communication . . . ", Sep. 1994 unpublished report.

Burr, et al., "Capacity of an Adaptive TDMA Cellular . . . ", IEEE PIMRC '94, pp. 242–246.

Fettweis, et al., "On Multi–Carrier Code Division . . . ", Mar. 1994 IEEE #0–7803–1927, pp. 1670–1674.

P. Jung, et al., "On Multicarrier CDMA Mobile Radio Systems with Joint Detection and Coherent Receiver Antenna Diversity", $5^{th}$ IEEE International Conference on Universal Personal Communications, vol. 1, Sep. 1996, pp. 61–65.

PCT Search Report from WO98/37638.

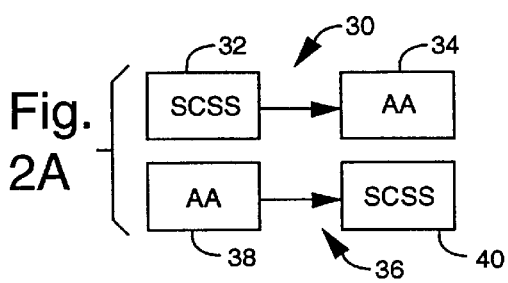
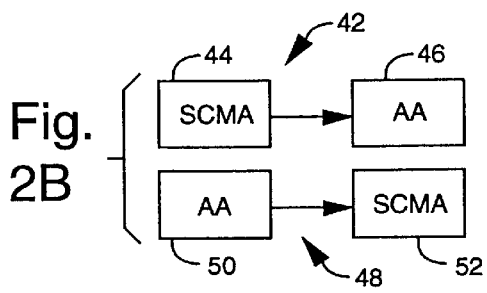
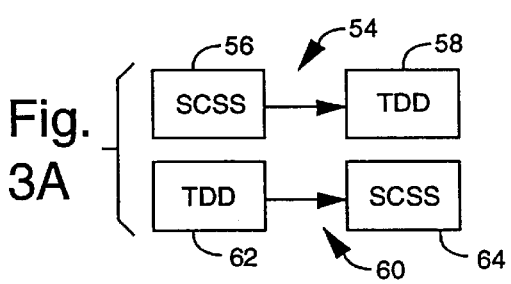
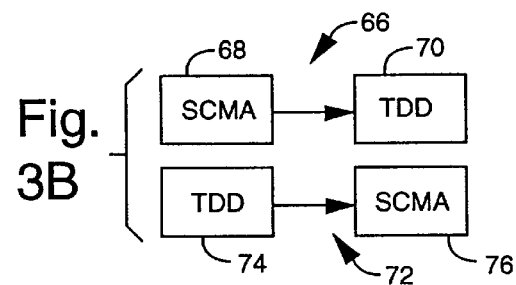
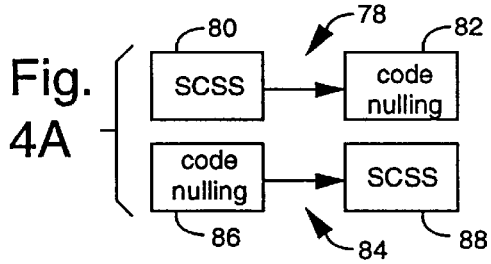
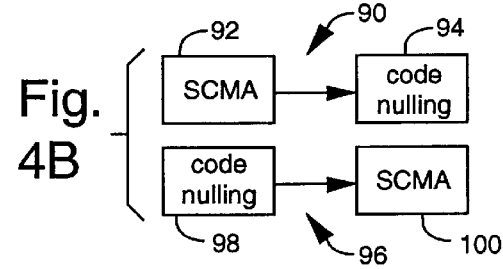
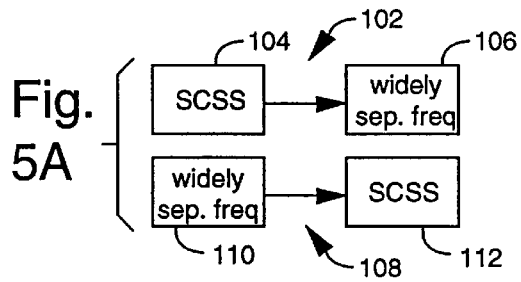
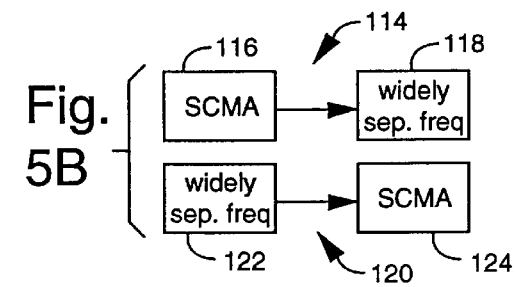
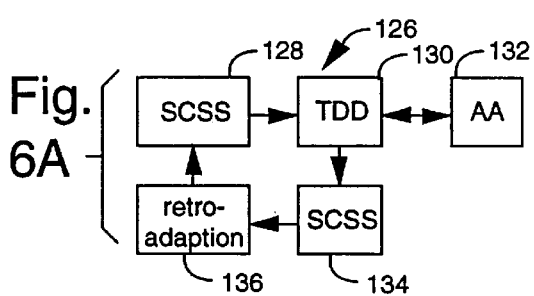
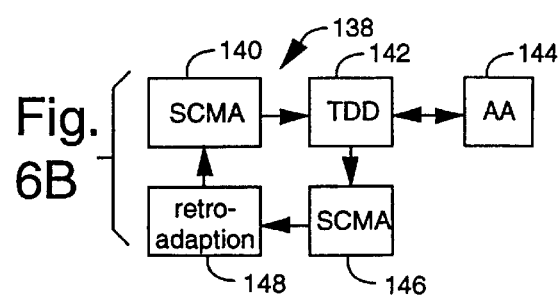

STACKED-CARRIER DISCRETE MULTIPLE TONE COMMUNICATION TECHNOLOGY AND COMBINATIONS WITH CODE NULLING, INTERFERENCE CANCELLATION, RETRODIRECTIVE COMMUNICATION AND ADAPTIVE ANTENNA ARRAYS

BACKGROUND OF THE INVENTION

1. Field of the Invention

The present invention relates generally to radio communications and more specifically to communication technologies for multiple access in difficult and hostile environments combined with dynamic environment changes.

2. Description of the Prior Art

The communication technology developed in the 1940's during World War II included "frequency diversity communication" or "stacked carrier communications" to aid high frequency (HF) band traffic. J. Proakis refers to frequency diversity communication technology in, *Digital Communications*, McGraw-Hill, 1989, see, sections 7.4 to 7.7. Diversity techniques are said by Proakis to be based on the notion that errors occur in the reception of largely attenuated channels, e.g., channels in deep fade. Supplying the receiver with several duplicates of the original signal, but over channels that fade independent from one another, has the potential of securing continuous communication except during the unlikely event that all the duplicate channels fade out together. Such probability can be estimated.

Frequency diversity is one of many diversity methods. The same modulation is carried by several carrier channels separated by nominally the coherence bandwidth of each respective channel. In time diversity, the same information is transmitted over different time slots.

Multiple antennas can be used in a diversity scheme. Several receiving antennas can be used to receive the signals sent from a single transmitting antenna. For best effect, the receiving antennas are spaced enough apart to vary different multipath interference amongst the group. A separation of nominally ten wavelengths is generally needed to observe independent signal fading.

A signal having a bandwidth much greater than the coherence bandwidth of the channel can be used in a more sophisticated diversity scheme. Such a signal with a bandwidth W will resolve the multipath components and provide the receiver with several independently fading signal paths.

Other prior art diversity schemes have included angle-of-arrival or spatial diversity and polarization diversity.

When a bandwidth W much greater than the coherence bandwidth of each respective channel is available to a user, the channel can be subdivided into a number of frequency division multiplexed sub-channels having a mutual separation in center frequencies of at least the coherence bandwidth of each respective channel. The same signal can then be transmitted over the frequency-division multiplex sub-channels to establish frequency diversity operation. The same result can be achieved by using a wideband binary signal that covers the bandwidth W.

G. K. Kaleh describes such in an article, "Frequency-Diversity Spread-Spectrum Communication System to Counter Band-limited Gaussian Interference", IEEE Transactions on Communications, September 1994. Here a secure setup is outlined that can operate in deliberately hostile signal environments.

J. Proakis describes frequency diversity spread spectrum and multiple access concepts in chapter eight, "Spread Spectrum Signals for Digital Communication", supra. Diversity transmission combined with frequency-hopping spread spectrum is detailed for protection against multipath fading and partial-band jamming.

Retro-directivity was proposed and used as early as 1959 to adapt a multi-element antenna array to provide identical spatial gain patterns during transmission and reception operations. See, R. Monzingo, T. Miller, Introduction to Adaptive Arrays, Wiley Interscience Publications, 1980; L. Van Atta, "Electromagnetic Reflection," U.S. Pat. No. 2,908, 002, 1959; and B. Glance, P. Henry, "High Capacity Mobile Radio System," U.S. Pat. No. 4,383,332, May 10, 1983, for a discussion of such techniques. TDD systems provide an effective means for implementing retrodirective antenna arrays, e.g., by minimizing the channel variation between the reception and transmission paths.

SUMMARY OF THE INVENTION

It is therefore an object of the present invention to provide a radio communication system for spreading data over widely separated frequency bands manifesting differences in channel distortion without physically spreading signals between intervening frequencies, as is required with direct-sequence spread spectrum.

It is another object of the present invention to provide a radio communication system for communication under strong narrow-band interference, e.g., conventional cellular signal waveforms, by turning off affected frequency channels at a receiver's despreader.

It is an object of the present invention to provide a radio communication system with simple equalization of linear channel multipath distortion.

It is an object of the present invention to provide a radio communication system that is compatible with discrete multitone and orthogonal frequency-division multiplex-like channelization techniques. And that is compatible with time-packetized discrete multitone and orthogonal frequency-division multiplex-like modulation/demodulation techniques for frequency channelization and inverse channelization.

It is another object of the present invention to provide a radio communication system that is compatible with time-division duplex systems where the stacked-carrier spread spectrum modulation format is packetized, e.g., if the stacked-carrier spread spectrum signal is generated using discrete multiple tone and/or orthogonal frequency-division multiplex-like based frequency channelizers and inverse channelizers.

It is an object of the present invention to provide a radio communication system for frequency-division multiple-access like multiple access capability.

It is an object of the present invention to provide a radio communication system for code-division multiple-access like capability in a stacked carrier multiple access arrangement.

It is an object of the present invention to provide a radio communication system compatible with high-order digital modulations.

It is an object of the present invention to provide a radio communication system for bandwidth-on-demand flexible data rate connections.

It is an object of the present invention to provide a radio communication system for space-division multiple-access like multiple access, interference excision, and channel equalization capability in a code nulling application.

It is an object of the present invention to provide a radio communication system for use with adaptive antenna arrays by spatially extending a spreading code to spread data using independent complex gains on each spatial channel, or antenna beam, to control the channel-bandwidth array dispersion.

It is an object of the present invention to provide a radio communication system compatible with advanced array adaptation techniques, e.g., non-blind pilot-directed, blind data-directed, and other techniques that take advantage of underlying properties of the baseband data, channel structure, or stacked carrier spreading format.

It is an object of the present invention to provide a radio communication system compatible with retrodirective communication techniques.

It is an object of the present invention to provide a radio communication system for back-compatibility with conventional code-division multiple access, data activation systems.

Briefly, an embodiment of the present invention comprises a "stacked-carrier" spread spectrum communication system wherein the spreading is done in the frequency domain by multiplying a time-domain representation of a baseband signal by a set of superimposed, or stacked, complex sinusoid carrier waves. In practice, the spreading is done by simply energizing the bins of a large fast Fourier transform (FFT). This provides a considerable savings in computational complexity for moderate output FFT sizes. A Kaiser-Bessel window, e.g., with $\beta=9$, can be used to "fill out" the space between the tones without subjecting those tones to unacceptable interference from adjacent tones, e.g., inter-tone interference. In particular, a high value of $\beta$ provides acceptable interference between adjacent tones and extremely low interference between farther out tones. This basic technology is then combined with time-division duplex, code-division multiple access, space-division multiple access, frequency-division multiple access, adaptive antenna array and interference cancellation techniques.

An advantage of the present invention is that a radio communication method is provided that spreads data over widely separated frequency bands for spectral diversity. This provides an efficient way to take advantage of frequency diversity, especially in applications where the bands are very widely separated.

An advantage of the present invention is that a radio communication method is provided that communicates even under strong narrow-band interference. So a stacked-carrier spread spectrum (SCSS) link can be maintained in the presence of strong narrow-band frequency-division multiple access (FDMA) and time-division multiple access (TDMA) cellular radio signals, as in cellular overlay applications. It also allows such a link to be maintained in the presence of spurious interference due to harmonics from out-of-band signals.

An advantage of the present invention is that a radio communication method is provided that permits simple equalization of linear channel distortion, and allows stationary, or quasi-stationary, linear channel distortion to be approximated as a multiplicative effect on the transmit spreading code. It further allows the channel equalization operation to be subsumed into the despreading or spreading operation without additional filtering operations, apart from removal of intrapacket Doppler spread. The basic technique equalizes multipath dispersion commensurate with the bandwidth of the baseband, pre-spread, message signal. This multipath equalization operation can be extremely simple if the bandwidth of the message signal is low. If the bandwidth of the pre-spread message signal is sufficiently low, e.g., the correlation width or inverse bandwidth of the pre-spread message signal is a large multiple of the largest multipath delay in the transmission channel, this equalization operation reduces to a complex multiply operation that is automatically subsumed into the adaptive despreading operation. This is in contrast to conventional CDMA systems, which require additional equalization operations unless the correlation width of the spread signal is a large multiple of the largest multipath delay in the transmission channel.

Another advantage of the present invention is that a radio communication method is provided that is compatible with discrete multiple tone and orthogonal frequency-division multiplex-like frequency channelization techniques. This allows stationary and linear channel distortion to be modeled as an exactly multiplicative effect on the transmit spreading code.

An advantage of the present invention is that a radio communication method is provided that is compatible with time-division duplex systems. So time-division duplex communication formats can be used where the stacked-carrier spread spectrum modulation format is packetized, e.g., if the stacked-carrier spread spectrum signal is generated using discrete multiple tone and/or orthogonal frequency-division multiplex-like based frequency channelizers and inverse channelizers. A "local" estimation of the transmit channel at either end of the communication link is made possible, greatly simplifying the implementation of channel preemphasis, transmit-site channel equalization topologies and retrodirective transmission techniques.

An advantage of the present invention is that a radio communication method is provided with a code-division multiple-access type of multiple access capability, e.g., the stacked carrier multiple access technique. Point-to-multipoint communication links are implemented by transmitting signals over the same subset of frequency channels, using linearly independent, (orthogonal or non-orthogonal) sets of spreading gains to separate the signals at the despreader. Since the spreading codes can be non-orthogonal, a chief advantage of the present invention when used in conjunction with code nulling techniques, is that the use of non- orthogonal spreading codes is possible.

An advantage of the present invention is that a radio communication method is provided that is compatible with "bandwidth-on-demand" flexible data rate techniques. The data rate supplied on a given link can be increased or decreased in small increments by transmitting primitives to a single user over multiple time, frequency, or stacked carrier channels. The data rate is then adjusted with no increase in bandwidth if the data rate increases using multiple stacked carrier channels.

An advantage of the present invention is that a radio communication method is provided that is compatible with high-order digital modulations. It is compatible with arbitrary $M_{ary}$ digital baseband modulation formats and allows capacity improvement through transmission of higher numbers of bits/symbol on each frequency channel. The reuse is improved and "load balancing" in multicell communication networks can be included by varying the bits per symbol on each primitive.

An advantage of the present invention is that a radio communication method is provided that has space-division multiple-access, interference excision, and channel equalization capability, e.g., in the code nulling technique. Such space-division multiple-access like code nulling techniques, in optimal and quasi-optimal linear interference cancellation and signal extraction techniques, are useful to separate stacked-carrier spread spectrum signals at the despreader, based on the frequency diversity or spectral diversity of the signals. Interference excision against in-cell stacked-carrier spread spectrum signals are thereby provided, as well as the elimination of out-of-cell interferers, e.g., the reuse enhancement capability. This then allows the most effective use of code nulling, which is generally applicable to a wide range of spreading formats. In particular, such provides a factor of two capacity improvement over code-nulling techniques developed for use with modulation-on-symbol direct-sequence spread spectrum formats where the spreading gain repeats once every underlying message symbol.

An advantage of the present invention is that a radio communication method is provided that can be used with adaptive antenna arrays.

An advantage of the present invention is that a radio communication method is provided that is compatible with advanced array adaptation techniques and thereby separates signals based on spatial diversity, frequency spectrum diversity, and combined spatial/spectral diversity.

An advantage of the present invention is that a radio communication method is provided that is compatible with retrodirective communication techniques. This enables a straightforward extension of spatial retro-directivity technique to stacked-carrier spread spectrum systems including single antennas or antenna arrays. And allows concentration of most complex operations at the base station in point-to-multipoint communication links, greatly reducing the cost of the overall system.

A still further advantage of the present invention is that a radio communication method is provided that is backward compatible with conventional code-division multiple access, data activation techniques.

These and other objects and advantages of the present invention will no doubt become obvious to those of ordinary skill in the art after having read the following detailed description of the preferred embodiment which is illustrated in the various drawing figures.

IN THE DRAWINGS

FIG. 2A is a block diagram representing an embodiment of the present invention wherein a stacked-carrier spread-spectrum transmitter bank is connected to an antenna array for a point-to-point transmitter, and another antenna array is connected to a stacked-carrier spread-spectrum receiver bank for a point-to-point receiver;

FIG. 2B is a block diagram representing another embodiment of the present invention wherein a stacked-carrier multiple-access transmitter bank is connected to an antenna array for a network transmitter, and another antenna array is connected to a stacked-carrier multiple-access receiver bank for a network receiver;

FIG. 3A is a block diagram representing another embodiment of the present invention wherein a stacked-carrier spread-spectrum transmitter is connected to a time-division duplexer for a point-to-point transmitter, and another time-division duplexer is connected to a stacked-carrier spread-spectrum receiver for a point-to-point receiver;

FIG. 3B is a block diagram representing another embodiment of the present invention wherein a stacked-carrier multiple-access transmitter is connected to a time-division duplexer for a network transmitter, and another time-division duplexer is connected to a stacked-carrier multiple-access receiver for a network receiver;

FIG. 4A is a block diagram representing another embodiment of the present invention wherein a stacked-carrier spread-spectrum transmitter is connected to a code nuller for a point-to-point transmitter, and another code nuller is connected to a stacked-carrier spread-spectrum receiver for a point-to-point receiver;

FIG. 4B is a block diagram representing another embodiment of the present invention wherein a stacked-carrier multiple-access transmitter is connected to a code nuller for a network transmitter, and another code nuller is connected to a stacked-carrier multiple-access receiver for a network receiver;

FIG. 5A is a block diagram representing another embodiment of the present invention wherein a stacked-carrier spread-spectrum transmitter is connected to a widely separated frequency channelizer for a point-to-point transmitter, and another widely separated frequency channelizer is connected to a stacked-carrier spread-spectrum receiver for a point-to-point receiver;

FIG. 5B is a block diagram representing another embodiment of the present invention wherein a stacked-carrier multiple-access transmitter is connected to a widely separated frequency channelizer for a network transmitter, and another widely separated frequency channelizer is connected to a stacked-carrier multiple-access receiver for a network receiver;

Figure 1:
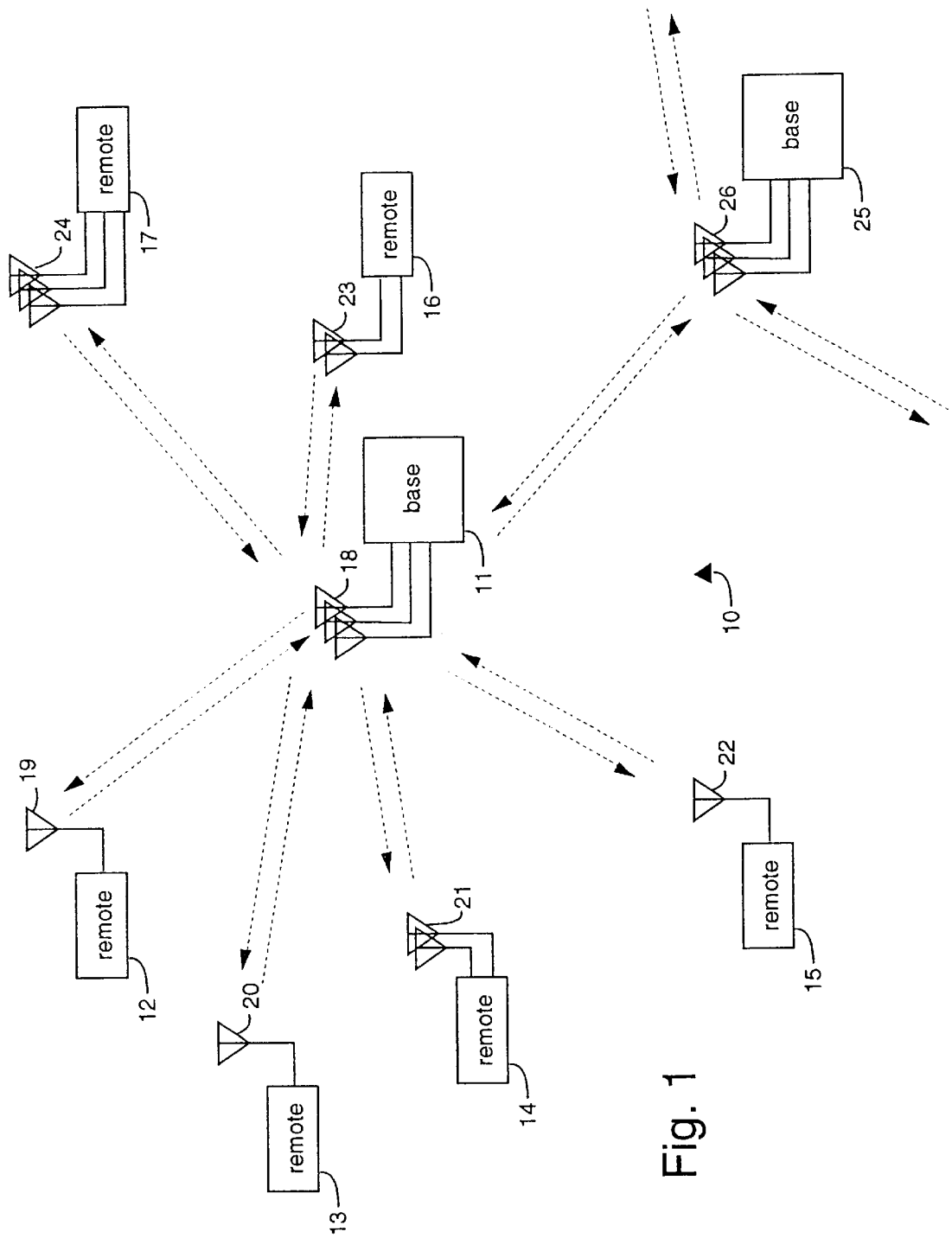
FIG. 1 is a block diagram of a communication system embodiment of the present invention wherein several remote mobile units are distributed in space about one or more central base stations.
Figure 7A:
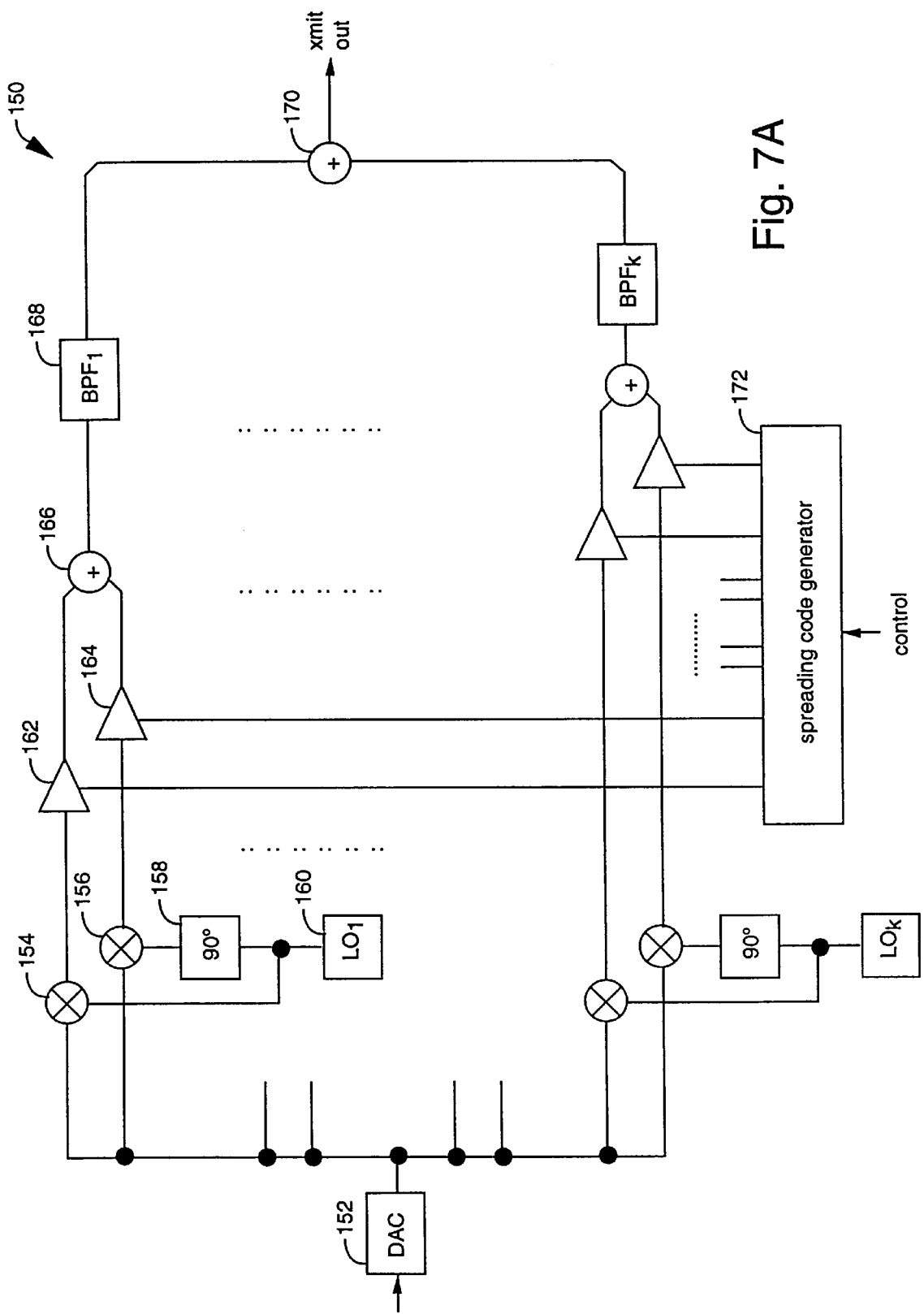
Figure 7B:
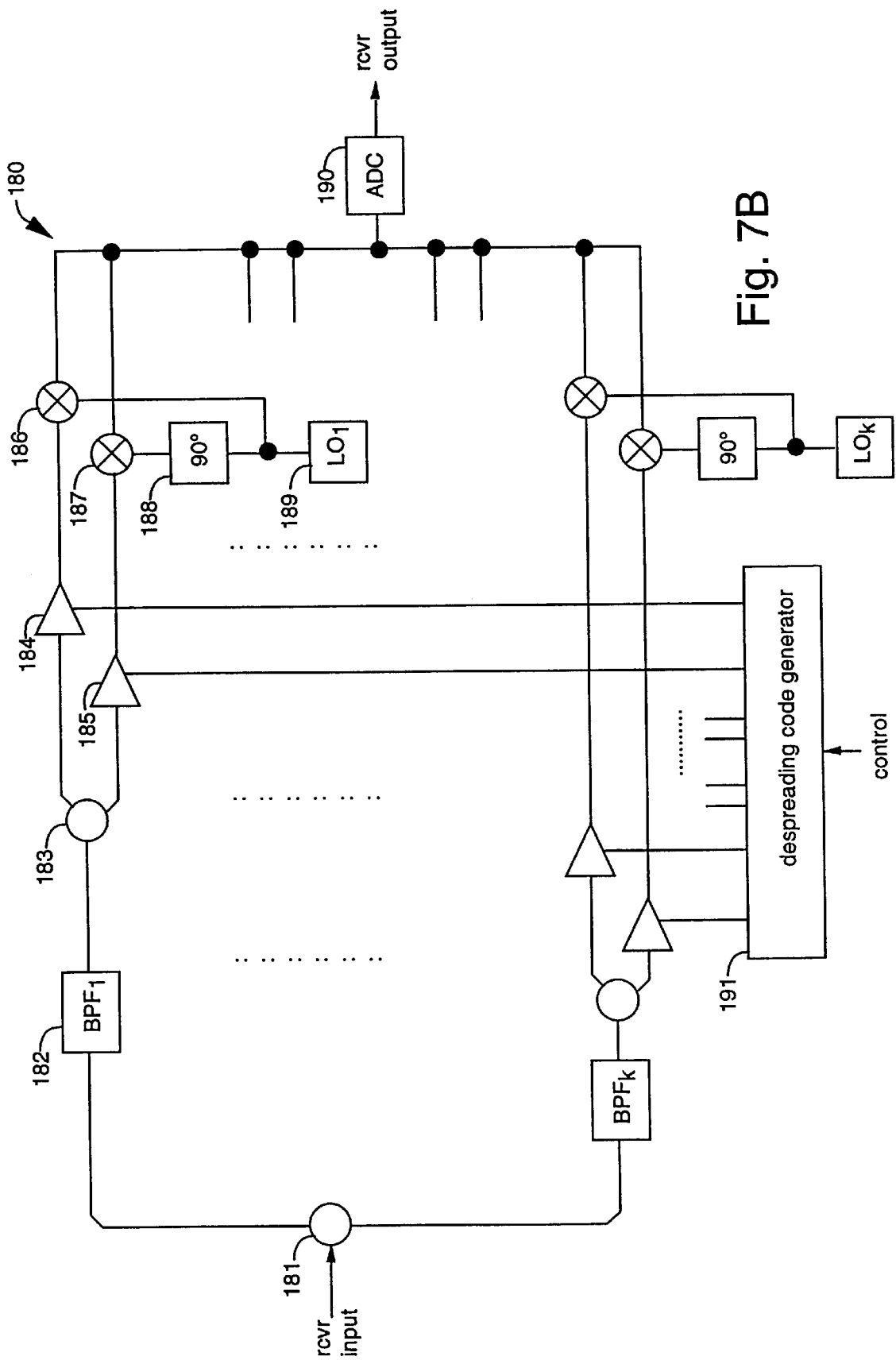
Figure 8:
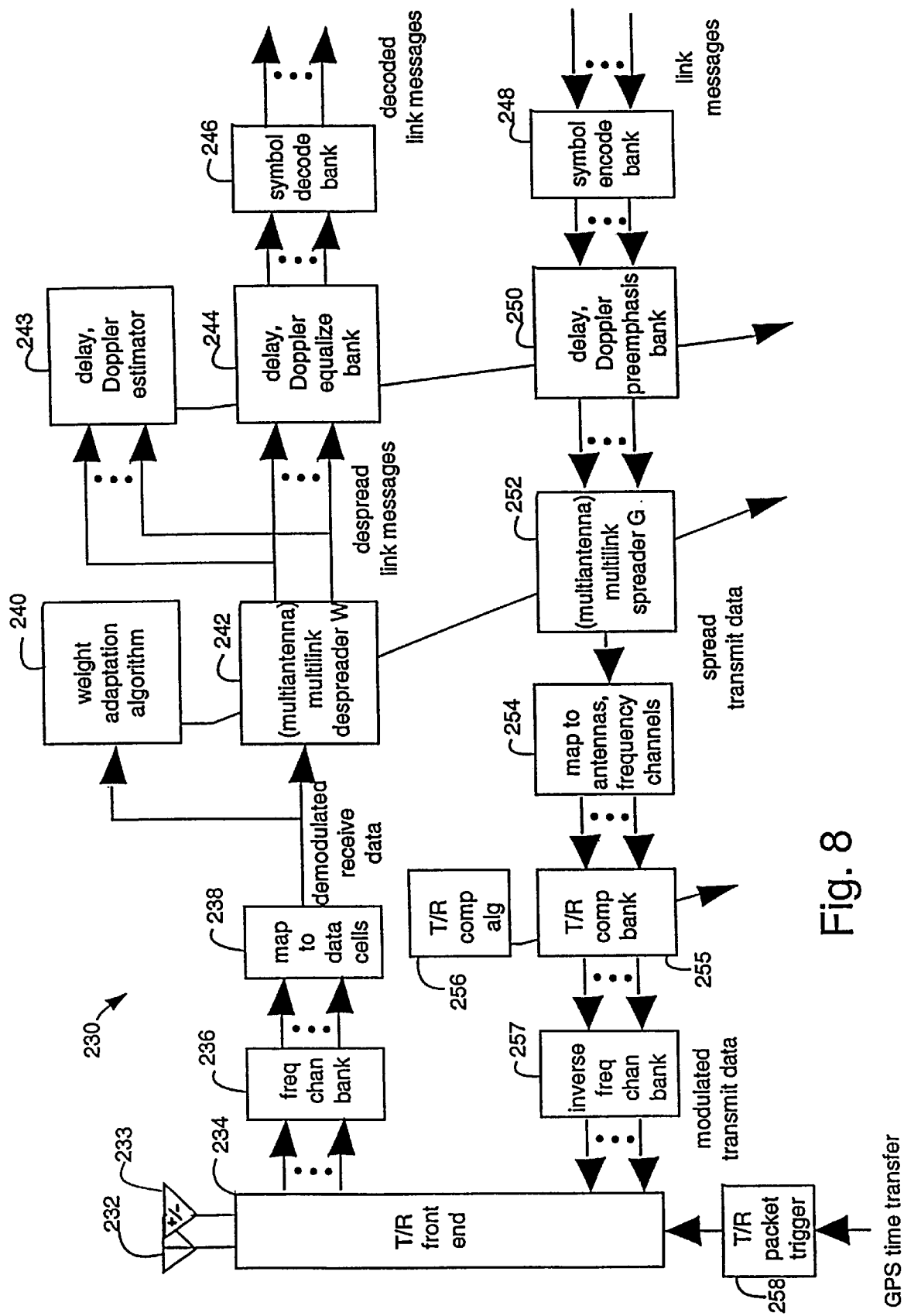
Figure 9:
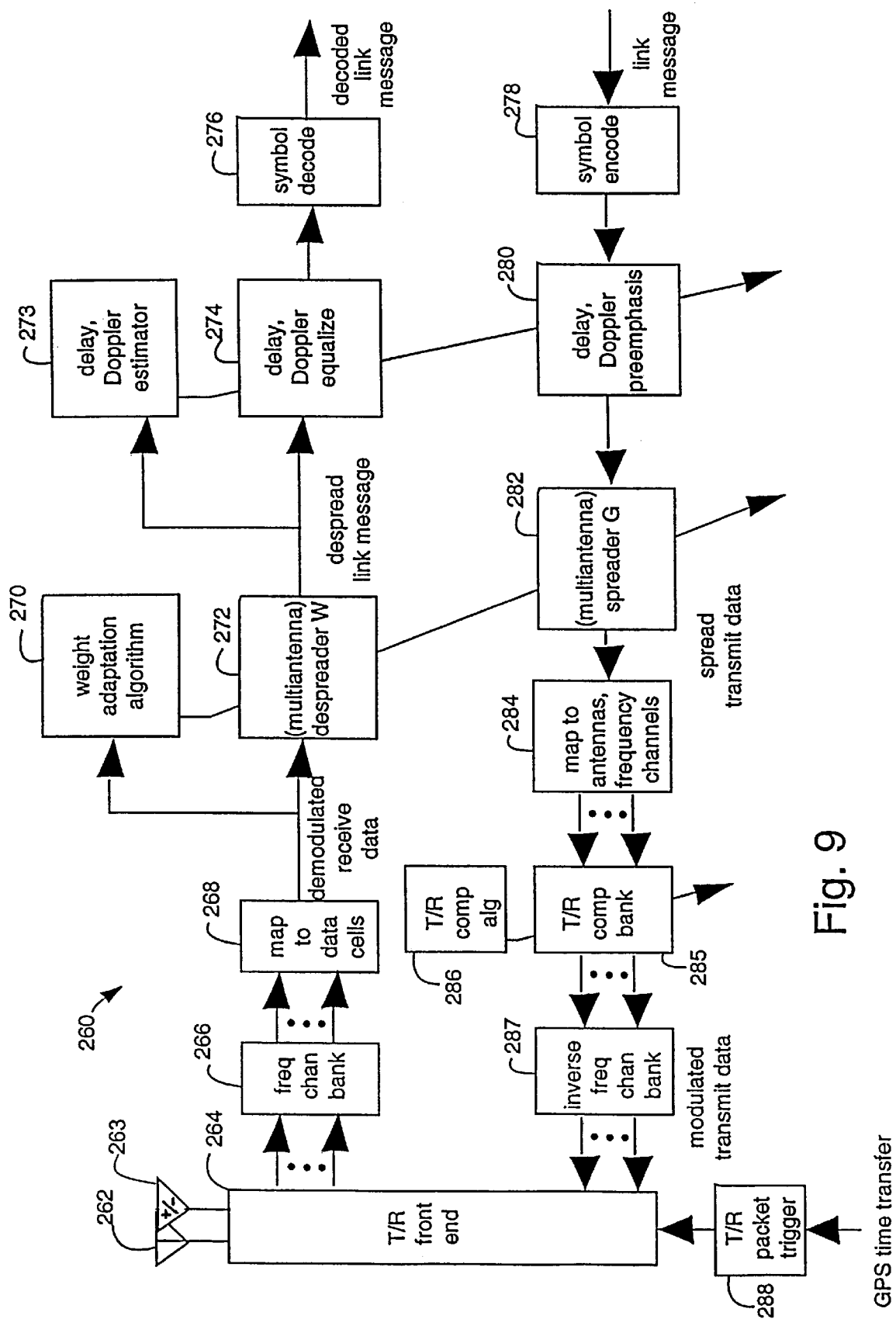
Figure 10:
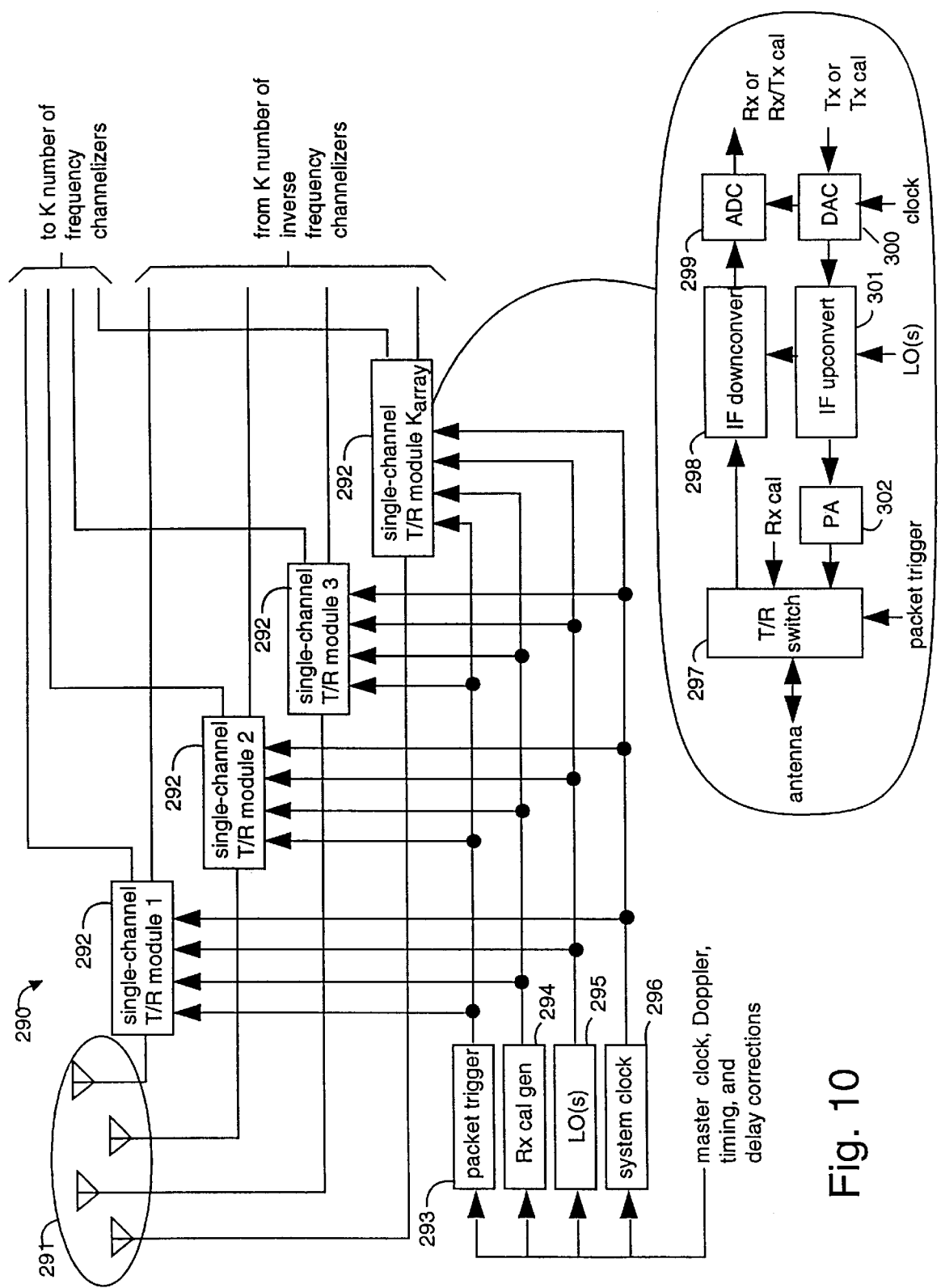
Figure 11:
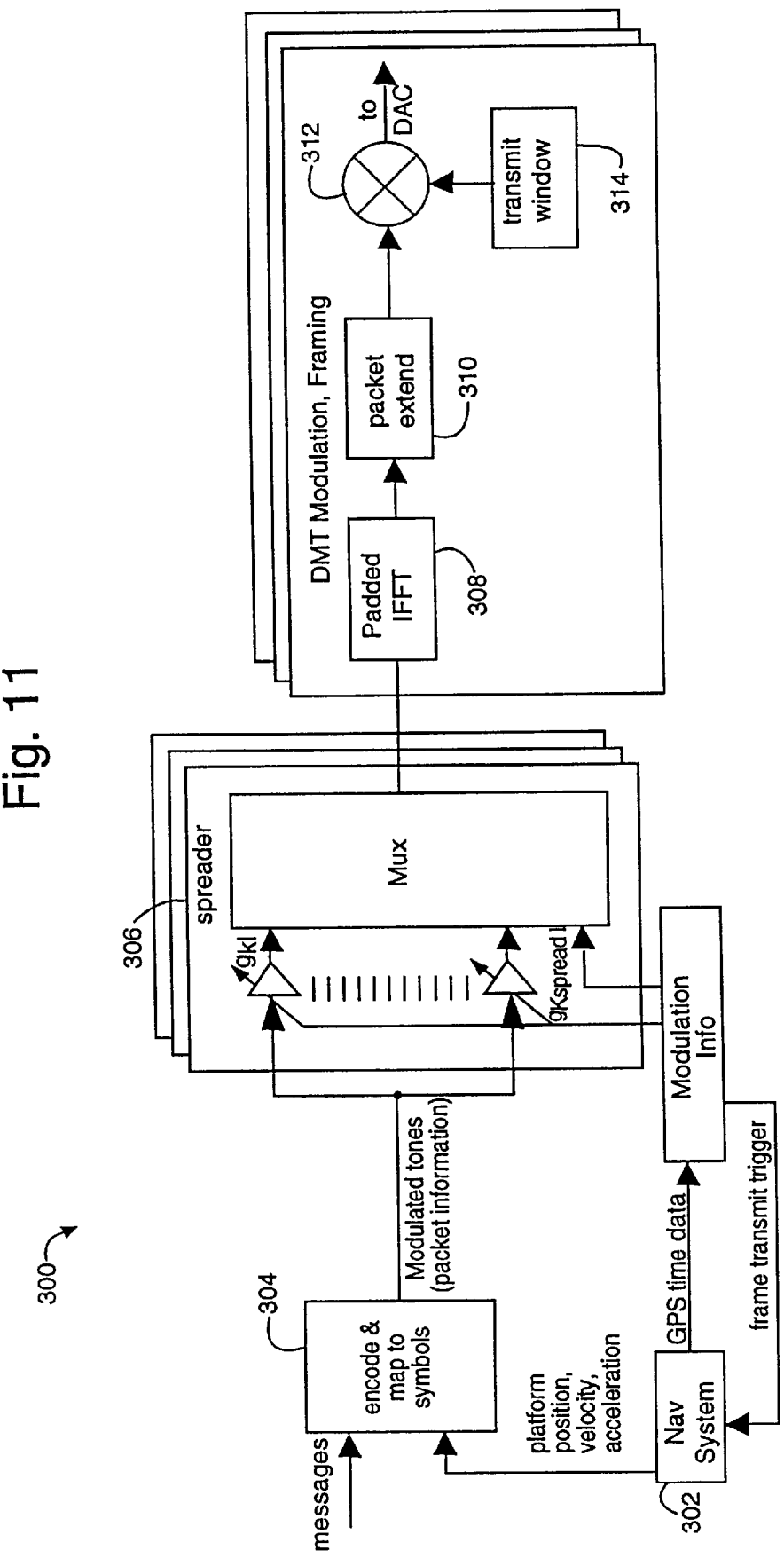
Figure 12:
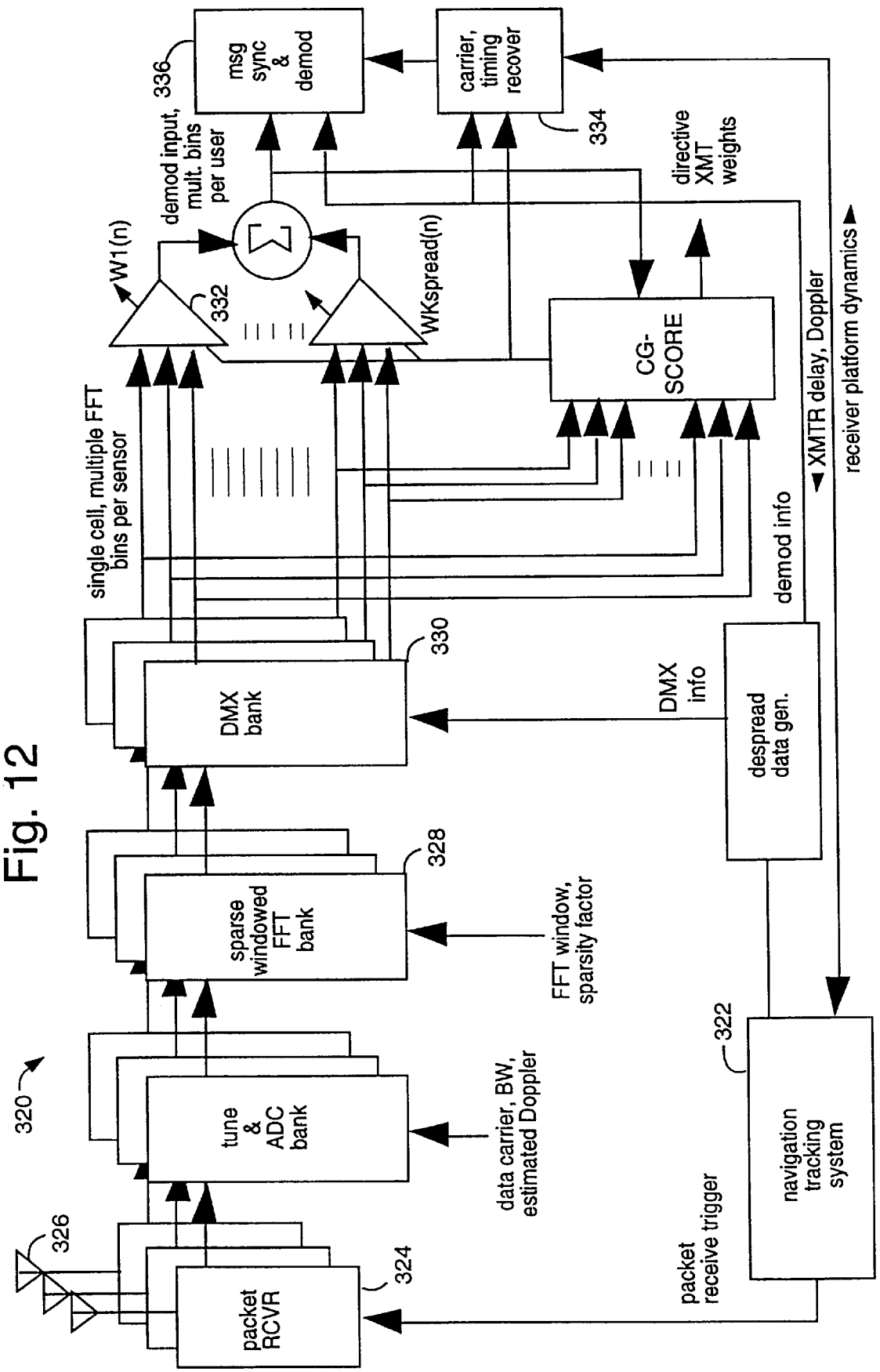
Figure 13:
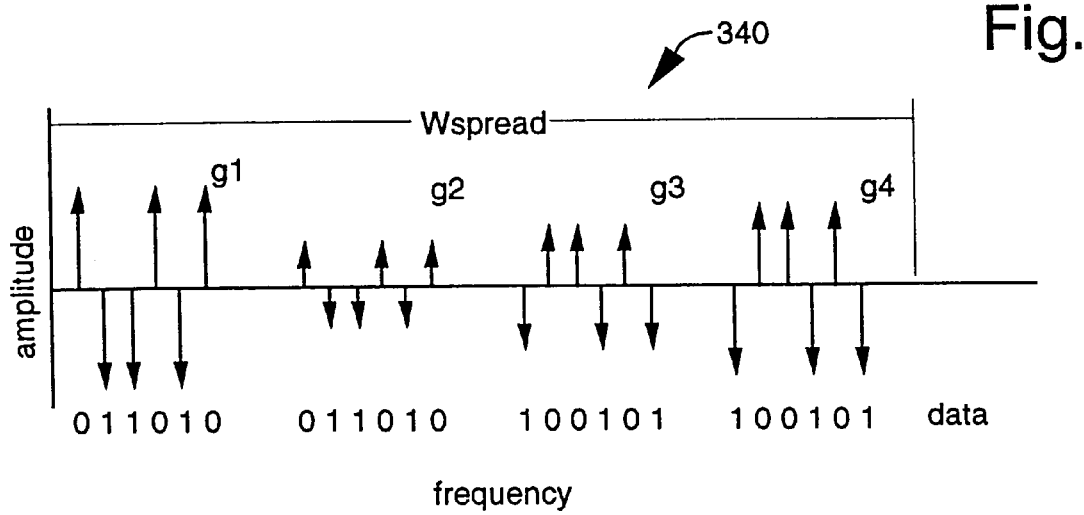
Figure 14:
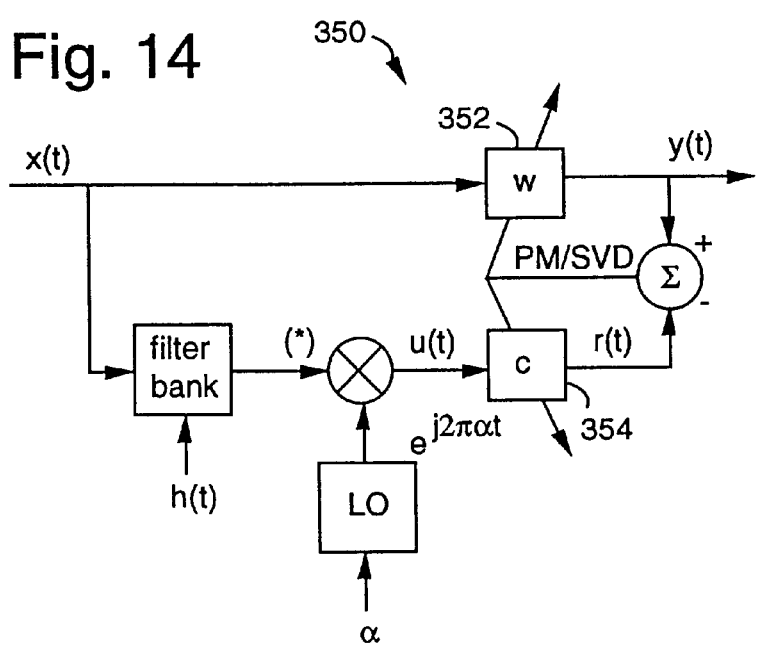
Figure 15:
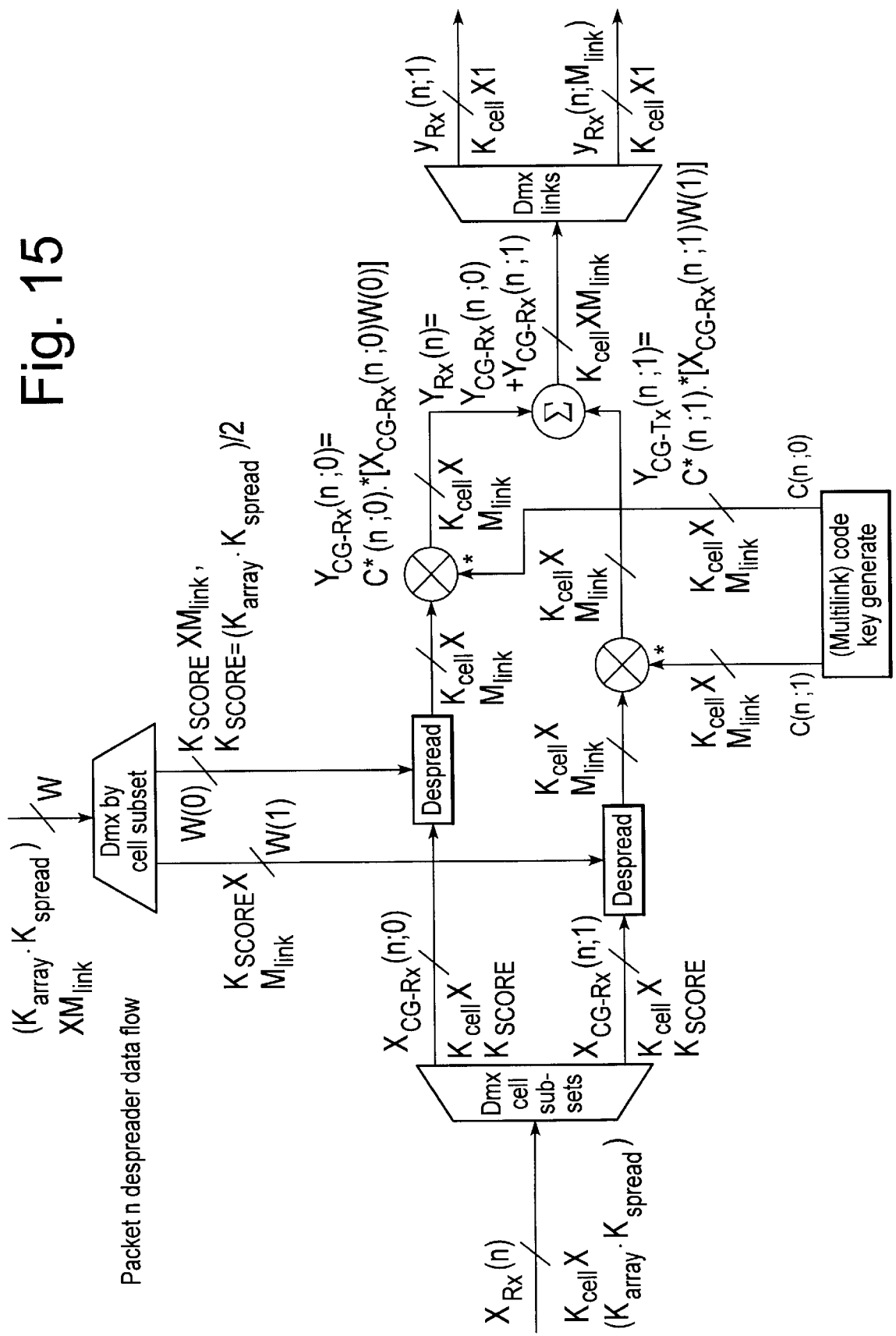
Figure 16:
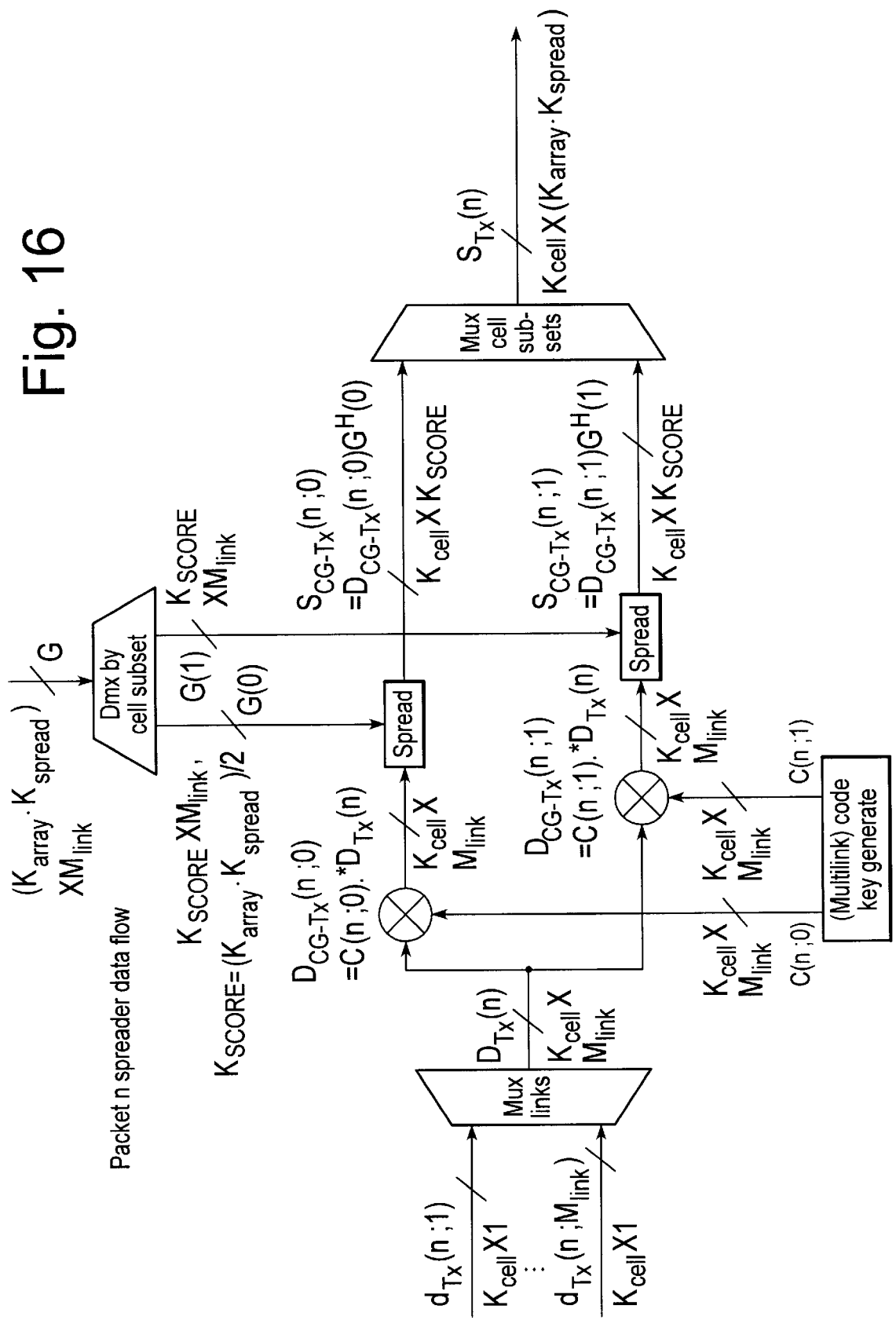
Figure 17:
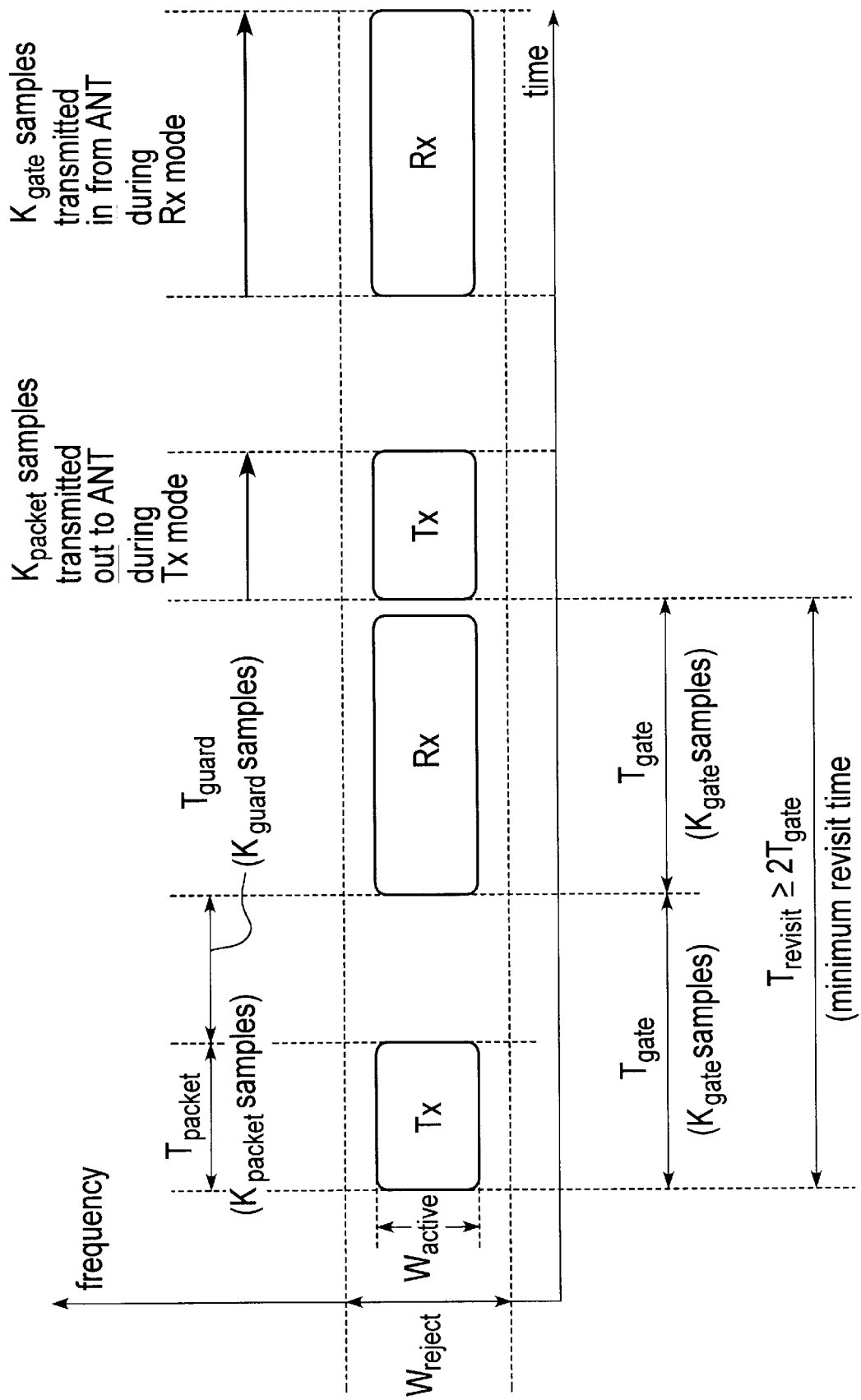
Figure 18:
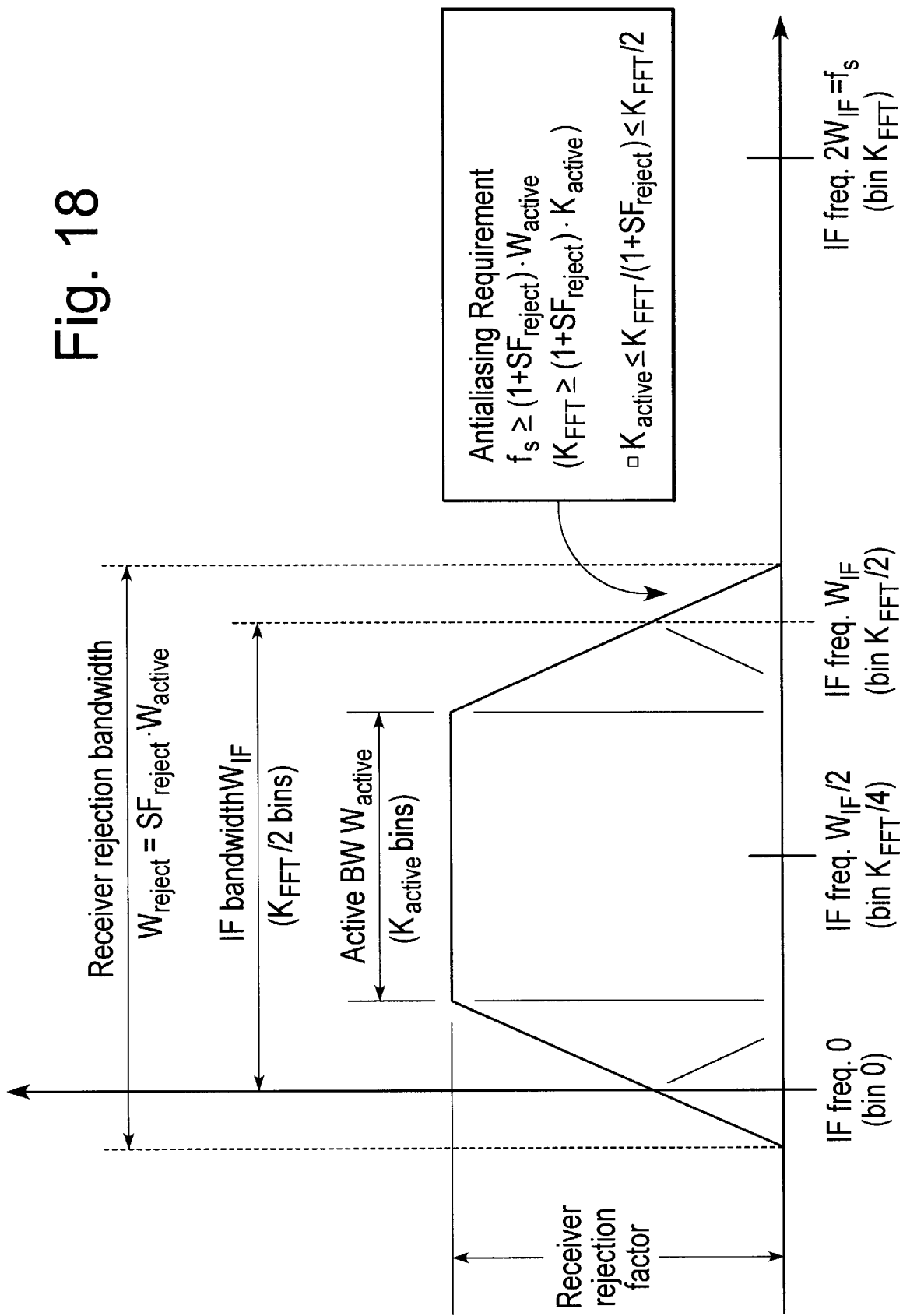
Figure 19:
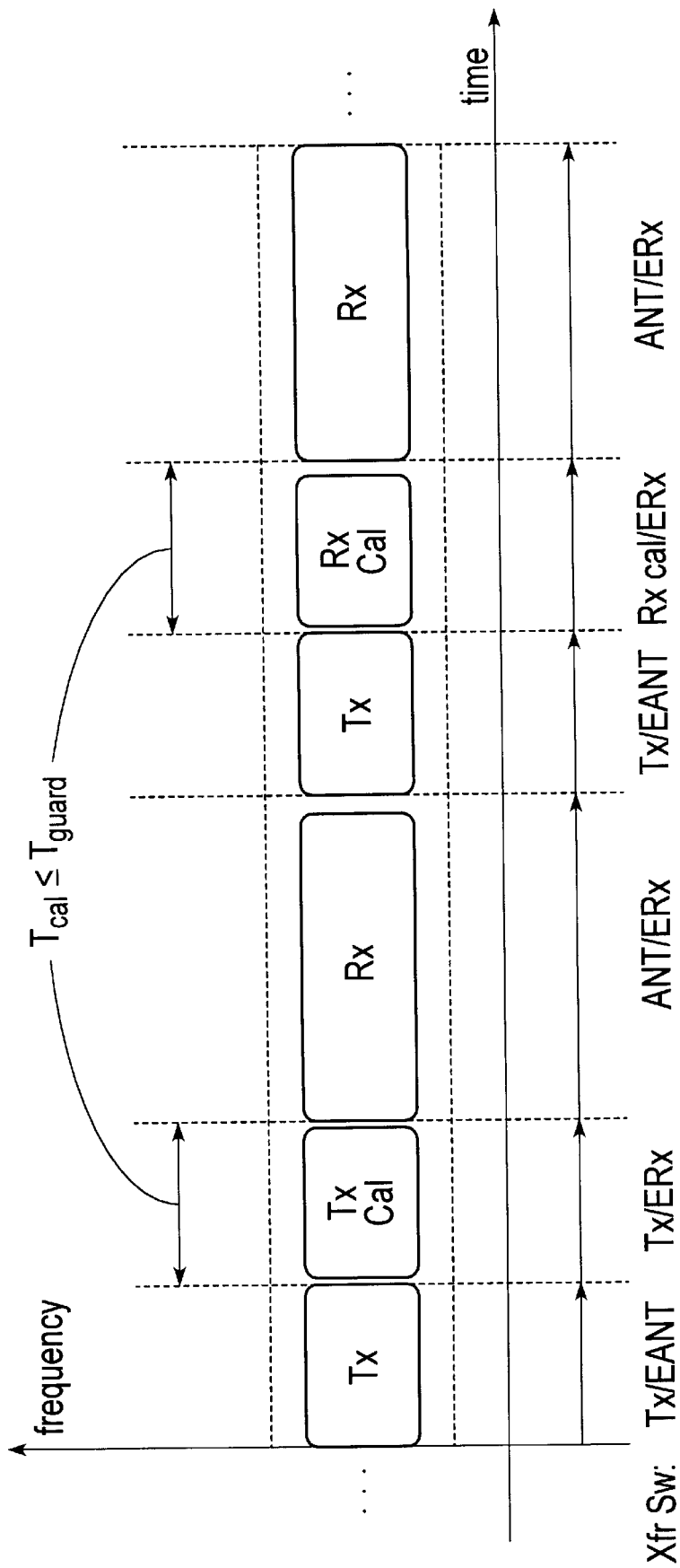
Figure 20:
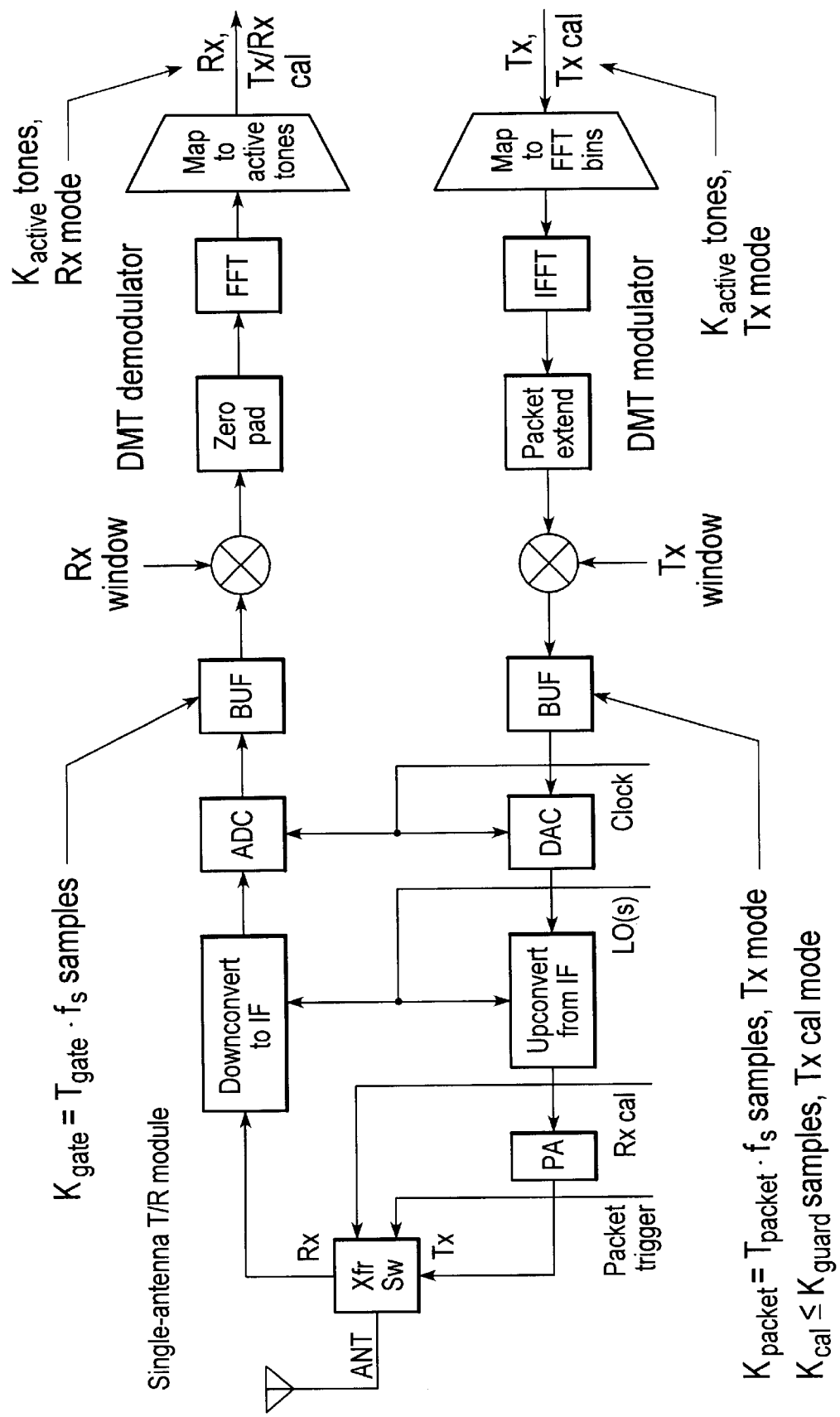
Figure 21:
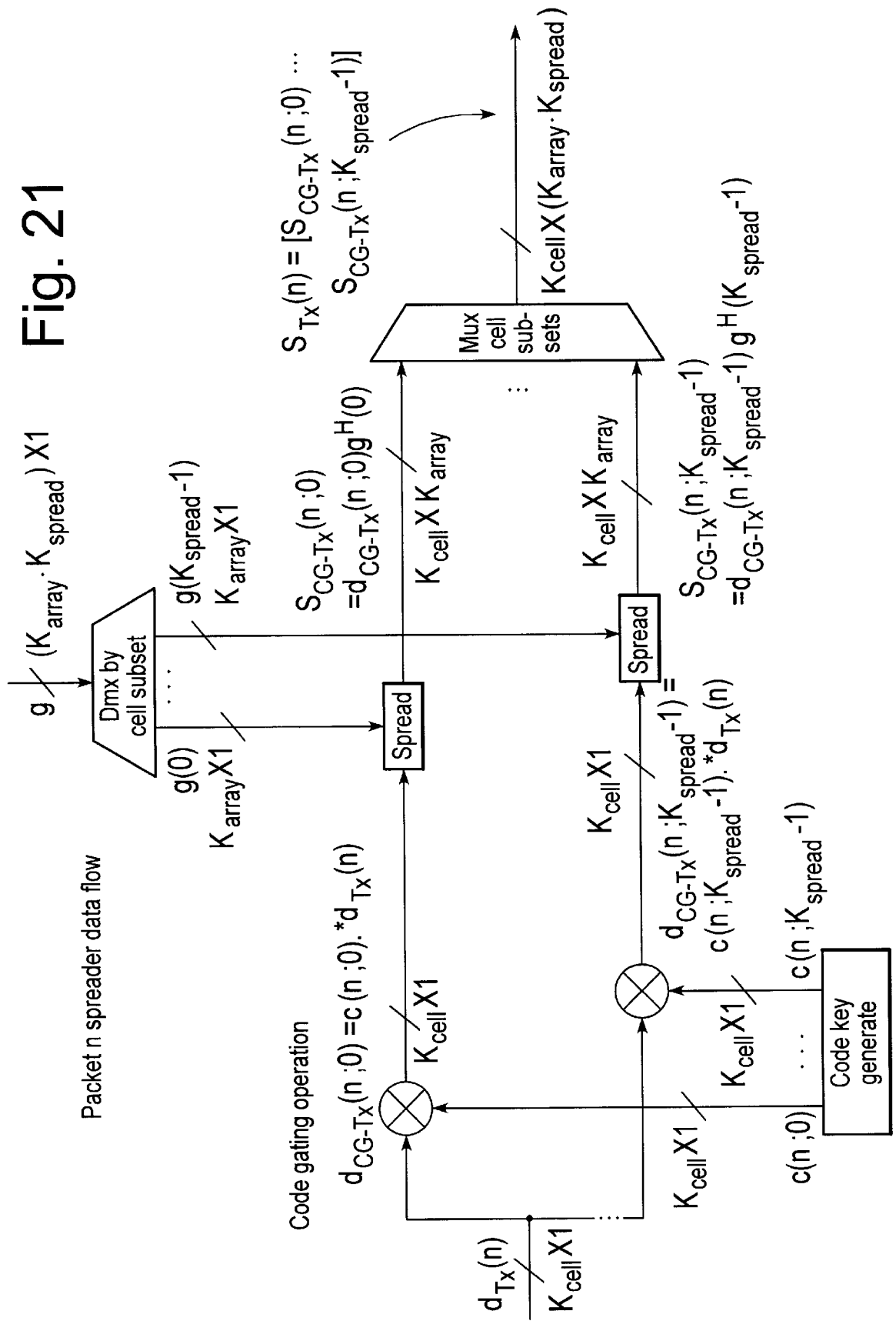
Figure 22:
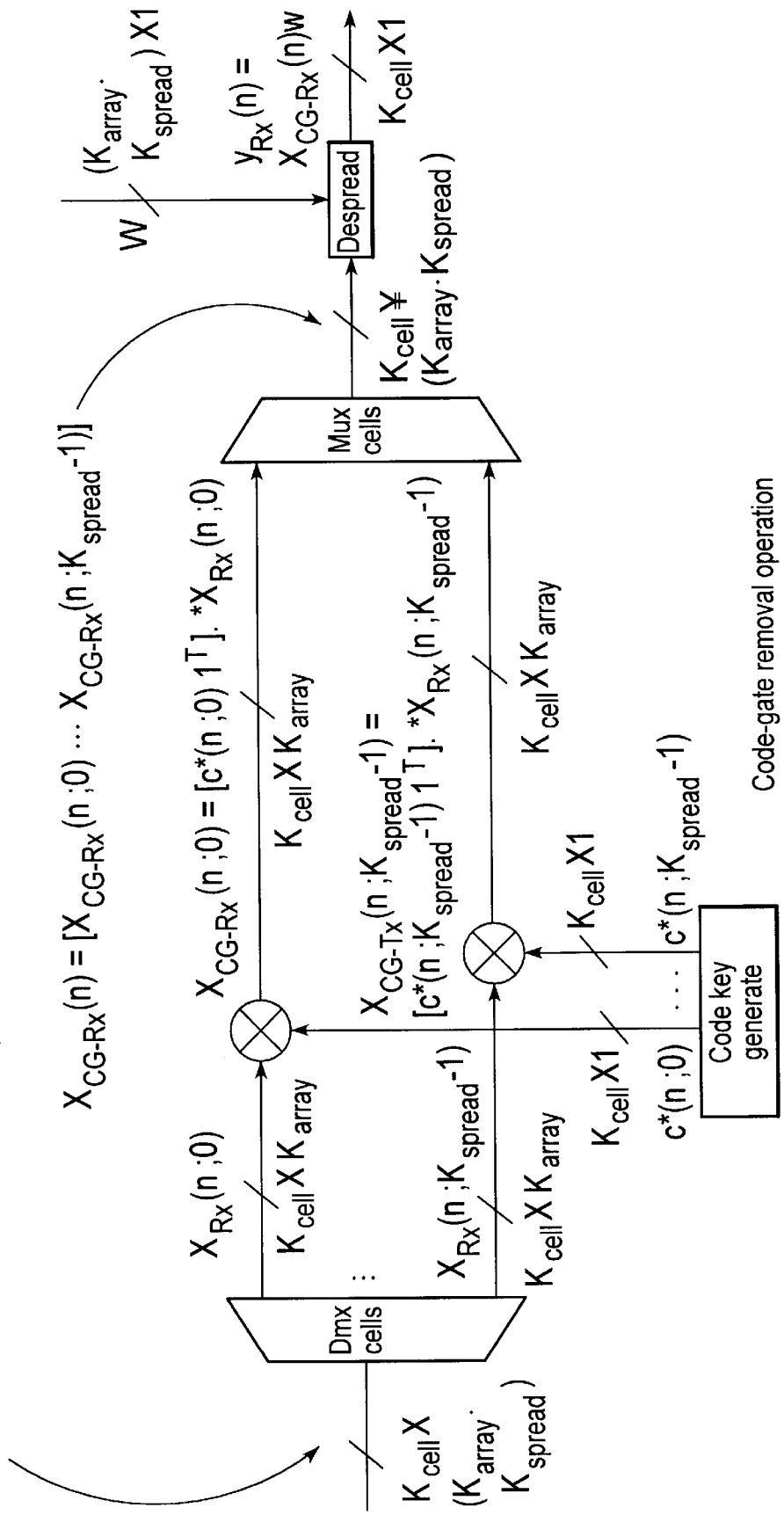
Figure 23:
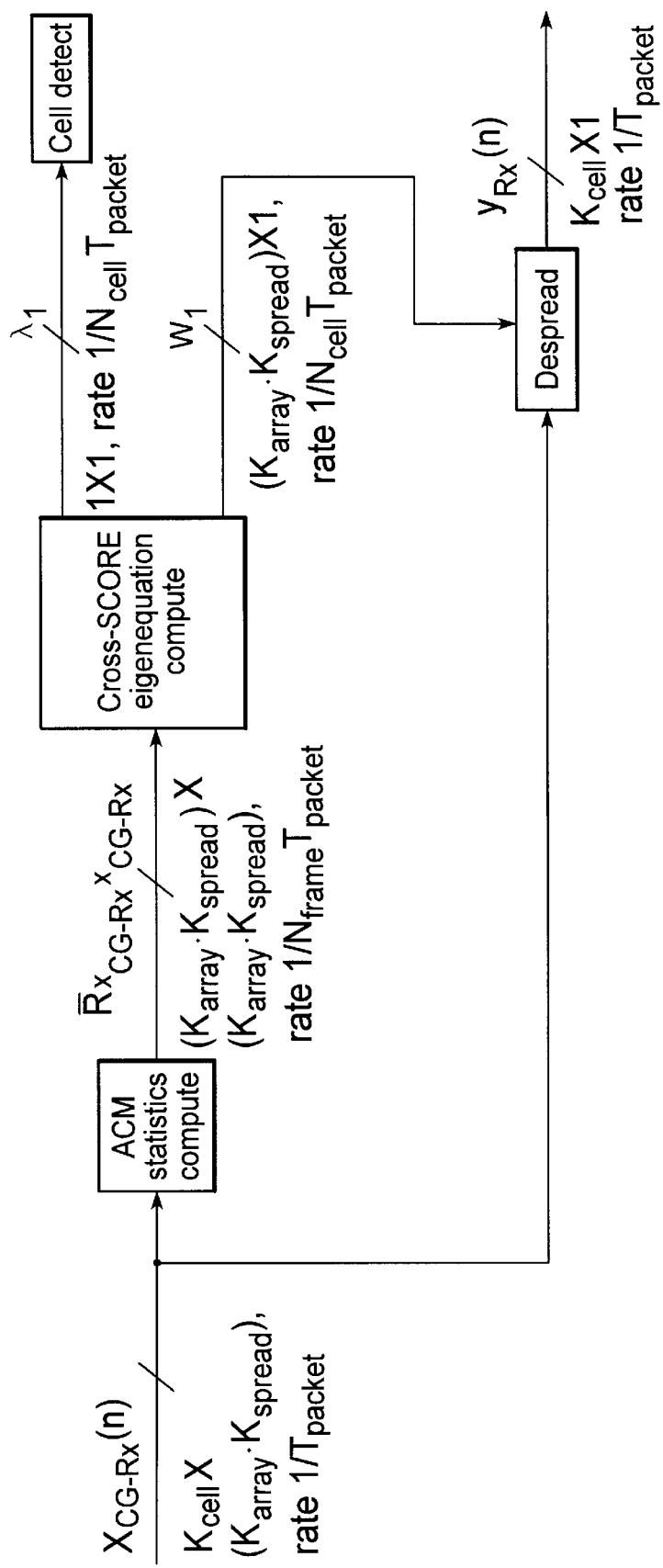
Figure 24:
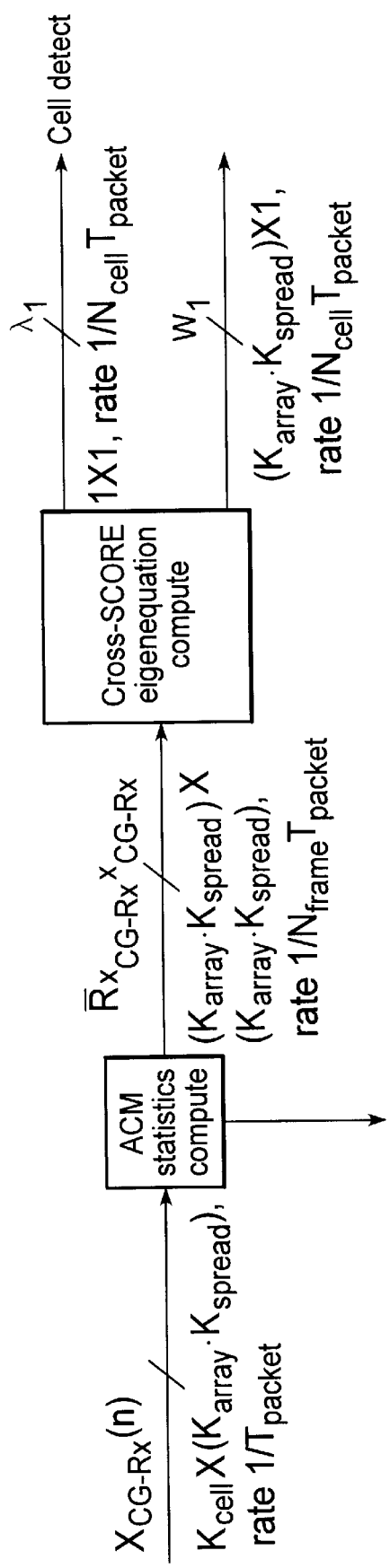
Figure 25:
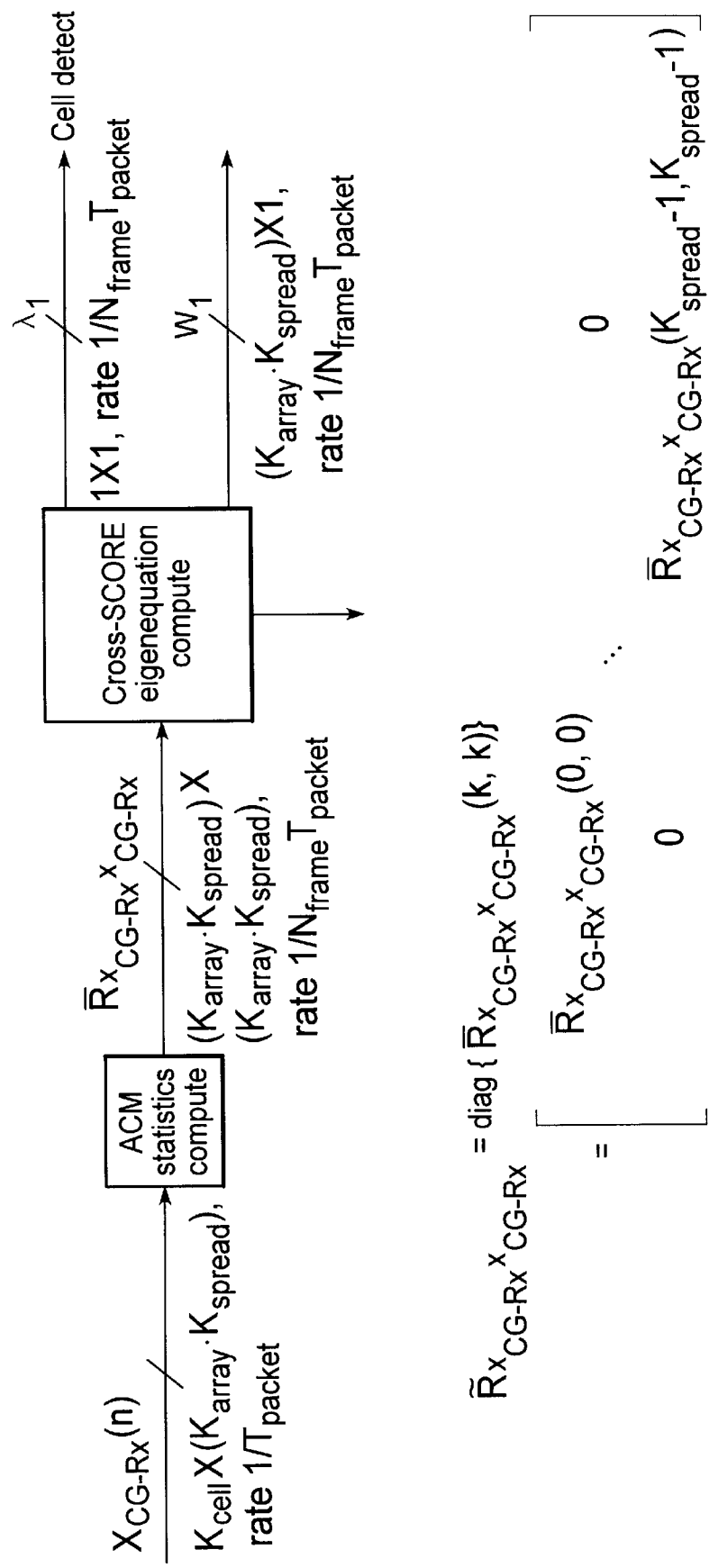
Figure 26:
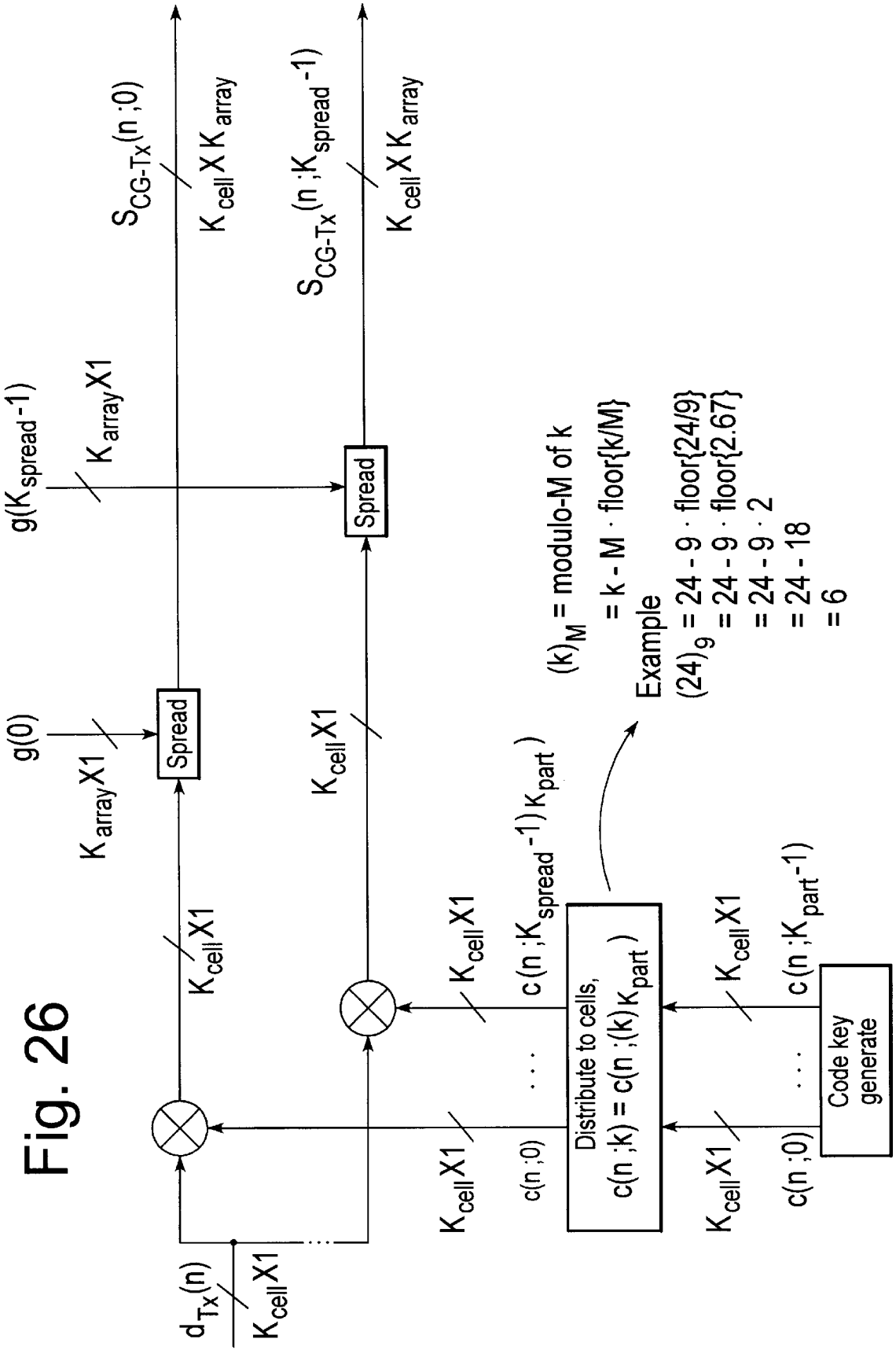
Figure 27:
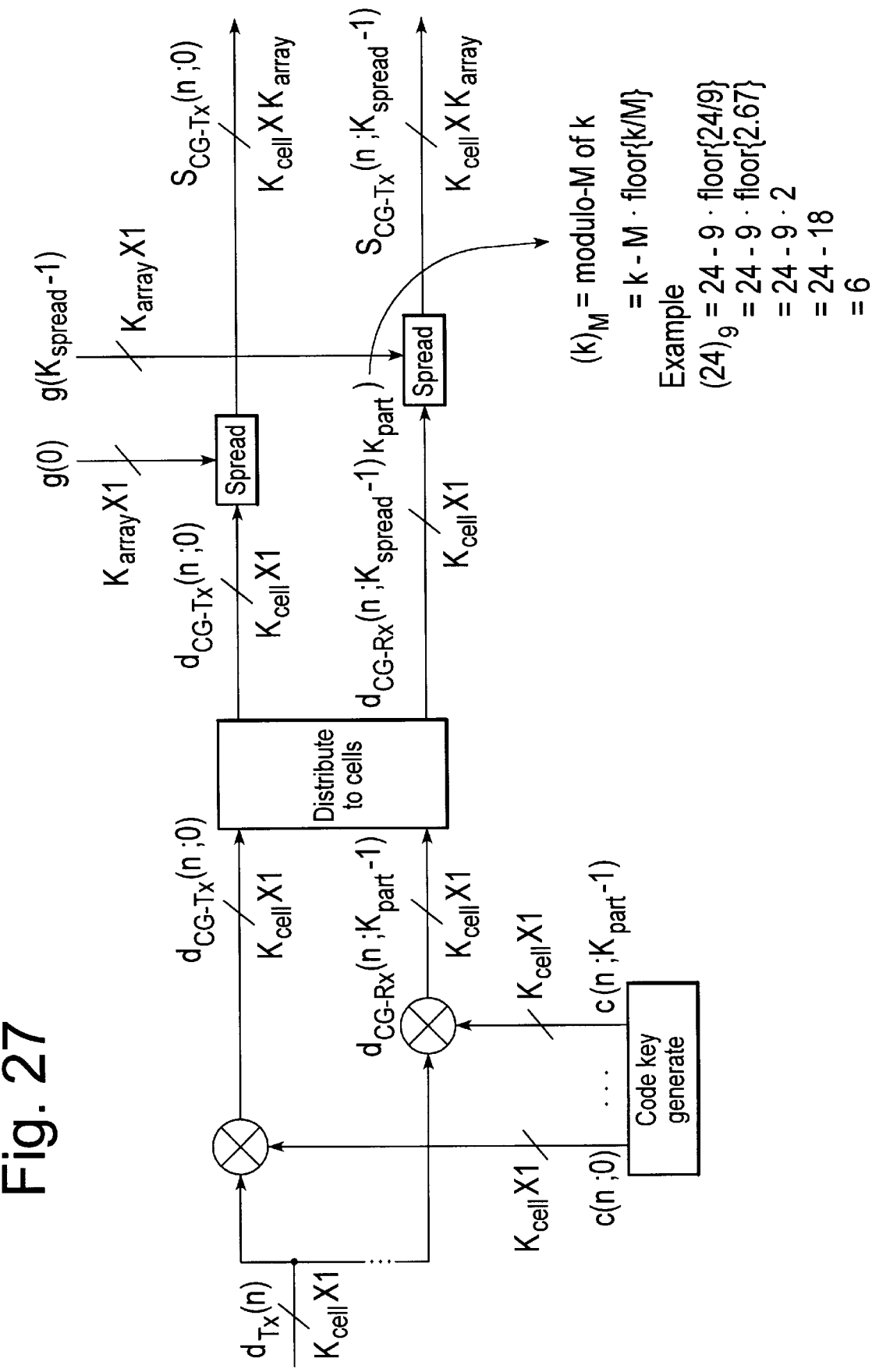
Figure 28:
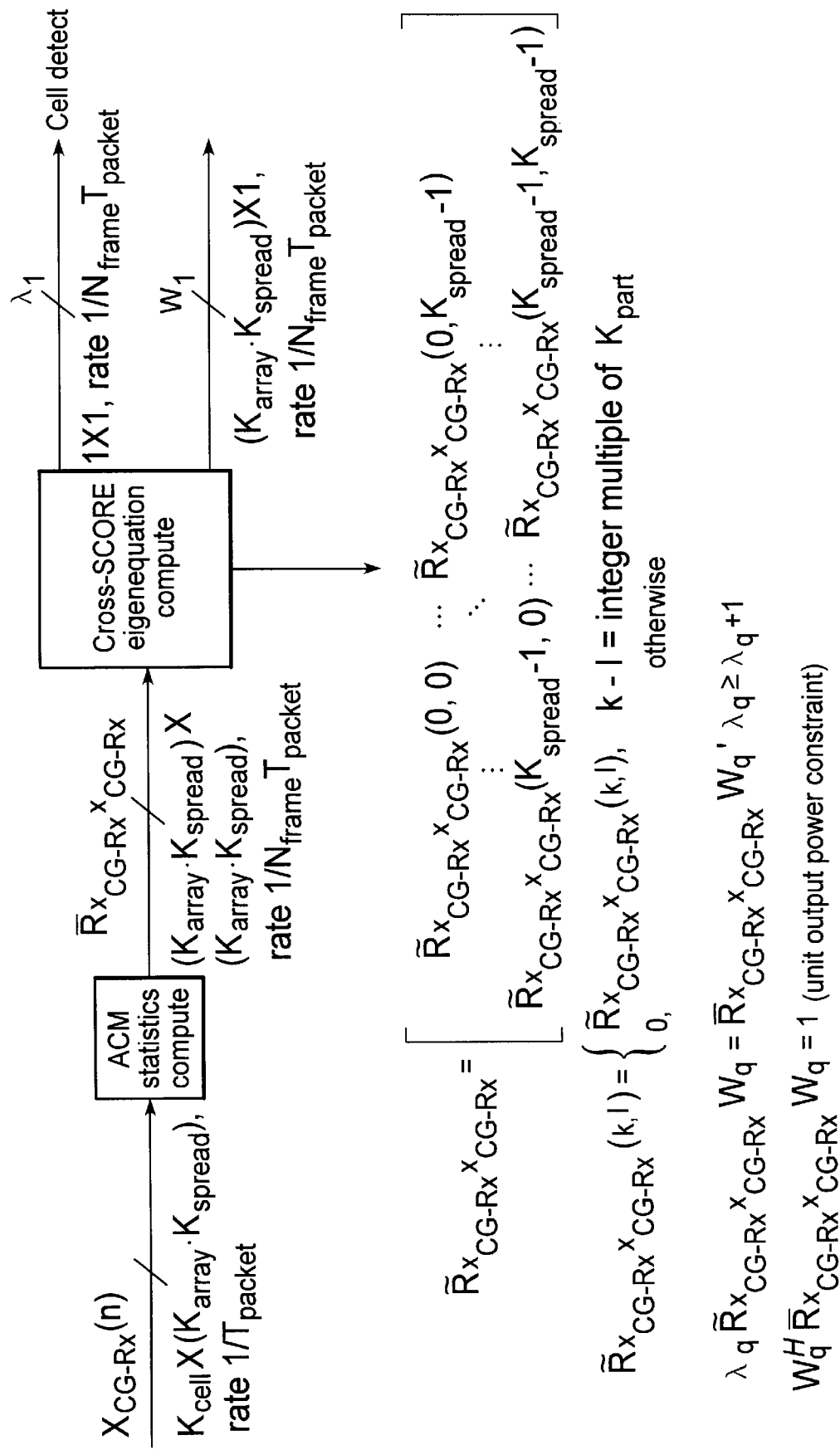
Figure 29:
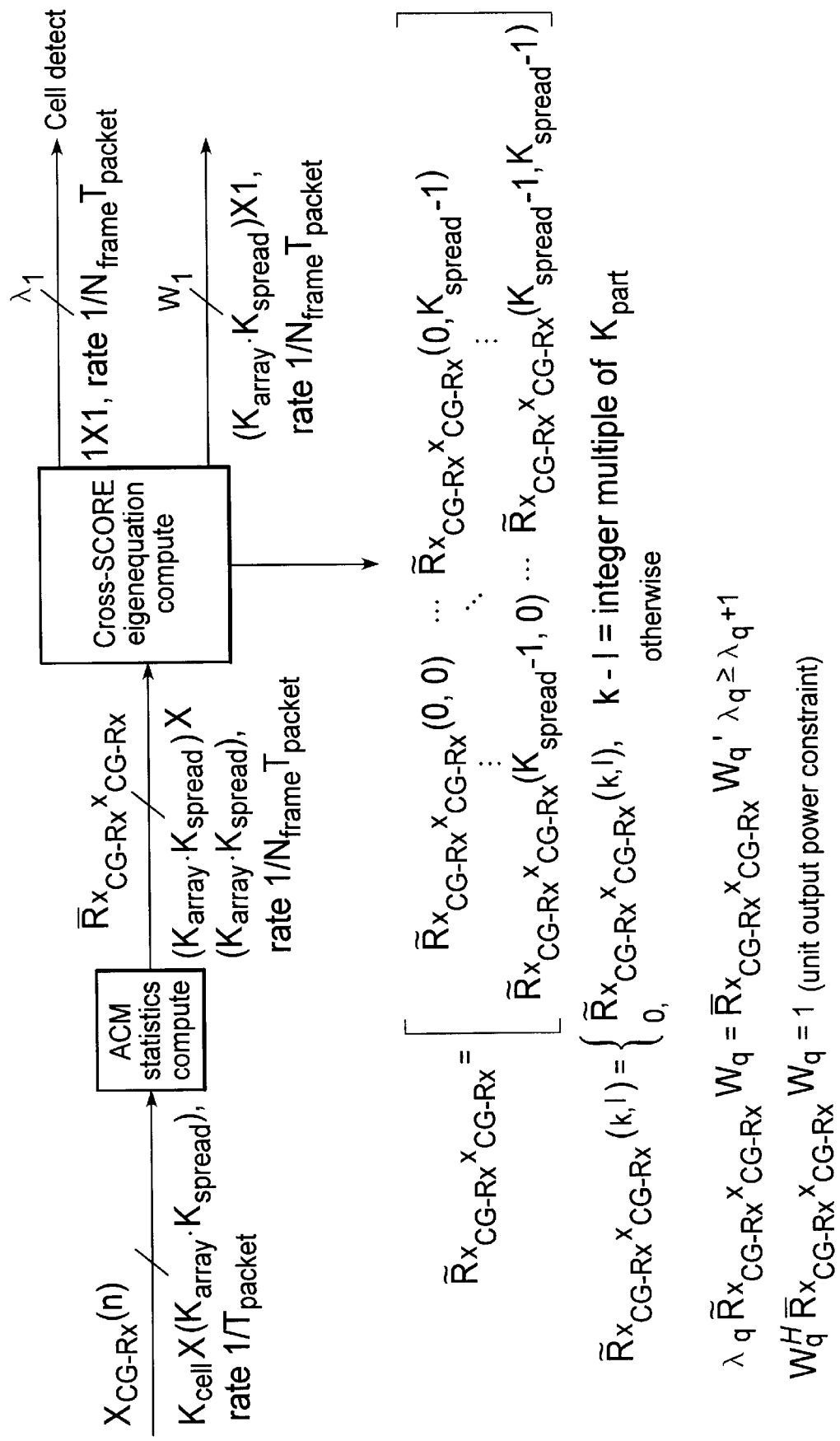
Figure 30:
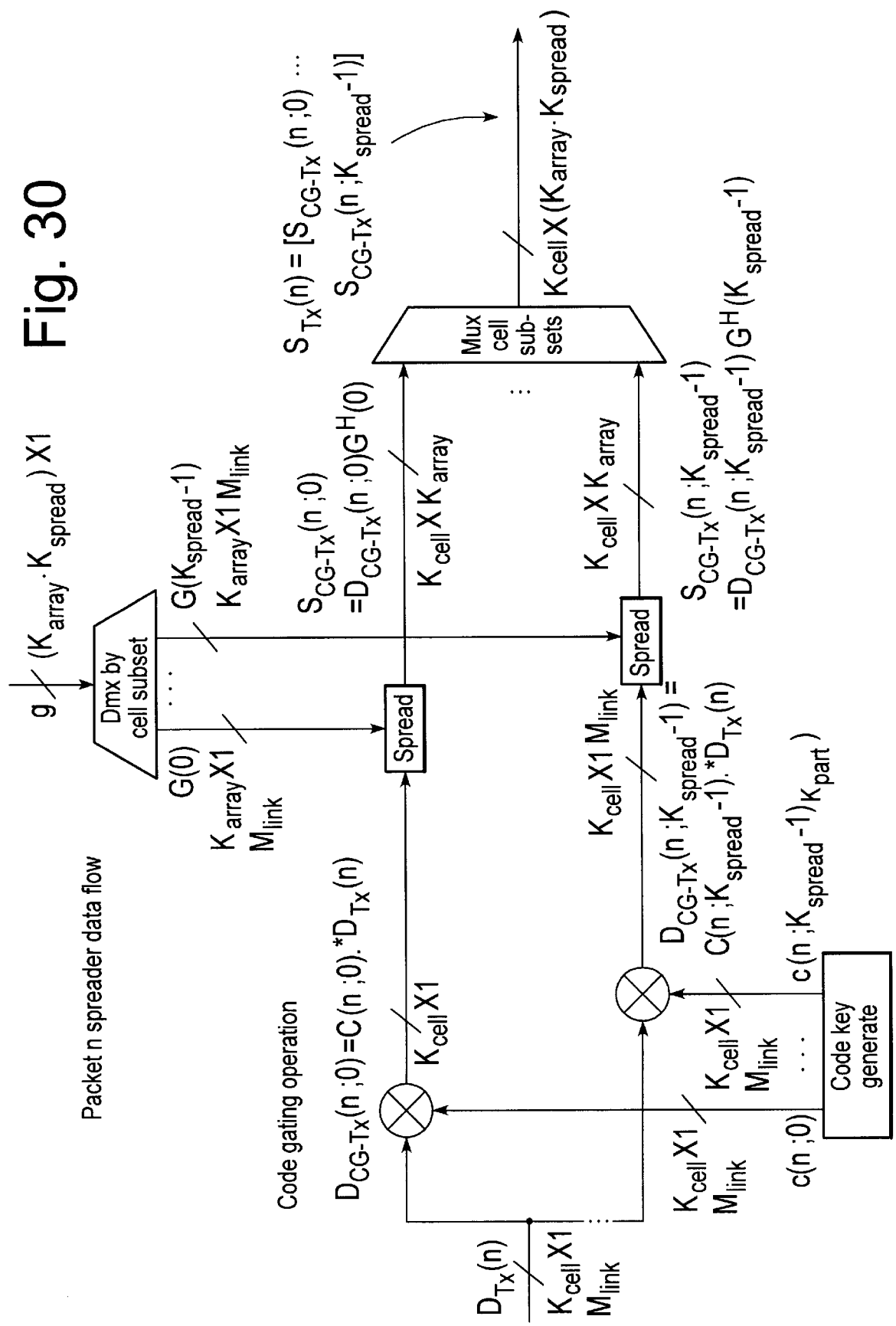
Figure 31:
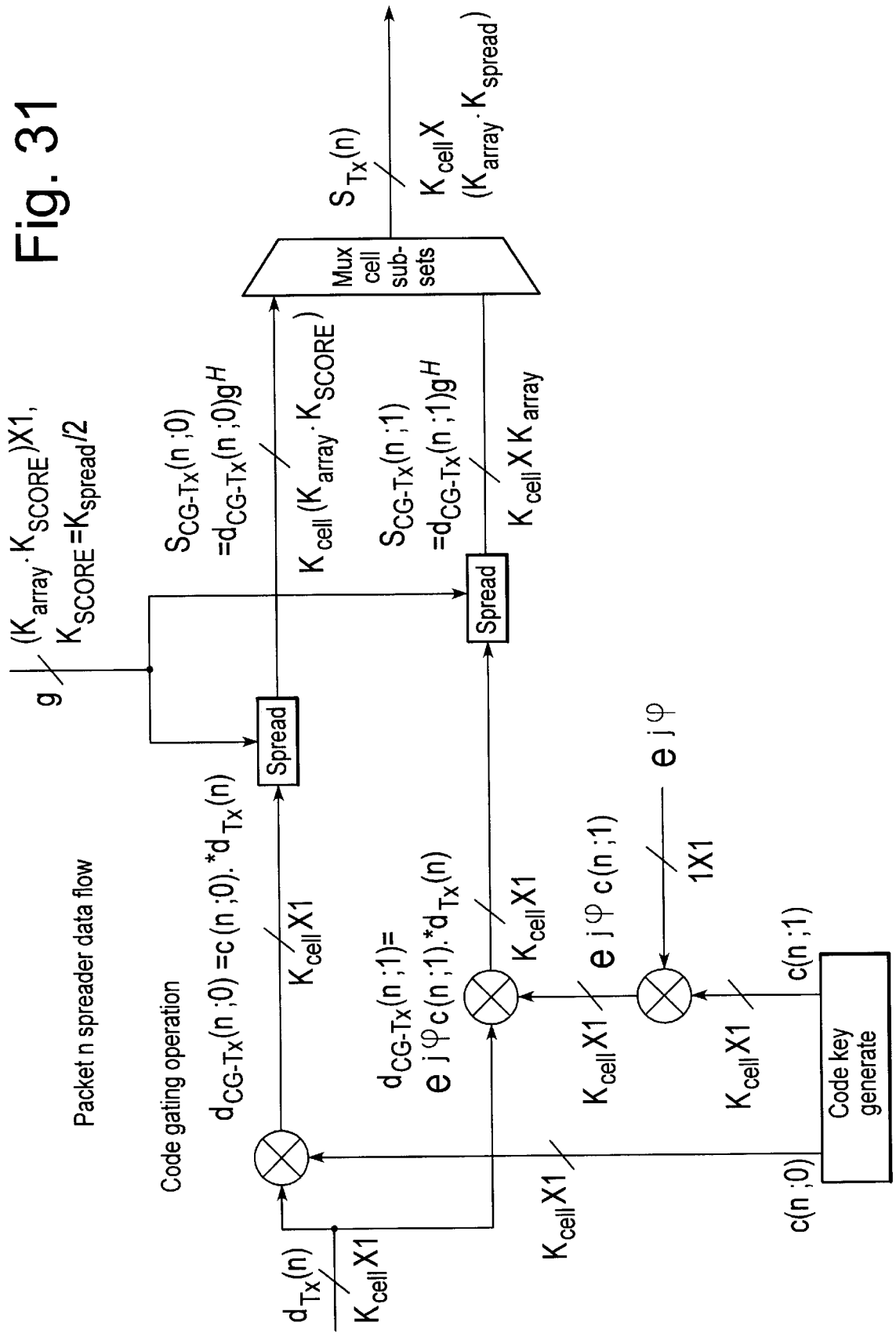
Figure 32:
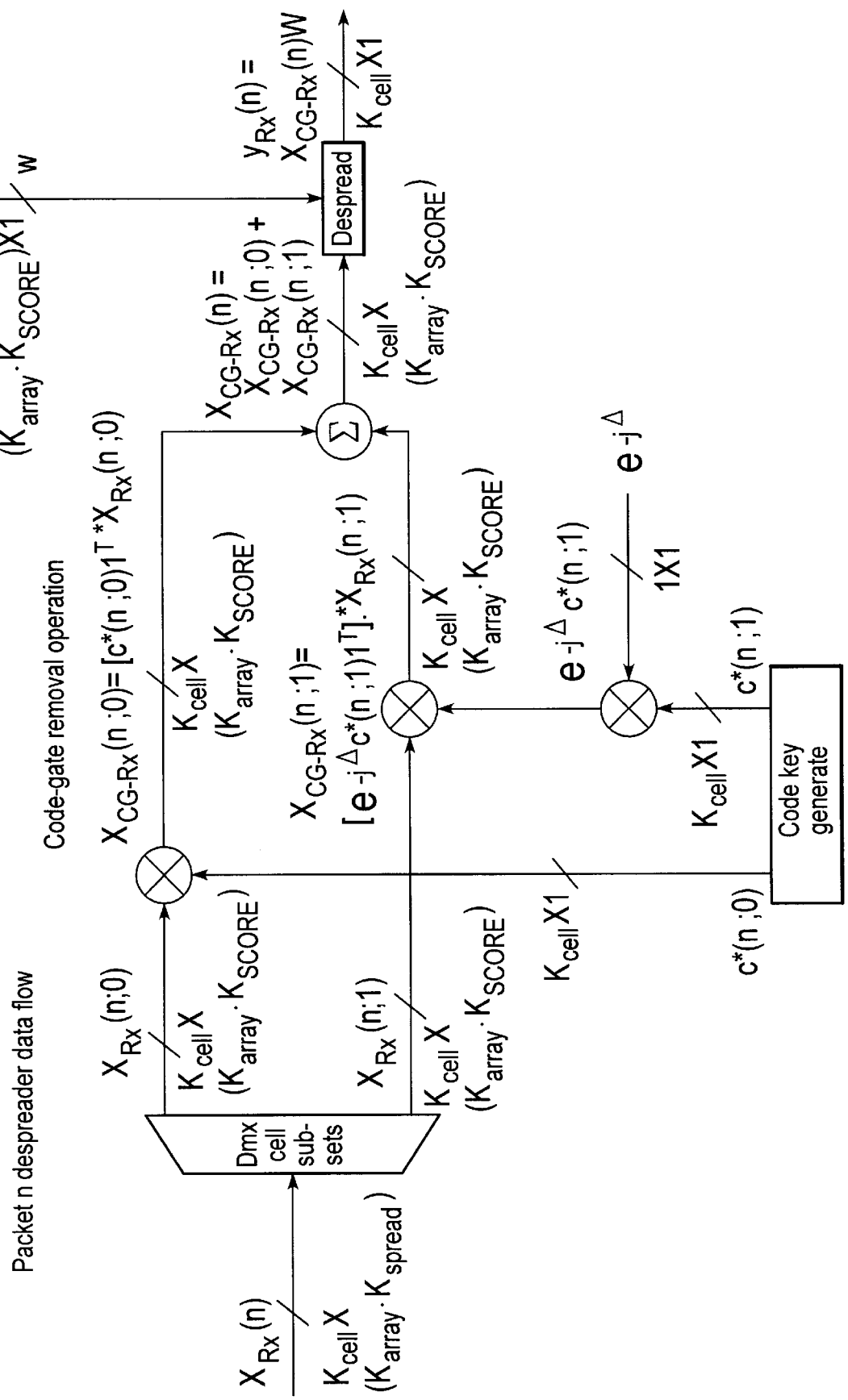
Figure 33:
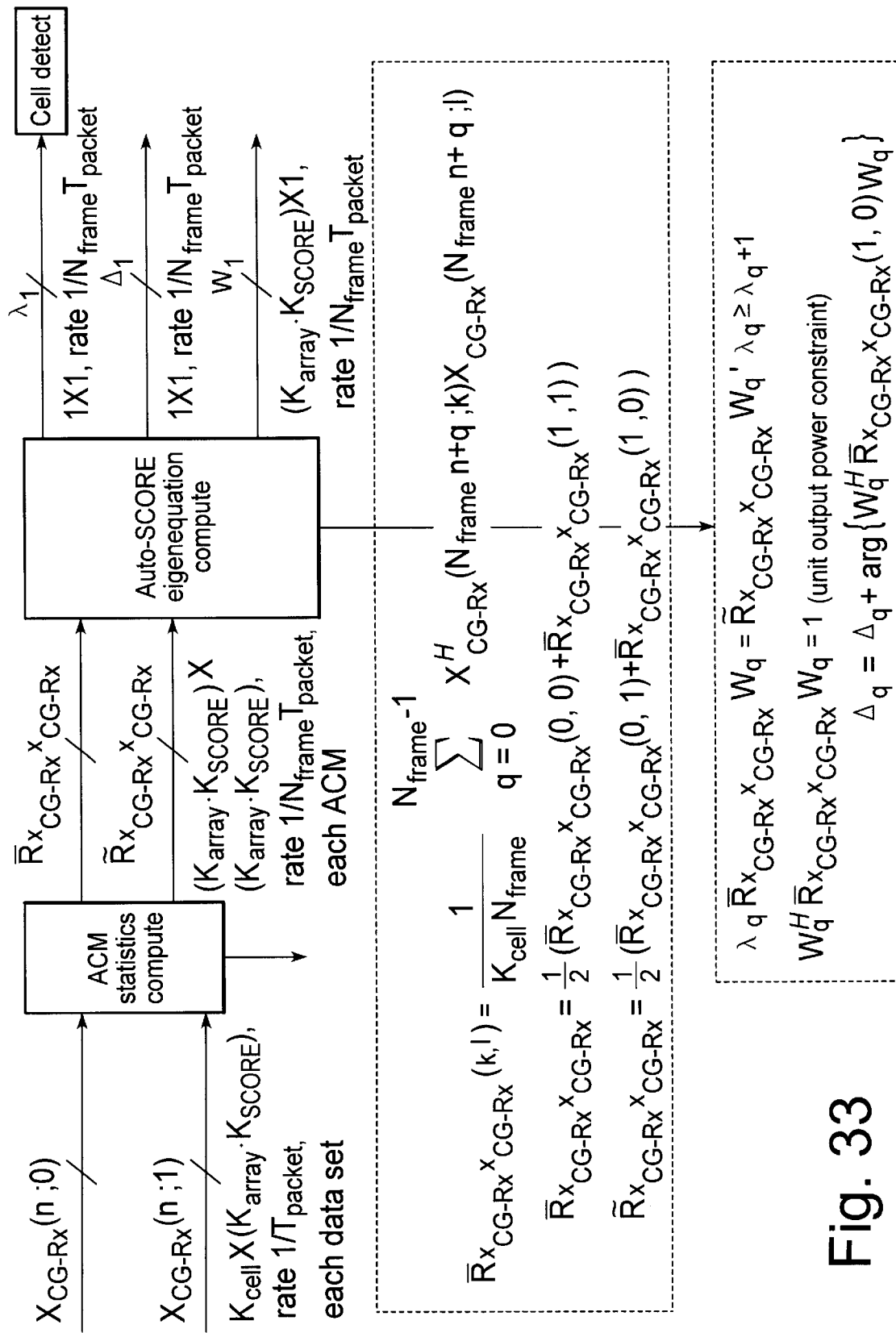
Figure 34:
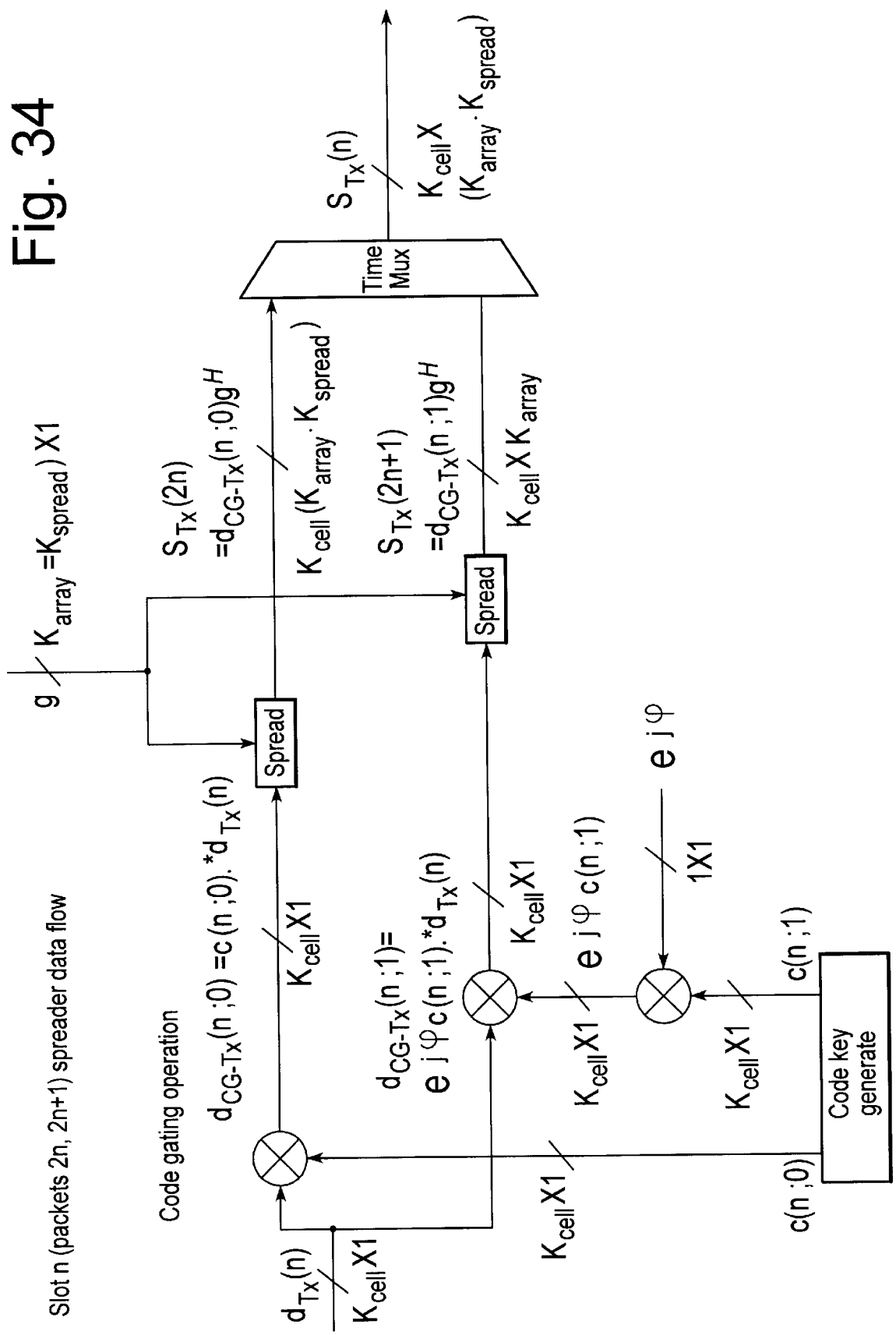
Figure 35:
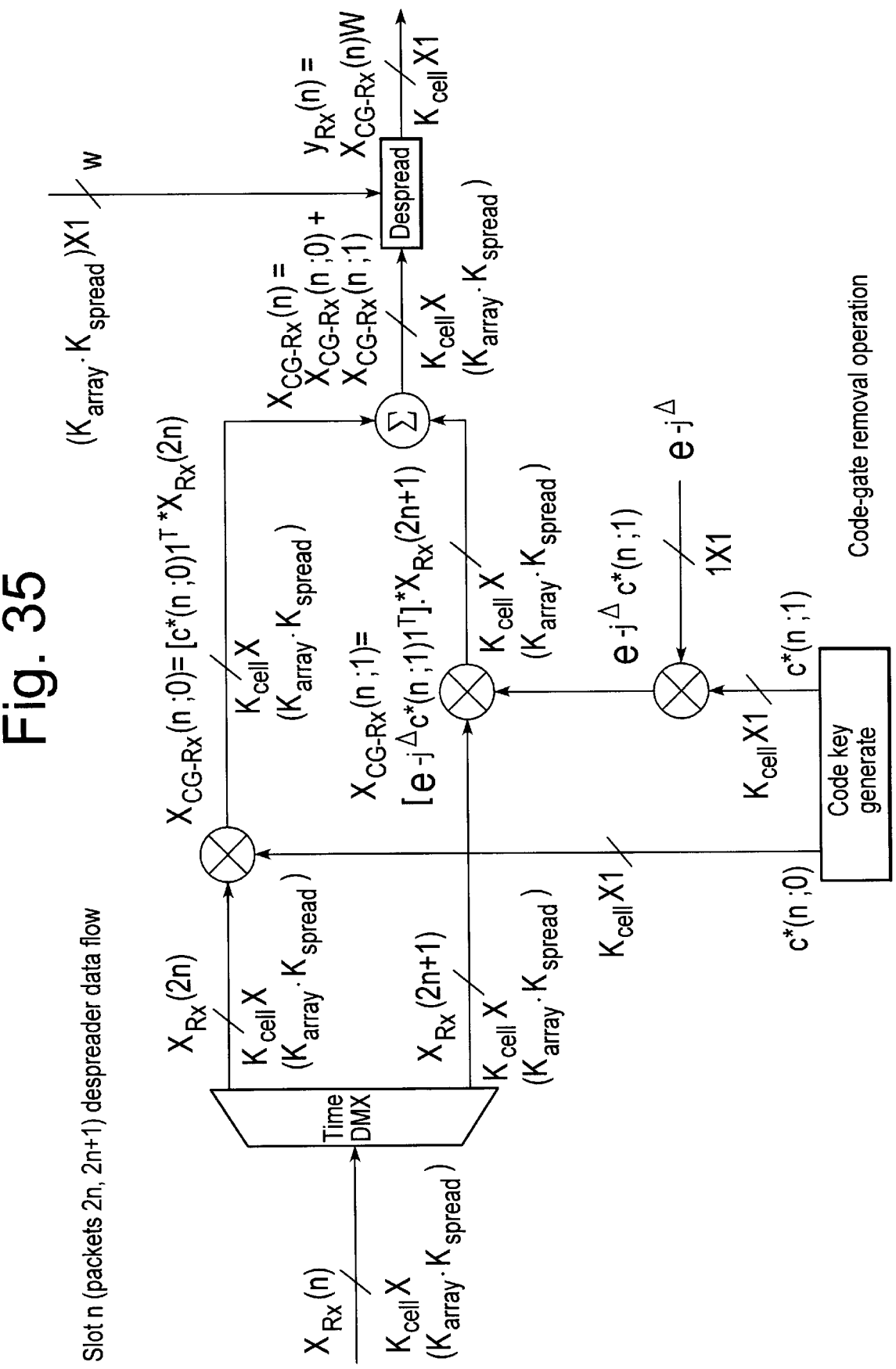

FIG. 6A is a block diagram representing another embodiment of the present invention wherein a stacked-carrier spread-spectrum transmitter bank is connected to a synchronized time-division duplexer bank that is connected to both an antenna array and a stacked-carrier spread-spectrum receiver bank with a retro-adaptor in control of the stacked-carrier spread-spectrum transmitter bank for a point-to-point transceiver system;

FIG. 6B is a block diagram representing another embodiment of the present invention wherein a stacked-carrier multiple access transmitter bank is connected to a synchronized time-division duplexer that is connected to both an antenna array and a stacked-carrier multiple access receiver bank with a retro-adaptor in control of the stacked-carrier multiple access transmitter bank for a network system;

FIG. 7A is a functional block diagram of a stacked-carrier spread-spectrum transmitter similar to those included in FIGS. 2A, 3A, 4A, 5A, and 6A;

FIG. 7B is a functional block diagram of a stacked-carrier spread-spectrum receiver similar to those included in FIGS. 2A, 3A, 4A, 5A, and 6A;

FIG. 8 is a block diagram of the base station included in the system of FIG. 1 and showing the possibility of antenna arrays that allow spatial discrimination amongst the members of the communication system. Each functional transmitter and receiver line is represented as comprising many channels in support of the basic stacked carrier spread spectrum communication medium;

FIG. 9 is a block diagram of a typical remote unit included in the system of FIG. 1 and showing adaptive channel equalization and preemphasis functions in support of the basic stacked carrier spread spectrum communication medium;

FIG. 10 is a block diagram of a multi-element T/R module that includes a plurality of individual T/R modules, one for each antenna. The system complexity can be scaled up or down with the number of antennas. Spatial processing occurs after the analog-to-digital conversion (ADC) process during the reception operation, and before the digital-to-analog conversion (DAC) operation during the transmission operation. All of the spatial as well as spectral spreading operations are performed on the digital data. All of the key frequency and clock references in the system are derived from a common clock, such as a GPS clock. A mechanism is shown for module calibration, which is necessary for accurate Retro-directivity in the TDD system;

FIG. 11 is a block diagram of a stacked carrier spread spectrum modulator wherein baseband data is replicated over $K_{spread}$ separate spreading cells multiplied by a separate scalar that is passed to a time-multiplexer for combination into a complex data vector;

FIG. 12 is a block diagram of a stacked carrier spread spectrum despreader in an all-digital fully-adaptive implementation. The despreader includes several channels for processing each of the tones in a stacked carrier spread spectrum carrier medium;

FIG. 13 diagrams an exemplary BPSK multitone having a data length of six, a spreading factor $K_{spread}$ of four and a separation between each group of two. Each group cell, g1–g4, is represented as having an independent amplitude that can be manipulated by channel equalization and pre-emphasis to combat interference and other problems;

FIG. 14 diagrams a "SCORE" processor used to restore a received signal x(t) from an antenna array. The processor controls include control filter h(t), frequency-shift value alpha and a conjugation control (*);

FIG. 15 is a dataflow diagram representing a code-gated SCORE despreading operation with gating over two cell subsets;

FIG. 16 is a dataflow diagram representing a code-gated SCORE spreading operation with gating over two cell subsets, and demonstrates a symmetry with that of FIG. 15;

FIG. 17 is a time-frequency format for a time-division duplex communication system embodiment of the present invention;

FIG. 18 is an active tone format of a basic DMT modem;

FIG. 19 is a dataflow diagram representing a transmit/receive calibration method;

FIG. 20 is a diagram of an integrated single-antenna T/R and discrete multiple tones (DMT) modem to implement a DMT based stacked-carrier multiple-access (SCMA) system embodiment of the present invention;

FIG. 21 is a general example of a single-link code-gated cross-SCORE spreader embodiment of the present invention;

FIG. 22 is a dataflow diagram representing a single-link code-gated cross-SCORE despreading operation with $K_{spread}$ cell subsets;

FIG. 23 is a dataflow diagram representing a single-link cross-SCORE algorithm with $N_{frame}$ packets/adapt frame;

FIG. 24 is a dataflow diagram representing a single adapt frame autocorrelation statistics computation;

FIG. 25 is a dataflow diagram representing a cross-SCORE eigenequation with $K_{spread}$ cell subsets;

FIG. 26 is a dataflow diagram representing a code key generator with $K_{part}<K_{spread}$ cell subsets;

FIG. 27 is a dataflow diagram representing a an equivalent code key applicator with $K_{part}<K_{spread}$ cell subsets;

FIG. 28 is a dataflow diagram representing a cross-SCORE eigenequation with $K_{part}$ cell subsets;

FIG. 29 is a dataflow diagram representing a cross-SCORE eigenequation with two cell subsets;

FIG. 30 is a dataflow diagram representing a multi-link code-gated cross-SCORE spreader embodiment of the present invention;

FIG. 31 is a dataflow diagram representing a single-link code-gated auto-SCORE spreading operation with gating over frequency and two cell subsets in an embodiment of the present invention;

FIG. 32 is a dataflow diagram representing a single-link code-gated auto-SCORE despreading operation with gating over frequency and two cell subsets;

FIG. 33 is a dataflow diagram representing a auto-SCORE eigenequation with gating over frequency and two cell subsets;

FIG. 34 is a dataflow diagram representing a single-link code-gated auto-SCORE spreading with gating over time and a rate one-half of redundancy gate; and FIG. 35 is a dataflow diagram representing a single-link code-gated auto-SCORE despreading with gating over time and a rate one-half of redundancy gate.

DETAILED DESCRIPTION OF THE PREFERRED EMBODIMENT

FIG. 1 illustrates a communication system embodiment of the present invention, referred to herein by the general reference numeral 10. The system 10 comprises a base station 11 in two-way radio communication with a plurality of remote units 12–17. The positions of the remote units 12–17 around the base station 11 in FIG. 1 represents the variety of different positions in three-dimensional space that can be assumed by all, or by one or more remotes at various points in time. The base station 11 has a multi-element antenna 18. Each remote unit 12–17 has a corresponding antenna 19–23, some or all of which may comprise multi-element antennas, e.g., antennas 16, 17 and 21. The antennas 18–23 represent alternatives that range from a single physical antenna connected to a transceiver, to separate transmit and receive antennas, and to arrays of antennas that each express differential spatial signal sensitivities. True noise invades the system 10 equally from all directions and sources of interference are typically defined by their signals which arrive from particular directions. Multipath signals between the base 11 and the remote units 12–17 represent A type of interference that can cause channel fade and other problems.

The system 10 can also include multipoint-to-multipoint and point-to-point network topologies, as represented by a second base station 25 with a multi-element antenna 26. The multipoint-to-multipoint network is a superset of that shown in FIG. 1, and is useful in cell systems where adjacent cell interface needs to be controlled. Each base or remote transceiver in the network can have arbitrarily different numbers of antenna elements and spreading factors, e.g., they may be spread over different numbers of frequency cells. Spatially localized interference can arrive from other stacked carrier networks and cells within the network and from other interferers, e.g., jammers, or FDMA signals that the network is being layered over. True noise can invade the system equally or unequally from all directions, wherein "equally" can imply isotropic noise.

The basic means of radio communication in the system 10 is, by what is called here, "stacked-carrier spread spectrum" (SCSS), wherein discrete multiple tones (DMT) having a substantial frequency diversity are simultaneously transmitted by the base station 11 and by each remote unit 12–17 to the other. One baseband data symbol is spread spectrum modulated on each set of discrete multitone transmissions from a single unit 11–17. Accurate data recovery can be accomplished by the intended receiver even though some of the individual channels carrying information on a discrete tone may have faded out or been interfered with too severely.

The present invention can further be represented in various ways, e.g., by the several combinatorial embodiments illustrated in FIGS. 2A–6B. Each of the major elements introduced in FIGS. 2A–6B are described in further detail in connection with FIGS. 7–16. The antennas in each array can have arbitrary spatial placement, e.g., the array does not require a special antenna geometry in order to function correctly.

FIG. 2A shows a point-to-point transmitter 30 comprising a stacked-carrier spread-spectrum (SCSS) transmitter bank 32 connected to a multi-element antenna array (AA) 34. A point-to-point receiver 36 comprises a multi-element antenna array (AA) 38 connected to a stacked-carrier spread-spectrum (SCSS) receiver bank 40. Each antenna array comprises a plurality of spatially separated antennas for transmitting and receiving data. Adaptive antenna array processing, e.g., adaptive linear combining and/or transmission over multiple spatially separated antennas, is not being combined here, or in FIGS. 2B, 6A or 6B, with stacked carrier spreading and despreading. The array adaptation process is subsumed into the stacked carrier spreading and despreading operation.

FIG. 2B shows a network transmitter 42 comprising a stacked-carrier multiple-access (SCMA) transmitter bank 44 connected to a multi-element antenna array (AA) 46. A network receiver bank 48 comprises a multi-element antenna array (AA) 50 connected to a stacked-carrier multiple-access (SCMA) receiver bank 52.

FIG. 3A shows a point-to-point transmitter 54 comprising a stacked-carrier spread-spectrum (SCSS) transmitter 56 connected to a time-division duplexer (TDD) 58. A point-to-point receiver 60 includes a time-division duplexer 62 connected to a stacked-carrier spread-spectrum (SCSS) receiver 64.

FIG. 3B shows a network transmitter 66 which includes a stacked-carrier multiple-access (SCMA) transmitter 68 connected to a time-division duplexer (TDD) 70. A network receiver 72 comprises a time-division duplexer (TDD) 74 connected to a stacked-carrier multiple-access (SCMA) receiver 76.

FIG. 4A shows a point-to-point transmitter 78 that comprises a stacked-carrier spread-spectrum (SCSS) transmitter 80 connected to a code nuller 82. A point-to-point receiver 84 includes a code nuller 86 connected to a stacked-carrier spread-spectrum (SCSS) receiver 88.

FIG. 4B shows a network transmitter 90 that comprises a stacked-carrier multiple-access (SCMA) transmitter 92 connected to a code nuller 94. A network receiver 96 includes a code nuller 98 connected to a stacked-carrier multiple-access (SCMA) receiver 100.

FIG. 5A shows a point-to-point transmitter 102 that includes a stacked-carrier spread-spectrum (SCSS) transmitter 104 connected to a widely separated frequency channelizer 106. A point-to-point receiver 108 comprises a widely separated frequency channelizer 110 connected to a stacked-carrier spread-spectrum (SCSS) receiver 112.

FIG. 5B shows a network transmitter 114 that includes a stacked-carrier multiple-access (SCMA) transmitter 116 connected to a widely separated frequency channelizer 118. A network receiver 120 comprises a widely separated frequency channelizer 122 connected to a stacked-carrier multiple-access (SCMA) receiver 124.

FIG. 6A shows a point-to-point transceiver system 126 wherein a stacked-carrier spread-spectrum (SCSS) transmitter bank 128 is connected to a synchronized time-division duplexer (TDD) bank 130 that is connected to both a multi-element antenna array (AA) 132 and a stacked-carrier spread-spectrum (SCSS) receiver bank 134 with a retro-adaptor 136 in control of the stacked-carrier spread-spectrum (SCSS) transmitter bank 128.

FIG. 6B shows a network system 138 that includes a stacked-carrier multiple-access (SCMA) transmitter 140 connected to a synchronized time-division duplexer (TDD) 142 that is connected to both a multi-element antenna array (AA) 144 and a stacked-carrier multiple-access (SCMA) receiver bank 146 with a retro-adaptor 148 in control of the stacked-carrier multiple-access (SCMA) transmitter bank 140.

FIG. 7A illustrates a stacked-carrier spread-spectrum (SCSS) transmitter 150 similar to those included in FIGS. 2A, 3A, 4A, SA, and 6A. The SCSS transmitter 150 includes a digital-to-analog converter (DAC) 152 that converts incoming digital data to an analog signal for transmission. Analog information for transmission may be input directly without the DAC 152. Two or more channels (e.g., 1, . . . , k) are included that each modulate corresponding radio frequency carriers in an up-conversion process. For example, each up-conversion channel comprises an inphase (I) mixer 154 and a quadrature (Q) mixer 156 connected to a 90° phase shifter 158 and a local oscillator (LO) 160. The modulating information therefore controls the amplitude of the inphase and quadrature phases of the AM carrier radio frequency. A pair of gain-controlled amplifiers 162 and 164 permit the independent adjustment of each of the inphase and quadrature amplitudes before recombining by a summer 166. A bandpass filter (BPF) 168 strips off out-of-band signals that could interfere with adjacent channels. A final summer 170 combines the signals from all of the channels and produces a transmitter output, e.g., that is then applied to an antenna. A spreading gain generator 172 periodically issues a parallel output that controls all the gain-controlled amplifiers 162 and 164 in every channel as a group. Each control signal to each gain-controlled amplifier 162 and 164 may comprise a signal digital line for one-bit on/off control, multi-bit parallel digital control for discrete "gray-scale" settings or an analog control for continuously variable gain settings.

An obvious variation on the analog circuitry shown in FIGS. 7A and 7B for the transmitter 150 and receiver 180 is to use an all-digital transmultiplexer ("transmux") design, e.g., with discrete digital logic or with a digital signal processor.

A preferred alternative to the direct or transmux spreading and despreading approaches illustrated by example in FIGS. 7A and 7B is the discrete multitone (DMT) method of orthogonal frequency division multiplexing (OFDM) described herein.

Referring to FIG. 7A, in operation of the transmitter 150, some spreading gain output from the spreading gain generator 172 is likely to exist that is more readily received by an intended receiver unit than that which would be obtained by using a different spreading gain output. The intervening radio communication environment between the transmitter and receiver will ordinarily attenuate or interfere with some phases and frequencies more than others. The radio communication environment contains co-channel interference, additive inter-network, intra-network and jamming/overlayered signals that are more readily circumvented with spreading code that cannot be eliminated at the receiver. The spreading gain output therefore has the ability to compensate for the effects of the intervening radio communication environment, both channel distortion and co-channel interference. The optimum spreading gain outputs that should be generated at any one time can be fixed in patterned sequences according to time or place, or adjusted according to the results obtained from some sort of measurement related to the communication quality, e.g., reverse channel data. The spreading code provides for the compensation for co-channel interference sources, as well as channel distortion.

FIG. 7B illustrates a stacked-carrier spread-spectrum (SCSS) receiver 180 similar to those included in FIGS. 2A, 3A, 4A, 5A, and 6A, and complementary to the transmitter 150 shown in FIG. 7A. The SCSS receiver 180 accepts analog signals at a splitter 181 which drives parallel several frequency-separated channels. A typical channel comprises a bandpass filter 182, a splitter 183, an inphase gain-controlled amplifier 184, a quadrature phase gain-controlled amplifier 185, a pair of phase detectors 186 and 187 driven by a phase shifter 188 and a local oscillator 189 and an analog-to-digital converter (ADC) 190 that combines back all the receiver channels into a digital signal. Each downconversion channel comprises inphase (I) mixer 186 and quadrature (Q) mixer 187 connected to the 90° phase shifter 188 and local oscillator (LO) 189. A despreading weight generator 191 is connected to control the individual inphase and quadrature amplifiers 184 and 185 of each channel.

A base station 230 is shown in FIG. 8. For "code-nulling", the despreading weights are adapted to maximize the signal-to-interference-and-noise ratio of the despread message sequence in the preferred embodiment; and to introduce directivity and Retro-directivity, by noting that the spreading gains are derived from the locally adapted despreading weights in the preferred embodiment. The base station 230 is similar to base station 11 (FIG. 1) and comprises an antenna array 232 for directional radio communication with remote units by beam forming, a transmit/receive (T/R) front end 234, a frequency channel bank 236, a data cell mapper 238, a weight adaptation algorithm generator 240, a multi-antenna multi-link despreader 242, a delay and Doppler estimator 243, a delay and Doppler equalizer bank 244 and a symbol decoder bank 246, e.g. a Trellis decoder, that outputs several recovered baseband data channels.

Several outgoing baseband data channels are connected to a symbol encoder bank 248, e.g. a Trellis encoder. From there, the transmission involves a delay and Doppler preemphasis bank 250, a multi-antenna multi-link spreader 252, an antenna and frequency channel mapper 254, a transmit/receive compensation bank 255 connected to a transmit/receive compensation algorithm generator 256, and an inverse frequency channelizer bank 257 connected to the T/R front end 234. A transmit/receive packet trigger 258 receives GPS time transfer information and controls the interleave and duration of individual transmit and receive times in the T/R front end 234. The base station can also have as few as one antenna element in its array. In a preferred embodiment, the base station uses a packetized time-division duplex DMT or OFDM modulator and demodulator to perform the inverse frequency channelizer and frequency channelizer operations.

For more information on the alternative use of Trellis coded modulation, see, Boulle, et al., "An Overview of Trellis Coded Modulation Research in COST 231", IEEE PIMRC '94, pp. 105–109.

A remote unit 260 is shown in FIG. 9 in a preferred embodiment. The remote unit 260 is similar to remote units 12–17 (FIG. 1) and comprises an antenna array 262 for radio communication with the base station by combined spatial and spectral diversity, a transmit/receive (T/R) front end 264, a frequency channel bank 266, a data cell mapper 268, a weight adaptation algorithm generator 270, a multi-antenna despreader 272, a delay and Doppler estimator 273, a delay and Doppler equalizer 274 and a symbol decoder 276, e.g. a data decoder, that outputs a recovered baseband data channel.

The outgoing baseband data channel is connected to a symbol encoder 278, e.g. a data encoder. The transmission further involves a delay and Doppler preemphasis unit 280, a multi-antenna spreader 282, an antenna and frequency channel mapper 284, a transmit/receive compensation bank 285 connects to a transmit/receive compensation algorithm generator 286, and an inverse frequency channelizer bank 287 connected to the T/R front end 264. A transmit/receive packet trigger 288 receives GPS time transfer information and controls the interleave and duration of individual transmit and receive times in the T/R front end 264.

The remote unit can have as few as one antenna element in its array. The number of antennas at each remote unit can vary from unit to unit. This can allow the remote units to have a variable cost, based on the importance or data rate employed by a given unit. The remote units can use different spreading rates. They can spread their data over different subsets of the frequency channels used by the base station transceiver. In a preferred embodiment, the remote unit uses a packetized time-division duplex DMT or OFDM modulator and demodulator to do the inverse frequency channelizer and frequency channelizer operations. A difference between the base station and the remote unit is that the base station transceives signals from multiple nodes, e.g., multiple access. Each remote unit transceives only the single data stream intended for it. Channel equalization techniques and code nulling are limited methods for adapting the spreading and despreading weights.

FIG. 10 illustrates a multi-antenna transmit/receive module 290. The module 290 includes a multi-element antenna array 291 with each element connected to a corresponding single-channel T/R module 292, e.g., four in number. Each T/R module 292 is connected to a packet trigger 293, a receiver calibration generator 294, a local oscillator 295 and a system clock 296. These, in turn, are driven by a GPS clock and Doppler correction signals. Each T/R module 292 comprises a T/R switch 297, an intermediate frequency (IF) downconverter 298, an analog-to-digital converter (ADC) 299, a digital-to-analog converter (DAC) 300, an IF up-converter 301 and a power amplifier (PA) 302. Receive weight information is learned during the receive process and is used in the transmit process to set the relative transmit powers applied to each antenna element, e.g., to compensate for channel fade or interference.

The receive and transmit time slots are triggered at particular times, which may be pseudo-randomly determined, according to an independent source of accurate, universally accessible time, e.g., from the global positioning system (GPS) maintained by the United States Department of Defense. Such GPS times are derived from a navigation system residing on board a communication platform such that the receiver side of each T/R module 292 always knows what time slot a packet corresponds to. The GPS time is also used to drive the local oscillator and ADC/DAC clocks used in the system. The receiver side is not necessarily synchronized to the remote transmitting source. In particular, the range, propagation delay and Doppler shift between the communicators need not be known by the receiver system prior to the reception of a first data packet. However, the range, velocity, delay and Doppler shift between the communicators may be known to some degree of accuracy in certain applications. The range, propagation delay, and Doppler shift between the communicators does not need to be known prior to reception of the first data packet.

The calibration mode is optional, and is only used on an as-needed basis. For example, intermittently, at the beginning of a given transmission, or when internal diagnostics indicate that such calibration is required.

The encoding, spreading, and modulation operations. e.g., as shown in FIG. 11, are preferably mirrored by analogous demodulation, despreading, and decoding operations, e.g., as in FIG. 12. The data flow in FIG. 11 is reflected in FIG. 12 as a signal flow, e.g., the same data flows are in both FIGS. 11 and 12, with the adders in one Fig. replaced by fan outs in the other Fig. Such symmetry is exemplified by DMT modulators and demodulators, frequency mapping and inverse mapping operations, spreading and despreading operations, and code-gated spreading and despreading operations. The structure of the spreader mirrors the structure of the despreader. Prior art CDMA transceivers do not have such symmetry. Thus, such symmetry is a critical feature in embodiments of the present invention.

FIG. 11 illustrates a discrete multitone stacked carrier spread spectrum (SCSS) modulator used for frequency channelization in the embodiment 300. A frame generation command from a navigation and coding system 302 causes a signal modulator 304 to encode ephemeris, position, velocity, acceleration, and other messages into an $K_{cell}$ symbol data vector. These symbols are then used to modulate a set of baseband tones or fast Fourier transform (FFT) bins. In a spreader 306, the $K_{cell}$ baseband tones are replicated over $K_{spread}$ separate spreading cells, multiplied by a separate spreading gain for that antenna "1" and frequency cell "h" complex, e.g., complex constant equally multiplying each symbol in the cell, and passed to a time-multiplexer that combines the cells into a $K_{active}$-long vector of complex data, where $K_{active} \geq K_{cell}*K_{spread}$. This complex data vector is passed to a zero-padded inverse-FFT operator 308 that converts the data vector directly to $K_{FFT} \geq (1+SF)*K_{active}$ real-IF time samples, wherin "SF" denotes the "shape factory", or ratio of stopband to passband for this system. The first $E_{roll}*K_{FFT}$ samples at this time sequence are then repeated 310 to form a $K_{packet}=(1+E_{roll})*K_{FFT}$-long data sequence. A multiplier 312 multiplies this by $K_{packet}$-long data from a Kaiser-Bessel window 314 to generate the final sampled signal. The sampled signal is then passed to a digital-to-analog converter resulting in a $T_{packet}$. $K_{packet}/f_s$-long data burst, passed to frequency up converter and to the communication channel where $f_s$ is the complex sample rate of the DPC/DNC nodules. The parameters used to reduce the features of the transmitted signal are all coordinated to GPS time, such that the nodes in the communication network transmit simultaneously. This process is repeated for each antenna in the system.

A symbol encoding at the baseband tones is included in the baseline system 300. Each $K_{cell}$ data bit modulates a separate tone in the signal baseband, such that a tone is phase modulated by 0 or 180° if the data bit modulating that tone is equal to zero or one, respectively. Such tone modulation is highly efficient in terms of allowable transmit power. It offers a vulnerability to radiometric detection techniques, and it allows reliable demodulation of the transmitted bit sequences at $E_b/N_0$ of as low as three dB. The BPSK format for allows the use of powerful and sophisticated methods to remove timing and carrier offsets from the despread signal, when based on the conjugate self-coherence of the tone phase sequence.

Such operations are for a single antenna, e.g., using a different complex spreading gain $g_{kl}$ for each frequency cell k and antenna l employed by the transceiver. The passage uses the packet extension factor $e_{roll}$ and the packet sample length $K_{packet}=(1+e_{roll})K_{FFT}$ samples prior to the digital-to-analog conversion operation ($T_{jacket}=(1+e_{roll}) T_{FFT}$ time duration after the DAC operation). The spreading gains $g_{kl}$ can be determined via number of means, for example, via codebook, randomly, pseudo-randomly, or adaptively, based on the despreading weights $w_{kl}$.

The number of information bits per data symbol is $K_{bit}$. The BPSK is a simple encoding strategy where encoding is ignored and $K_{bit}=1$. The platform ephemeris, position, velocity, and acceleration information, are examples of data that could be transmitted in some applications. BPSK is a preferred modulation for applications where the data rate is not the primary concern of the system.

The delay and Doppler preemphasis operation is optionally included in alternative embodiments. Such can be included after the initial packet to remove the effects of delay and Doppler shift at the intended receivers of the signal being transmitted from the DMT modulator. This operation can simplify the design of the transceivers in the network, e.g., by allowing the delay and Doppler removal operations to be concentrated at the base stations in the network.

As a generalization of the spreading concept to multiple access transceivers, a separate set of spreading gains $\{g_{kl}(m)\}$ can be used to spread the data symbols intended for user m in the multi-user transceiver.

FIG. 12 shows an all-digital fully-adaptive despread and beam-forming receiver 320. For a background of this technology see, Tsoulos, et al., "Application of Adaptive Antenna Technology to Third Generation Mixed Cell Radio Architectures", March 1994, IEEE #1-7803-1927, pp. 615–619. A frame reception command from a receiver navigation and coding system 322 causes a signal demodulator 324 to collect and convert from analog to digital a series of $T_{gate}$-long transmit frames from a $K_{array}$ of array antennas 326, where $T_{gate}$ is the time duration spanned by $K_{gate}$ samples. This includes a $T_{guard}$-long guard time slot to account for the unknown propagation delay between the transmit and receive links ($T_{gate}=T_{packet}+T_{guard}$), where $T_{packet}$ is the time span of the packet and $T_{guard}$ is the time interval spanned by $K_{guard}$ samples. A $K_{gate}$-long digitized data frame is output from each ADC and is then passed to a windowed, zero-padded sparse FFT 328 that converts the packets to the frequency domain with each tone separated by an integer number of FFT bins.

The FFT bins are passed to a demultiplexer 330 that removes any unused FFT bins from the received data set, and groups the remaining bins into $K_{cell} \times (K_{spread}*K_{array})$ data matrices containing the tones received over each transmitted spreading cell, where $K_{spread}$ is the frequency spread factor, $K_{cell}$ is the number of symbols per pre-spread data cell, and $K_{array}$ is the number of antennas. Each of the spread data cells are passed through a bank of linear combiners 332 that remove the co-channel interference covering each cell and despreads the original baseband symbol tones from the received data set. The combiner weights are adapted using a code-gated self-coherence restoral method that simultaneously despreads the received data signal and does frequency-dependent multi-antenna reception and spatial filtering of the spread signal-of-interest.

The combiner weights are used to construct a set of transmit weights to be used in any subsequent return transmission. Such tones are then passed to a delay and Doppler equalization unit 334 that estimates and removes the Doppler shift (non-integer FFT bin-shift) and message propagation delay (phase precession) from the received data set. A symbol demodulator 336 estimates the transmitted message symbols.

As a consequence the received data packet transmitted from each user is despread and extracted from the received interference environment. The processor does not require fine timing/carrier sync to the transmitter until after the baseband signal has been despread with a high signal-to-interference-and-noise ratio, even in the presence of strong noise and co-channel interference.

The $K_{cell}$ symbols transmitted from user m are extracted from the channel at the receiver by weighting each of the $K_{cell}$ tones received on frequency cell k and antenna l by the same complex despreading weights $w_{kl}(m)$, and then adding the cells together on a tone-by-tone basis, such that tone q in each received frequency cell is summed over all of the $K_{spread}*K_{array}$ frequency cells and antennas used by the system.

Each multi-element transceiver preferably has the minimum number of combined spatial and spectral degrees of freedom $K_{array}*K_{spread}$ to successfully null any non-stacked-carrier interference sources invading on each frequency cell. Any excess remaining degrees of freedom are used to improve the SINR of the despread baseband signal or to separate overlapping stacked carrier signals. The multi-element despreader weights are then adjusted to maximize the power of the despread baseband signals. This leads to code nulling solutions that can be considerably more powerful than conventional methods of despreading. The ideal despreader adjusts the despread weights to null non-stacked carrier interference sources down to a noise floor over each frequency cell, and simultaneously enhances the SINR of the despread signals. The multi-element despreader also preferably directs significantly weaker nulls against interference sources with weaker radio signals in a given frequency cell. Soft nulls can therefore be directed at interference sources received with weaker power in a given frequency cell. For example, a weaker null can be directed at the far edge of an interference source passband, if the interference source spectrum has a particularly weak value at those frequencies.

In general, the despreader weights including adaptive antenna arrays significantly improves the quality and capability of the signal transmission and reception operation. For the receiver side of a system, blind or non-calibrated methods can be used to direct near-optimal beams at signals-of-interest, and to simultaneously direct nulls at jamming signals.

In general, the despreading weights are adjusted to maximize the signal-to-interference-and-noise ratio (SINR) of the despread baseband signals, e.g., estimated data symbols. This typically results in a set of code nulling despreading weights that are significantly different than the spreading gains used to spread the baseband signals at the other ends of the link. In particular, such resultant despreading weights will simultaneously remove channel distortion, such as selective gains and fades caused by multipath. Despreading provides an optimum tradeoff between nulling interferers received by the transceiver, by maximizing signal-to-interference ratio, and maximizing the signal-to-noise ratio (SNR) of the despreader. The despreading codes in conventional DSSS and CDMA communication systems are set equal to the spreading codes at the other ends of the link and only maximize the SNR of the despread baseband signals.

Such operation is performed blindly in the preferred embodiments of the invention, the transmit spreading gains and channel distortions are not known at the despreader. This simplifies the protocols used within the network by allowing use of unknown spreading gains at the transceivers in the network. This also allows the use of adaptively determined spreading gains that are continually optimized to mitigate the noise, interference, and channel distortion encountered by the transceiver over the course of a transmission.

Such approach provides an upgrade to multi-element SCMA or SCSS transceivers using antenna arrays, by not requiring any qualitative change in the spreading, despreading, or gain/weight adaptation algorithms. A difference lies in the multi-element transceiver in the dimension of the multi-element spreading and despreading operations However, the multi-element transceiver has greater capacity due to the larger degrees of freedom that it can use to separate SCSS signals. The range and/or immunity to intercept by radiometric detection means is increased due to its ability to steer spatial beams at other communicators in the network. The immunity to jamming from non-SCSS signals is also improved due to the ability to spatially null such signals, even if they are arriving from over broad frequency ranges.

Rapid-convergence methods that function over single data packets can also be combined with frequency-channelized signals-of-interest or processor structures to allow frequency-selective nulling of the interference source signals without the need for array calibration data or the need to know or estimate the direction-of-arrival of the signal-of-interest or interference source signals. The system 10 (FIG. 1) can therefore detect and demodulate data packets in highly dynamic environments where the channel geometry is changing significantly between packets. As such, a processor could operate in the typical overloaded environments where the number of interferers are not less than the number of antennas in the antenna array for the receiver.

On the transmitter side of a system, directive or retrodirective adaptation methods can be used to either direct returning signals-of-interest back to the transmit source with maximum power and/or minimum transmit radio signals (directive mode), or to jointly direct the returning signals-of-interest back to the transmit source with minimum radiation in the direction of the interfering sources (retrodirective mode).

The directive mode is useful in applications where compatibility with non-SCSS interferers is not a primary concern to the communicator, or where interference transmission and reception platforms are not likely to be placed in the same location. This mode is also useful in applications where the communication platform is subject to heavy non-SCSS interference, such that maximum power must be delivered to the other end of the communication link.

Processors can be used to accurately measure the received signal-of-interest steering vector and direct a maximal beam back to the other end of the communication link without knowledge of the received signal-of-interest direction-ofarrival, even though the interference sources completely cover the signal-of-interest passband and packet interval. The system 10 (FIG. 1) preferably delivers a factor-of-$K_{array}$ more power to the other end of the communication link, providing the system with additional immunity to any jamming. This can be accomplished even if the other end of the communication link is transmitting and receiving over a single antenna. Conversely, the system 10 (FIG. 1) can maintain the communication link using a factor-of-$K_{array}$ less power. This reduces the geographical area within which the system can be detected by adversaries by a factor of $K_{array}$.

The retrodirective mode, embodied in FIGS. 6A and 6B as retro-adapters 136 and 148, is useful in applications where interceptors are placed in the same location with the interference sources, e.g., in order to assess the effectiveness of the jamming strategy. This strategy is most useful in underloaded environments where broadband nulls can be directed at the interference sources.

FIG. 13 illustrates a single-frame digital multitone (DMT) modulation and spreading format 340. The format 340 is used for an example environment with $K_{cell}=6$ and $K_{spread}=4$, and with each spreading cell separated by two FFT bins, so $K_{space}=2$. The six data bits to be transmitted are first transformed to a set of ±1 data symbols. The symbols energize six baseband FFT bins that are replicated over four cells of FFT bins, e.g., spreading cells, with a separate complex weighting $g_k$ on each cell. The complex weights are the spreading gains, and are randomly or pseudo-randomly set over each data packet. The spreading is performed in the frequency domain by multiplying the time-domain representation of the baseband signal by a set of superimposed, or stacked, complex sinusoid carrier waves. In practice, the spreading is done by simply energizing the bins of a large FFT, at a considerable savings in computational complexity for moderate output FFT sizes. A Kaiser-Bessel window with β=9 is used in the present invention to "fill out" the space between the tones without subjecting those tones to unacceptable interference from adjacent tones, e.g., intertone interference. In particular, the high value of β provides acceptable interference between adjacent tones and extremely low interference between farther out tones.

Non-blind or calibrated techniques use a knowledge of the baseband data sequence or channel distortion and spreading gains to develop ideal weights based on optimum signal estimation methods. For example, least-squares techniques. Blind or non-calibrated techniques use more general properties of the baseband data signals to adapt the despreading weights. Mixtures of these techniques that use known and unknown components of the baseband signal and/or the transmission channel can also be used to construct an effective solution. Examples of blind techniques that are particularly useful include, constant-modulus, multiple-modulus, and decision-direction techniques. Such use properties of the message symbol constellation to adapt the despreading weights. A number of methods can be used to adapt multi-element despreader weights in the demodulator 332 (FIG. 12). First, there are dominant-mode prediction (DMP) methods that take advantage of the known packet arrival times or known spreading parameters of the discrete multitone stacked carrier signal. Second, there are code-gated self-coherence restoral (SCORE) methods, which take advantage of the known self-coherence, or non-zero correlation between the spectrally separated signal components, in the discrete multitone stacked carrier signal.

Of these two basic kinds, the self-coherence restoral technique has the greatest utility for single-packet acquisition and detection of the discrete multitone stacked carrier signals.

Conventional spectral and other types of self-coherence restoral take advantage of the known spectral and/or conjugate self-coherence property. This is a non-zero correlation between frequency-shifted and/or conjugated components of a given communication signal. Blind methods do not require any prior knowledge of the content of the signals-of-interest or their directions-of-arrival. So no specific receiver calibration information is needed to train the antenna array for the receiver. Instead, the blind method uses its own local knowledge of the specific frequency-shifts that the signals-of-interest are correlated over. See, B. Agee, S. Schell, W. Gardner, "Self-Coherence Restoral: A New Approach to Blind Adaptation of Antenna Arrays," in Proceedings of the twenty-first Asilomar Conference on Signals, Systems and Computers, 1987. And see, B. Agee, S. Schell, W. Gardner, "Self-Coherence Restoral: A New Approach to Blind Adaptive Signal Extraction Using Antenna Arrays," IEEE Proceedings, vol. 78, No. 4, pp. 753–767, April 1990. And also, B. Agee, "The Property Restoral Approach to Blind Adaptive Signal Extraction," Ph.D. Dissertation, University of California, Davis, Calif., 1989.

In a double side band amplitude modulated signal, the real-IF representation of any such signal possesses conjugate symmetry about both its carrier frequency, due to the double side band amplitude modulated modulation format, and DC, due to the real-IF representation. These symmetries offset each other, causing the negative and positive frequency components of the signal to be equal to each other. This perfect spectral self-coherence is observed by computing the correlation coefficient between the double side band amplitude modulated signal-of-interest and a replica of itself that is frequency-shifted by twice the carrier. The frequency-shift operator mixes the negative frequency components to the frequency band occupied by the positive frequency components, causing the correlation coefficient to possess a non-zero value. Such non-zero value occurs only when this value of frequency shift is applied to the replica. The correlation coefficient is less than unity in this example. A unity correlation coefficient is obtained by filtering out the extraneous non-overlapping signal-of-interest radio signals in the original and frequency-shifted double side band amplitude modulated signals.

In FIG. 14, a cross-self-coherence restoral (SCORE) processor 350 is used to do a restoration that is applied to a multi-antenna received data signal x(t). The processor 350 first passes the received data through a series of filtering, frequency-shifting, and, optional, conjugation operators, resulting in a signal u(t) that is only correlated with the signals targeted by the processor. The original and processed signals x(t) and u(t) are then passed through a pair of beam-and-null steerers (linear element combiners) 352 and 354 that are adapted to maximize the correlation coefficient between the combiner output signals y(t)=w"x(t) and r(t)=c"u(t). The control parameters used to target the processor are the filter operator, typically set to a delay operator, frequency-shift value α, and conjugation flag (*). The processor parameters are set to values that yield strong correlation coefficients in the absence of interference, e.g., in the transmitted signal of interest to the processor.

FIGS. 15 and 16 show the code gating operation used in the general code-gated SCORE operation. Certain code-gating configurations require some significant modification to the spreader and despreader data flow, and therefore structure. These illustrate one method for enabling the code-gated SCORE despreader adaptation algorithm, described herein. Other methods exist that apply the code gating across packets or internally with frequency cells, rather than across frequency cells. For example, by repeating the data symbols with a gating code applied across the $K_{cell}$ baseband symbols over the even packets, and consequently do not affect the data flow through the spreader and despreader.

---

• Partition the spreading cells into $K_{part} \geq 2$ subsets, $K_{SCORE}$ cells/subset
—$K_{part} = K_{spread}$, cells processed in individual subsets, $K_{SCORE} = 1$ cells/subset

---

—$K_{part} = 2$, cells separated, into <u>even</u> and <u>odd</u> subsets, $K_{SCORE} = K_{spread}/2$ cells/subset
—$K_{part} \cdot K_{SCORE} = K_{spread}$ in each case
•Use same code key for every cell in subset:
—$c(n;K_{part}/+k) = c(n;k), k = 0, \ldots, K_{part}-1, / = 0, \ldots, K_{SCORE}-1$
—Alternate form: $c(n;k) = c(n;(k)_{K_{part}}), k = 0, \ldots, K_{spread}-1$, $(k)_{K_{part}} = $ modulo-$K_{part}$ of k
Transmit over multiple SCSS subchannels (stacked-carrier multiple access), using different code keys with same structure on each subchannel
—Allows separation of $K_{array} \cdot K_{SCORE}$ SCSS subchannels per subset (code nulling performed)
—Enables <u>higherdatarates</u> per user (multiple subchannels per user)
—Enables <u>multipleaccesscommunications</u> (multiple users communicating with cell)
—Enables rejection of $K_{SCORE}-1$ SCSS interferers (cellular communications)
—Requires higher time bandwidth product to achieve same misadjustment level
•In practice, $K_{part}$ adjusted to specific application
$K_{part} = K_{spread}$ in asynchronous point-to-point links, cellular overlay systems where non-SCSS interference high, fast convergence time important
$K_{part} = 2$ in point-to-multipoint links, SCMA systems where SCSS interference high

---

Code-gated self-coherence restoral takes advantage of self-coherence information that has been deliberately added by the communication system to facilitate the adaptive spreader, but that cannot be discerned without access to the gating information in the communication network. Two code-gated SCORE methods are included in the present invention.

A preferred self-coherence restoral method for multiple access communications includes applying unique code gating operations to the baseband message signals prior to the spreading operation, which is uniquely determined for each link in the system. For example, where the frequency cells are broken up into two subsets of cells, even and odd, with the code key applied over only the odd cells, as represented in FIGS. 15 and 16. The data symbols are spread over the even cells using the method shown in FIG. 11, and related text.

A similar spreading operation can be applied over the odd cells. However, the data symbols transmitted over these cells are first subjected to a code gating operation where they are multiplied by a constant modulus code key $c(m)=[c_q(m)]$ that is different for each user m in the network. This operation is reversed at the multiple access despreader. The odd frequency cells are multiplied by the conjugate of the code key $c^*(m)$ after the despreading operation, but before combining the outputs of the despreaders employed on the even and odd frequency cells. At the single-user (SCSS) transceiver, the code gating operation is only performed for the single code key employed by the SCSS transceiver.

During single-packet acquisition operations, the despread (conjugated) code key is applied to each of the odd received frequency cells and on each of the transceiver antennas, that is, before the linear combining operation.

The effect of the code gating operation is to cause the signal transmitted with that code key to have unity correlation coefficient between the even and odd frequency cells after the odd frequency cells are multiplied by the despread code key. Conversely, the same code gating operation will cause all of the other signals transmitted using different code keys to have low correlation coefficients between the even and odd frequency cells. This condition will hold regardless of the (assumed unknown) delay and Doppler shift inflicted on the received signals. The resultant signal can then be input directly to the cross-SCORE algorithm shown in FIG. 14, where x(t) is replaced by the even (not gated) frequency cells and u(t) is replaced by the odd (gated) frequency cells, and where t refers to the symbol index $q=1, \ldots, K_{cell}$ rather than a time index. The despreading weights are adapted to maximize the correlation coefficient between the outputs of the despread linear combiners applied to the even and odd frequency cells.

Such method provides for unambiguous detection and despreading of any link in the network, based only on the known code key for that link. At the single-user SCSS transceivers, the transceiver despreads only the link that it is communicating over, without the need for additional operations to acquire the link and verify that it is carrying the correct signal. The link is automatically re-acquired if it is temporarily lost due to adverse channel conditions, e.g., "port shuffling" that occurs over long transmissions. At the multi-user SCMA transceivers, the methods allows unambiguous detection, despreading, and identification of every link supported by the transceiver, without port swapping or shuffling as the channel conditions vary, based only on the known code keys used by the nodes linked to that transceiver. The code keys provide some privacy by the scrambling included in the code gating operation.

The basic code-gated SCORE method can also be generalized in many ways. In particular, code keys may be applied to the even as well as odd frequencies, in order to provide enhanced security and decorrelation between the frequency cells. The code gating may also be applied over time rather than frequency, by transmitting data symbols on consecutive packets with code gating omitted during the even packets and performed over all of the frequency cells during the odd packets. If the spreading codes are held constant over these pairs of packets, this approach allows the use of the more powerful auto-SCORE method to adapt the despreading weights.

---

•More powerful algorithm allowed in some environments
—Channel response approximated as identical or nearly identical (differs by complex scalar) on each spreading subset

---

—Background interference approximated as identical on each spreading subset
•Leads to maximum likelihood estimator
—Spreading gains forced identical or nearly identical on each spreading subset
—Despreading weights forced identical or nearly-identical -continued on each spreading subset
—Despreading weights set to dominant mode(s) of auto-SCORE eigenequation
•Has advantages over cross-SCORE eigenequation
—Lower complexity
—Lower misadjustment at same time-bandwidth product
—Forces max-SINR equal on each subset in network applications - no asymptotic misadjustment can occur
•Some disadvantages
Sensitive to modeling error if channel response truly unequal on each subset
Requires tracking/removal of timing and/or Doppler during despreading operation (algorithm typically fairly simple)

Larger numbers of frequency or packet subsets may also be used in the system, with a separate set of code keys employed over each subset. In this case, the despreader uses a generalization of the cross-SCORE method that derives from a super-vector interpretation of the cross-SCORE eigenequation. See, B. Agee, "The Property-Restoral Approach to Blind Adaptive Signal Extraction," in Proc. 1989 CSI-ARO Workshop on Advanced Topics in Communications, May 1989, Ruidoso, N.M.; and, B. Agee, "The Property Restoral Approach to Blind Adaptive Signal Extraction," Ph.D. Dissertation, University of California, Davis, Calif., June 1989. As the number of frequency subsets rises, the number of multiple access communications that can be supported by the transceiver drops, but the stability of the weight computation improves, and the noise reduction and nonstacked-carrier nulling capability of the algorithm remains unchanged. In the limit as the number of frequency subsets equals the spreading factor $K_{spread}$.

The code-gated-self-coherence restoral method extracts the signal-of-interest baseband directly from the channelized data super-vector, using the dominant mode of a multicell self-coherence restoral eigen-equation. The method simultaneously does frequency-dependent spatial filtering, combines antenna elements within each cell on the spread signal-of-interest, and despreads the resultant data signal to combine the frequency cells.

The code-gated-self-coherence restoral method can operate effectively at positive or negative receive SINRs, as long as the maximum attainable despread and beam-formed SINR of the received data packet is positive. The method adapts the antenna array as an intrinsic component of the despreading, linear combining, operator. The same method is used for arbitrary numbers of antennas, including single antenna systems where $K_{array}$=one. The code-gated-self-coherence restoral method does not require a prior knowledge of the spreading gains or underlying message sequence at any point in its implementation. The method does not require a search over time or Doppler shifted frequency to despread a message sequence.

The dominant eigenvalue of the code-gated-self-coherence restoral eigen-equation provides for detecting new signal packets when the communication link is first opened. The receiver functions in an "on-demand" basis, returning pulses back to the other end when a packet is transmitted in the communication channel.

Additional methods enhance or confirm detection of a discrete multitone stacked carrier data packet after the code-gated-self-coherence restoration. In particular, the detection reliability can be greatly enhanced by using the lesser eigenvalues of the code-gated-self-coherence restoral eigen-equation to predict the mean and standard deviation of the maximum code-gated-self-coherence restoral eigen-value. The true maximum eigenvalue is then decremented by the predicted mean and scaled by the predicted standard deviation, resulting in a much stronger trend-corrected detection statistic.

Other methods use downstream despreading and demodulation operators to confirm packets detection during the code-gated-self-coherence restoration.

Initial Doppler recovery during acquisition of the first data packet, uses a frequency-domain analog of a fractional-spaced equalizer by extracting the first data packet at the full remode of the receive-site FFT, and sub-sampling the resultant output signal down to the transmit-site frequency remode using a linear interpolation method. The linear combining weights re-sample the data to tone centers using some appropriate adaptation method. A least-squares property restoral algorithm, such as a constant modulus method, minimizes the variations in the modulus of the despread data symbols. The least-squares constant modulus method takes advantage of the property that the transmitted data tones have a constant modulus if they are generated using a BPSK modulation format. But this property is destroyed if the transmitted signal is subjected to a Doppler shift that is a non-integer multiple of the tone spacing. The least-squares constant modulus method restores this property to the despreader output signal. The overall technique operates in the presence of significant Doppler shifts and path delays. See, B. Agee, "The Least-Squares CMA: A New Approach to Rapid Correction of Constant Modulus Signals," in Proc. 1986 International Conference on Acoustics, Speech and Signal Processing, vol. 2, pg. 19.2.1, April 1986, Tokyo, Japan.

Two general methods are useful in generating the antenna array weights for data transmission. Retrodirective transmission sets the transmit weights proportional to the conjugated receive weights, and the directive mode sets the transmit weights proportional to the conjugated packet steering vectors. The retrodirective mode is well suited to commercial telecommunications and military intraflight communication applications where the interfering signals may be the other members in a multipoint communication network.

The directive mode is most useful in applications where the covert nature is of primary concern to the communicator and the jamming and interception platforms are not likely to be placed in the same location. This mode is useful in applications where the communication platform is subject to heavy interferences, such that maximum power must be delivered to the other end of the communication link in order to communicate in the presence of the interfering radio emissions. However, this method does not possess the attractive property of directing energy away from other interferers in cooperative communication networks.

The directive mode also constitutes a multiplier adaption strategy that can greatly simplify the complexity of the despreader if large spectral spreading factors are employed by the airlink.

The retrodirective transmission mode is illustrated herein. The retrodirective mode sets the transmitter antenna array weights equal to the conjugated array weights computed during signal reception. If the transmit and receive operators are done over the same frequency band and any internal differences between the transmit and receive paths are equalized. Then the transmitter antenna array will have the same gain pattern as the antenna array for the receiver. The transmitter antenna array will estimate the direction of nulls in the direction of any interferers that were present during signal reception. The null depths to use for each are determined by the relative strengths of the received interferers.

Throughout here, $g_k$ is a $K_{array} \times 1$ dimensional vector, and represents the multi-element spreading vectors employed at transmit over frequency cell "k". The multi-element despreading vectors used at the receiver over frequency cell "k" is represented by $w_k$ is also a $K_{array} \times 1$ dimensional vector.

Embodiments of the present invention are preferably configured to provide frequency selective transmit weights by spreading the transmit packet using a different set of $K_{arry} \times 1$ spreading ($g_k$) weights over each spreading cell. This sets the frequency-selective retrodirective transmit weights, by setting the (multi-element) spreading gain $g_k$ proportional to the $K_{array} \times 1$ linear combiner despreading weights $w_k$ employed over each frequency cell during signal reception such that $g_k = \lambda \ w_k^-$. This mode is especially effective in environments dominated by broadband interference sources, since the resultant null depths will be limited by the antenna array dispersion realized over each frequency cell. In this case, the processor will null the interference source over frequency as well as space. The transmitter antenna array only nulls each interference source over the frequency cells occupied by that interference source. This is fine for receiving a signal-of-interest packet, but it is ineffective for transmitting a packet if the goal is to direct packet radio signals away from interference source locations over the entire packet passband. Such a goal cannot be met by any means if the number of partial-band interference sources equals or exceeds the number of elements in the antenna array.

The directive transmission mode sets the transmitter antenna array weights equal to the (conjugated) $K_{array} \times 1$ packet steering vector. If the transmit and receive operators are done over the same frequency band, with appropriate equalization of any differences between the transmit and receive paths past the transmit/receive switch, then the resultant antenna array will direct maximum radio energy to the other end of the communication link or close the link with minimum transmit radio energy. The directive array typically ignores the locations of the interference sources, e.g., it implicitly assumes that the interceptors are anywhere in the field of view of the communication link.

The directive method can be implemented on a frequency-selective basis in the present invention. This can provide some benefit in exceptionally wideband communication links, e.g., due to large values of $K_{spread}$, or over highly dispersive communication channels where the packet steering vector changes significantly over the packet passband. However, this is unimportant because the maximum power mode is not strongly degraded by minor errors in the packet steering vector.

Such estimation error can be large if the communication link is heavily jammed, or if the packet steering vector must be estimated over short communication intervals, e.g., single packets. In particular, an overly simple method can cause the directive transmitter antenna array to point strong beams of transmission energy at the interference sources in the environment. A directive transmission method or packet steering vector estimator needs to be simple enough to implement inexpensively, but sophisticated enough to reliably operate under expected ranges of jamming and transmission scenarios.

Three general steering vector estimation methods are preferred. First, correlative methods, which estimate the packet steering vector using the correlation between the received and estimated packet data. Second, multicell ML-like methods, which estimate the packet steering vector using the maximum-likelihood (ML) estimator obtaining under appropriate simplifying conditions and in the presence of frequency-channelized (multicell) data. And third, parametric methods, which further refine the multicell estimators by constraining the packet steering vector using appropriate parametric models.

The correlative method is the simplest method of the three to estimate the packet steering vector. A weakness of this method is seen by considering the estimate obtained in the presence of a single interference source, the estimate reduces to the packet steering vector plus the interference source steering vector scaled by the cross-correlation between the received interference source and packet signals. The time-bandwidth product (samples) required to reduce this cross-correlation to zero is much larger than the 1/S of the interference source signal, for example, 1,000,000 samples if the interference source is fifty dB stronger than the packet signal. As a consequence, this method is usually inadequate.

The other two methods can overcome this limitation by using optimal maximum likelihood (ML) estimation procedures to estimate the packet steering vector. The resultant estimators can provide accurate steering vector estimators in the presence of broadband or partial-band interference sources, using simple (non-parametric) or sophisticated (parametric) steering vector models. Moreover, the performance of these estimators can be predicted using conventional Cramer-Rao bounds analysis.

A useful performance bound is derived for any non-parametric steering vector estimate obtained in a multicell environment. The received data is partitioned into $K_{spread}$ separate frequency cells, each containing a known (or estimated) packet baseband scaled by an unknown complex steering vector and corrupted by additive complex Gaussian interference. The steering vector in the Pe cell is modeled by $a_k = g_k$ a where "a" is the (frequency-independent) packet steering vector and $g_k$ is the scalar received single-antenna packet spreading gain obtaining over the $k^{th}$ spreading cell. The complex Gaussian interference is assumed to be independent from cell to cell, and temporally-white with mean zero and unknown autocorrelation matrix $\{R_{i_k i_k}\}$ in the $k^{th}$ cell.

The packet steering vector a is assumed to be an arbitrary complex of dimension $k_{array}$ vector of dimension $K_{array}$, e.g., a is not constrained to adhere to any parameterized model set (for example, an array manifold parameterized with respect to azimuth and elevation). Steering vector estimates developed using this model are e.g., non-parametric techniques. See, H. Van Trees, Detection, Estimation, and Modulation Theory, Part I, New York: Wiley, 1968. Using Cramer-Rao bounding theory, any unbiased estimator of a will have an estimation accuracy (mean-squared error) bounded by the Cramer-Rao bound given. The matrix R is interpreted as a generalized "average" of the interference autocorrelation matrices $\{R_{i_k i_k}\}$ equal to the inverse of the averaged inverse autocorrelation matrices.

In the preferred embodiment, the spatial steering vector a and the spectral spreading gains ($g_k$) are iteratively computed using the formula $$R = \left( \sum_{k=1}^{K_{spread}} |g_k|^2 R_{w_k w_k}^{-1} \right)^{-1} ;$$

$$a = R\left(\sum_{k=1}^{K_{spread}} g_k w_k\right); \text{ and}$$

$$g_k = \frac{w_k^H a}{a^H R_{w_k w_k}^{-1} a}$$

where $R_{K_k K_k}$ is the data autocorrelation matrix measured over an adaptation block at spectral cell k, and $w_k$ are the spatial component of the despreading weights employed at spectral cell k. The steering vector and spreading gains can also be used to compute improved despreading weights $w_k$, which can then be used in a multiple despreading procedure that performs spatial processing (linear combining at each frequency cell) followed by spectral processing (linear combining over frequency cells).

The stacked-carrier spread spectrum radio communication devices shown in FIGS. 1–14 in combination with code nulling techniques represent alternative embodiments of the present invention. Code nulling interference cancellation techniques can be effectively combined with stacked-carrier spread spectrum techniques. For more on code nulling design, see, Brian Agee "Solving the Near-Far Problem: Exploitation of Spatial and Spectral Diversity in Wireless Personal Communication Networks", *Wireless Personal Communications*, edited by Theodore S. Rappaport, et al., Kluwer Academic Publishers, 1994, Chap. 7. And see, Sourour, et al., "Two Stage Co-channel Interference Cancellation in orthogonal Multi-Carrier CDMA in a Frequency Selective Fading Channel", IEEE PIMRC '94, pp. 189–193. Further see, Kondo, et al., "Multicarrier CDMA System with Co-channel Interference Cancellation", March 1994, IEEE, #0-7803-1927, pp. 1640–1644.

The basic stacked-carrier spread spectrum radio communication devices shown in FIGS. 1–14 may be combined in multiple-access embodiments of the present invention that separate simultaneous independent channels by space, frequency and/or code, e.g., space division multiple access (SDMA), frequency division multiple access (FDMA), and code division multiple access (CDMA).

In SDMA embodiments, antenna arrays are used that can be selectively directed in space, e.g., to establish a minimum of two zones. Each transmitter and receiver pair in a zone tunes its corresponding antenna array to embrace only the other one in its transmitter-receiver pair and to exclude other pairs in other zones that represent the other multiple access channels. Embodiments of the present invention distinguish themselves by combining SDMA techniques with stacked-carrier spread spectrum techniques. For more on SDMA design, see, Forssen, et al., "Adaptive Antenna Arrays for GSM900/DSC1800", March 1994, IEEE #0-7803-1927, pp. 605–609. And see, Talwar, et al., "Reception of Multiple Co-Channel Digital Signals using Antenna Arrays with Applications to PCS", 1994, IEEE #0-7803-1825, pp. 790–794. Further see, Weis, et al., "A Novel Algorithm For Flexible Beam Forming For Adaptive Space Division Multiple Access System", IEEE PIMRC '94, pp. 729a–729e. The combination of CDMA with antenna arrays is addressed by, Naguib, et al., in "Performance of CDMA Cellular Networks With Base-Station Antenna Arrays: The Downlink", 1994 IEEE, #0-7803-1825, pp. 795–799. And see, Xu, et al., "Experimental Studies of Space-Division-Multiple-Access Schemes for Spectral Efficient Wireless Communications", 1994 IEEE, #0-7803-1825, pp. 800–804. And further see, M. Tangemann, "Influence of the User Mobility on the Spatial Multiplex Gain of an Adaptive SDMA System", IEEE PIMRC '94, pp. 745–749.

In FDMA embodiments, subsets of the multiple carriers are used for each channel, e.g., a minimum of two subsets each having a minimum of two frequency diverse carriers to establish a minimum of two channels. Each transmitter and receiver pair in a zone tunes its corresponding carrier subset to exclude other carrier subsets that represent the other multiple access channels. Embodiments of the present invention distinguish themselves by combining FDMA techniques with stacked-carrier spread spectrum techniques.

In CDMA embodiments, several spreading and despreading weights are used, one set for each channel. Such multiple access is used by navigation receivers in the global positioning system (GPS). Embodiments of the present invention distinguish themselves over the prior art by combining CDMA techniques with the stacked-carrier spread spectrum techniques illustrated in FIGS. 1–14. For more on CDMA design in a multi-carrier environment, see, Fettweis, et al., "On Multi-Carrier Code Division Multiple Access (MC-CDMA) Modem Design", 1994 IEEE #0-7803-1927, pp. 1670–1674. And see, DaSilva, et al., "Multicarrier Orthogonal CDMA Signals for Quasi-Synchronous Communication Systems", IEEE Journal on Selected Areas in Communication, Vol. 12, No. 5, June 1994. And also, Reiners, et al., "Multicarrier Transmission Technique in Cellular Mobile Communications Systems", March 1994, IEEE #0-7803-1927, pp. 1645–1649. Further see, Yee, et al., "Multi-Carrier CDMA in Indoor Wireless Radio Networks", IEEE Trans. Comm., Vol. E77-B, No. 7, July 1994, pp. 900–904. Using CDMA in the presence of fading channels is addressed by, Stefan Kaiser, "On the Performance of Different Detection Techniques for OFDM-CDMA in Fading Channels", Institute for Communication Technology, German Aerospace Research Establishment (DLR), Oberpfaffenhofen, Germany, 1994. And see, Chandler, et al., "An ATM-CDMA Air Interface For Mobile Personal Communications", IEEE PIMRC '94, pp. 110–113. And further writing on this technology is, Chouly, et al., in "Orthogonal multicarrier techniques applied to direct sequence spread spectrum CDMA systems", 1993 IEEE, #0-7803-0917, pp. 1723–1728.

A combination of multi-carrier CDMA and decorrelating interference cancellation is described by, Bar-Ness, et al., in "Synchronous Multi-User Multi-Carrier CDMA Communication System With Decorrelating Interference Canceller", IEEE PIMRC '94, pp. 184–188.

A multiple-access method for stacked-carrier spread spectrum radio communication comprises constructing at a transmitter a stacked-carrier spreading gain from the complex amplitude and phase gain of a complex sinusoid for each of a plurality of discrete frequency channels. Then, spreading at the transmitter an arbitrary narrow-band baseband data with a vector multiplier and an inverse frequency channelizer. The next step is to simultaneously transmit from the transmitter the data after spreading over the plurality of discrete frequency channels with the stacked-carrier spreading gain. The receiver despreads the plurality of discrete frequency channels with a vector inner product linear combiner and frequency channelizer, so the arbitrary narrow-band baseband pre-spread data is recovered with relative immunity to channel interference. The frequency channels may be non-contiguous and distributed within multiple bands. Alternatively, the transmitting is such that the frequency channels overlap and include orthogonal frequency-division multiplex-like modulation formats. And alternatively, the transmitting of the data is in packets, wherein baseband data is spread, transmitted, and despread in discrete packets in an orthogonal frequency-division multiplex-like-based frequency channelizer structure.

Packets may be overlapped, contiguous, or non-contiguous in time. The preferred embodiment sequentially transmits one or more packets after sequentially receiving one or more packets from the other end of the link. Sequential transmission and reception of multiple packets can allow asymmetric communications, e.g. by transporting more packets in one direction than the other, and can provide increased guard time between transmit and receive mode, for example to combat base-to-base interference problems in cellular communication networks.

Combining discrete multiple tone orthogonal frequency-division multiplex-like and antenna array processing techniques with discrete multiple tone-stacked carrier and antenna array processing techniques takes advantage of dispersion-free properties of discrete multiple tones and discrete multiple tone-stacked carriers. A significant improvement in the performance of adaptive antenna arrays in any application requiring spatial interference cancellation is possible by eliminating the need to mitigate stationary and quasi-stationary linear dispersion ahead of the adaptive receiver (e.g., due to front-end receiver imperfections, non-zero array apertures, and fixed multipath scatterers and reflectors). This is particularly useful in cellular point-to-multipoint communication networks including space division multiple access (SDMA) topologies for communicating between multiple users on the same set of frequency channels, since each spatial processor must form (potentially) deep nulls in the direction of the interfering users within that cell.

Code division multiple-access (CDMA) transmits multiple signals over the same set of frequency channels using linearly independent (typically orthogonal) sets of spreading gains. These codes are separated at a despreader using appropriate combiner weights.

Direct-sequence spread spectrum systems can benefit from space-division multiple-access type multiple access, interference excision, and channel equalization capability (code nulling technique). Code nulling has been applied to modulation-on-symbol direct-sequence spread spectrum (MOS-DSSS) or modulation-on-pulse direct-sequence spread spectrum (MOP-DSSS) formats where the period of the spreading gain is exactly equal to an integer number of message symbols (nominally one symbol interval). Code nulling may be usefully combined with stacked carrier modulation formats, e.g., for cancellation of spectrally redundant interferers in an HF/VHF frequency hopping intercept system. In the prior art, general frequency hopping intercept techniques including code nulling interference cancellation have been used with a stacked carrier signal simulating a troposcatter communication link. But this technique is extended by the present invention to point-to-point and point-to-multipoint communications where the intended communicators, as well as the interferers, include stacked-carrier spread spectrum modulation formats. For example, data-directed blind adaptation methods are further included to optimize the despreaders based on known properties of the traffic and pilot data transported by the communication systems.

The present invention combines stacked-carrier spread spectrum-based communications and code nulling based interference cancellation for a communication system with higher capacity, higher tolerance to channel distortion, and less reliance on correlation between spreading gains. Near-orthogonality is not required, and embodiments of the present invention have less sensitivity to narrow-band interference or other system member stacked-carrier spread spectrum signals. Such effects are optimized when code nulling based interference cancellation is combined in a stacked-carrier spread spectrum communication network. In particular, a stacked-carrier spread spectrum communication link including code nulling based interference cancellation can support twice as many links as the equivalent modulation-on-symbol-direct-sequence spread spectrum system, given the same spreading gain and code nuller (linear combiner) complexity.

The present invention combines code nulling based interference cancellation and data-directed methods used to adapt the despreaders in the network. Such combination provides a system with significant advantages over competing methods for point-to-point and point-to-multipoint (multiple access) communications. Such systems can take advantage of a full time-bandwidth product of the communication system, thereby reducing the acquisition and tracking time of the despreaders in the system. Such systems also despread and demodulate intended stacked-carrier spread spectrum signals of interest to the despreader, without knowledge of the spreading gains included at the signal transmitters (blind despreading property) thereby simplifying or eliminating the code selection strategy used in the network, and allowing the use of retrodirective techniques that optimize the spreading gain based on the communication channel and network. Null interfering (in-cell or out-of-cell) stacked-carrier spread spectrum signals are received by the despreader, without knowledge of the spreading gains or content of the interfering signals, thereby providing significant complexity improvements over (typically nonlinear) sequential methods that must demodulate and re-modulate the interferers as well as the signals of interest to the receiver. Automatic compensation is provided for stationary linear channel dispersion, including dispersive effects induced within the system front-end, without knowledge or actual estimation of the channel dispersion, thereby reducing the complexity of the despeading methods as well as the system hardware.

Code nulling extends to spatial processing techniques, and facilitates the use of retrodirective transmission methods to greatly improve the performance and cost efficiency of the overall network.

Combining code nulling and spatial processing techniques with adaptive antenna arrays for beam-steering improves the range of an otherwise conventional communication transceiver. The combination can also increase the capacity of a multicell network by reducing the interference presented to adjacent cells. The null-steering for interference cancellation improves the capacity of a communication network by allowing tighter packing. The tighter packing is made possible by separating the frequency-coincident in-cell users in space-division multiple access topologies. Antenna arrays can be combined with code nulling techniques in a straightforward manner by increasing the code-nuller dimensions to combine spatial channels as well as time channels, e.g., in MOS-DSSS systems, or by increasing the code-nuller dimensions to combine spatial channels as well as frequency channels, e.g., in stacked-carrier spread spectrum systems.

The stacked-carrier spread spectrum modulation format for allows a despreader to reduce the stacked-carrier spread spectrum spreading gain as the number of spatial channels grows, in order to keep the complexity of the code nuller constant as a function of the number of antenna elements. This provides constant data-directed receiver adaptation time. The linear complexity growths as the number of antenna and users in the communication link grows. And, the spatial distribution of users is reduced as the number of antenna beams grows.

The combination of code nulling data-directed-adaptation retrodirective transmission techniques and stacked-carrier spread spectrum modulation provides a superior communications mode. Point-to-point, as well as point-to-multipoint communication links, have increased user capacity, range, power and/or cost efficiencies that exceed those for full channel preemphasis methods.

Combining stacked-carrier spread spectrum and adaptive antenna array processing helps to remove spatially coherent interference, e.g., in cellular stacked-carrier spread spectrum networks where the interferers can be other member signals in the network, and where multi-element antenna arrays are used mainly at the base stations in the network.

In FIG. 17 a time-frequency format example of a time-division duplex communication system is shown.

FIG. 18 shows an active tone format of a basic DMT modem.

In FIG. 19 a transmit/receive calibration method is shown. There are two separate modes for system calibration and compensation. SCSS cal signal injected into a receiver at cal switch, measures the receive path dispersion. SCSS cal signal routed through a transmit modulator to the output receiver through transfer switch measures combined transmit and receive path dispersion. Transmit path is derived from combined receive and transmit cal data. Compensation is performed in DSP back-end by transmitting and processing SCSS cal waveform.

FIG. 20 diagrams an integrated single-antenna T/R and DMT modem (DMT based SCMA).

FIG. 21 is a diagram of a general example single-link code-gated cross-SCORE spreading operation. It is a preferred mode for single-link processing. It allows the use of a cross-SCORE algorithm with the fastest convergence time (lowest TBP). It is unaffected by timing and Doppler offset. It can reliably remove $K_{array}$ interferers within each cell. It can separate $K_{array}$ SCSS signals. Its deficiencies are that it cannot reliably separate >$K_{array}$ SCSS signals (code nulling not performed) and it misadjusts relative to max-SINR solution in highly frequency-variant environments.

FIG. 22 is an example of a single-link code-gated cross-SCORE despreading operation with $K_{spread}$ cell subsets.

FIG. 23 is an example of a single-link cross-SCORE algorithm with $N_{frame}$ packets/adapt frame. Despreader weights are computed from the dominant mode of multiset cross-SCORE eigenequation.

FIG. 24 is an example of single adapt frame autocorrelation statistics computation.

FIG. 25 is an example of cross-SCORE eigenequation with $K_{spread}$ cell subsets. Despreader weights are computed from the dominant mode of multiset cross-SCORE eigenequation.

FIG. 26 is an example of a code key generator with $K_{part}<K_{spread}$ cell subsets.

FIG. 27 is an example of an equivalent code key applicator with $K_{part}<K_{spread}$ cell subsets.

FIG. 28 is an example of cross-SCORE eigenequation with $K_{part}$ cell subsets. Despreader weights are computed from dominant mode of multiset cross-SCORE eigenequation.

FIG. 29 is an example of cross-SCORE eigenequation with two cell subsets. Despreader weights are computed from dominant mode of multiset cross-SCORE eigenequation.

FIG. 30 is an example of a multi-link code-gated cross-SCORE spreader. It is an improved mode for multi-link processing. It allows tailoring of cross-SCORE convergence time to SCSS interference conditions. It is unaffected by timing and Doppler offset. It can reliably remove $K_{array}$ interferers within each cell. It can separate $K_{array} \cdot K_{score}$ SCSS signals. Its deficiencies are that it cannot reliably separate >$K_{array} \cdot K_{score}$ SCSS signals (incomplete code nulling) and it misadjusts relative to max-SINR solution in highly frequency-variant environments.

FIG. 31 is an example of single-link code-gated auto-SCORE spreading operation with gating over frequency and two cell subsets. It is a preferred mode for high-mobility systems. It can separate $K_{array} \cdot K_{score}$ SCSS links. It can remove Katraynon-SCSS interferers within each cell. It is unaffected by timing and Doppler offset. Its deficiencies are it cannot separate >$K_{score}$ SCSS links and requires (simple) timing tracking as part of the despreading algorithm.

FIG. 32 is an example of single-link code-gated auto-SCORE despreading operation with gating over frequency and two cell subsets.

FIG. 33 is an example of auto-SCORE eigenequation with gating over frequency and two cell subsets.

FIG. 34 is an example of single-link code-gated auto-SCORE spreading with gating over time and a rate one--half of redundancy gate. It is the preferred mode for low-mobility systems. It can separate $K_{array} \cdot K_{spread}$ SCSS links. It can remove $K_{array}$ non-SCSS interferers within each cell. It is unaffected by timing and Doppler offset. Three dB SNR gain is provided at the despreader. Its deficiencies are that it cuts capacity in half and requires (simple) Doppler tracking as part of the despreading algorithm.

FIG. 35 is an example of single-link code-gated auto-SCORE despreading with gating over time and a rate one-half of redundancy gate.

In summary, adaptive antenna arrays can be used to increase network system capacity by beam-steering, null-steering, or combined beam-and-null steering. Such null steering or combined beam and null steering technologies are combined in the present invention with DMT/OFDM frequency channelizers outside of the channelizers use as SCSS spreaders/despreaders.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims are interpreted as covering all alterations and modifications as fall within the true spirit and scope of the invention.

What is claimed is:

1. A multiple access communication system, comprising:
   at least one radio transmitter for transmitting a plurality of radio frequency (RF) carriers;
   at least one radio receiver for receiving said at least one subset of at least two of said plurality of radio frequency carriers;
   at least one spreader connected to each of the transmitters for independently and redundantly modulating the amplitude and phase of at least two of said (RF) carriers with a first digital spreading gain and first data;
   at least one despreader connected to each of the receivers for independently demodulating the amplitude and phase of at least two of said (RF) carriers with said first digital spreading gain to recover said first data; and
   multiple access means connected to the transmitters, receivers, spreaders and despreaders for providing separate channels of communication by at least one of space-division multiple access (SDMA), frequency-division multiple access (FDMA) and code-division multiple access (CDMA).

2. The system of claim 1, wherein:

said SDMA further comprises an antenna array connected to said transmitters and receivers, and provides for selective data channel transmission and reception between pairs of transmitters and receivers according to their relative spatial positions.

3. The system of claim 1, wherein:

said FDMA further comprises a minimum number of radio frequency carriers to provide for at least two subsets of carriers for communicating additional data channels between pairs of transmitters and receivers according to matching subsets of said radio frequency carriers.

4. The system of claim 1, wherein:

said CDMA comprises including at least a second digital spreading gain and second data, and provides for communication of at least said first and second data between pairs of transmitters and receivers according to matching subsets of said digital spreading gains.

5. A radio transmitter system providing for spatial and frequency dispersion, comprising:

an antenna system having "n" positive-integer number of individual antennas spatially distributed in a group and providing for as many as "n" positive-integer number of spatially distributed communication channels;

a radio frequency amplifier bank having individual amplifiers connected to corresponding antennas of the antenna system wherein each amplifier has an adjustable gain to provide for a controlled steering of beams and nulls of radio frequency signal transmissions to said radially-distributed spatial communication channels;

a discrete multitone stacked carrier spread spectrum transmit modulator connected to the amplifier bank and providing for a frequency-dispersed plurality of communication channels;

a spreader having respective outputs connected to the modulator and a data input and providing for a spreading of data concurrently across all of said frequency-dispersed plurality of communication channels; and steering means connected to said radio frequency amplifier bank and providing for a selection of one of said "n" positive-integer number of radially-distributed spatial communication channels.

6. A radio receiver system providing for spatial and frequency dispersion, comprising:

an antenna system having "n" positive-integer number of individual antennas spatially distributed in a group and providing for as many as "n" positive-integer number of radially-distributed spatial communication channels;

a radio frequency amplifier bank having individual amplifiers connected to corresponding antennas of the antenna system and each amplifier having an adjustable gain which provides for a controlled steering of beams and nulls of radio frequency signal transmissions to said radially-distributed spatial communication channels;

a discrete multitone stacked carrier spread spectrum demodulator connected to the amplifier bank and providing for a frequency-dispersed plurality of communication channels;

a despreader having respective inputs connected to the demodulator and a data output and providing for a despreading of data included across all of said frequency-dispersed plurality of communication channels; and steering means connected to said radio frequency amplifier bank and providing for a selection of one of said "n" positive-integer number of radially-distributed spatial communication channels.

7. The system of claim 6, further comprising:

computational means for determining a radially-distributed spatial communication channel address of a target receiver.

8. A multiple-access method for stacked-carrier spread spectrum radio communication, comprising the steps of:

constructing at a transmitter a stacked-carrier spreading gain from the complex amplitude and phase gain of a complex sinusoid for each of a plurality of discrete frequency communication channels;

spreading at said transmitter an arbitrary narrow-band baseband pre-spread data with a vector multiplier and an inverse frequency communication channelizer;

simultaneously transmitting from said transmitter said data after spreading over said plurality of discrete frequency communication channels with said stacked-carrier spreading gain; and despreading said plurality of discrete frequency communication channels at a receiver with a vector inner product linear combiner and frequency communication channelizer, wherein said arbitrary narrow-band baseband pre-spread data is recovered with relative immunity to communication channel interference.

9. The method of claim 8, wherein:

said constructing is such that said frequency communication channels are non-contiguous and distributed within multiple bands.

10. The method of claim 9, wherein:

said simultaneously transmitting is such that said frequency communication channels overlap and include orthogonal frequency-division multiplex-like modulation formats.

11. The method of claim 10, wherein:

said simultaneously transmitting is such that said data is packetized, wherein baseband data is spread, transmitted, and despread in discrete packets in an orthogonal frequency-division multiplex-like-based frequency communication channelizer structure, packets may be overlapped, contiguous, or non-contiguous in time.

12. An interference cancellation method for stacked-carrier spread spectrum radio communication, comprising the steps of:

constructing at a transmitter a stacked-carrier spreading gain from the complex amplitude and phase gain of a complex sinusoid for each of a plurality of discrete frequency communication channels;

spreading at said transmitter an arbitrary narrow-band baseband pre-spread data with a vector multiplier and an inverse frequency communication channelizer;

simultaneously transmitting from said transmitter said data after spreading over said plurality of discrete frequency communication channels with said stacked-carrier spreading gain;

despreading said plurality of discrete frequency communication channels at a receiver with a vector inner product linear combiner and frequency communication channelizer, wherein said arbitrary narrow-band baseband pre-spread data is recovered with relative immunity to communication channel interference; and code nulling with interference cancellation means according to information obtained from the step of despreading.

13. An adaptive antenna array method for stacked-carrier spread spectrum radio communication, comprising the steps of:

constructing at a transmitter a stacked-carrier spreading gain from the complex amplitude and phase gain of a complex sinusoid for each of a plurality of discrete frequency communication channels;

spreading at said transmitter an arbitrary narrow-band baseband pre-spread data with a vector multiplier and an inverse frequency communication channelizer;

simultaneously transmitting from said transmitter said data after spreading over said plurality of discrete frequency communication channels with said stacked-carrier spreading gain;

despreading said plurality of discrete frequency communication channels at a receiver with a vector inner product linear combiner and frequency communication channelizer, wherein said arbitrary narrow-band baseband pre-spread data is recovered with relative immunity to communication channel interference; and adjusting the gains of several amplifiers connected to an antenna array according to said despread baseband data.

14. A time-division duplex method for stacked-carrier spread spectrum radio communication, comprising the steps of:

dividing time into time slots reserved for transmitting a first plurality of discrete frequency communication channels to a distant receiver and for receiving a second plurality of discrete frequency communication channels from a distant transmitter;

constructing at a proximal transmitter a stacked-carrier spreading gain from the complex amplitude and phase gain of a complex sinusoid for at least one of said first or second plurality of discrete frequency communication channels;

spreading at said proximal transmitter an arbitrary narrow-band baseband pre-spread data with a vector multiplier and an inverse frequency communication channelizer;

simultaneously transmitting from said proximal transmitter said data after spreading over said first plurality of discrete frequency communication channels with said stacked-carrier spreading gain;

despreading said second plurality of discrete frequency communication channels at a proximal receiver with a vector inner product linear combiner and frequency communication channelizer, wherein said arbitrary narrow-band baseband pre-spread data is recovered with relative immunity to communication channel interference; and controlling the step of dividing time with precision time information obtained from a timing signal source that is available to both said distant and proximal transmitters and both said distant and proximal receivers.

15. The method of claim 14, wherein:

the step of controlling includes receiving system time information from orbiting navigation satellites.

16. A radio transmitter system, comprising:

a multi-tone transmitter array for multi-spectral carrier signal transmission according to a spectral weight calculation by a computer that discriminates between a first plurality of individual remote receivers; and an antenna array connected to the transmitter array and that provides for spatial adjustments of the transmitted power of said multi-spectral carrier signal transmission according to a spatial weight calculation by a computer that discriminates between a second plurality individual remote receivers.

17. A radio receiver system, comprising:

a multi-tone receiver array for multi-spectral carrier signal reception according to a spectral weight calculation by a computer that discriminates between a first plurality of individual remote transmitters; and an antenna array connected to the receiver array and that provides for spatial adjustments of the received power of said multi-spectral carrier signal reception according to a spatial weight calculation by a computer that discriminates between a second plurality individual remote transmitters.

18. A radio communication system, comprising:

a multi-tone transmitter array for multi-spectral carrier signal transmission according to a spectral weight calculation by a computer that discriminates between a first plurality of individual remote receivers;

a first antenna array connected to the transmitter array and that provides for spatial adjustments of the transmitted power of said multi-spectral carrier signal transmission according to a spatial weight calculation by a computer that discriminates between a second plurality individual remote receivers;

a multi-tone receiver array for multi-spectral carrier signal reception according to a spectral weight calculation by a computer that discriminates between a first plurality of individual remote transmitters; and a second antenna array connected to the receiver array and that provides for spatial adjustments of the received power of said multi-spectral carrier signal reception according to a spatial weight calculation by a computer that discriminates between a second plurality individual remote transmitters.

19. The system of claim 18, further comprising:

a computer connected to the transmitter array and first antenna array that provides for a single omnibus calculation of both the spectral weight and spatial weights.

20. The system of claim 18, further comprising:

a computer connected to the receiver array and second antenna array that provides for a single omnibus calculation of both the spectral weight and spatial weights.

21. The system of claim 18, further comprising:

a computer connected to the transmitter array, the receiver array, the first antenna array, and the second antenna array and that provides for a single omnibus calculation of both the spectral weight and spatial weights for use by the receiver array and second antenna array that repeats both the spectral weight and spatial weights for use by the transmitter array and first antenna array;

wherein a particular spatial and spectral characteristic of said first and second plurality individual remote transmitters is exploited to optimize a return transmission to said first and second plurality individual remote receivers.

22. A method of recovering a digital communication signal that was spread and modulated onto each of a plurality of stacked carrier signals using a distinct spreading gain for each of said plurality of stacked carrier signals, transmitted across a wireless medium, and received at a receiver as a plurality of received stacked carrier signals, comprising the steps of:

channelizing each of said received stacked carrier signals to identify a baseband signal for each of said received stacked carrier signals, said received stacked carrier signals having a channel bandwidth that is separable from said channel bandwidth of other of said plurality of received stacked carrier signals;

despreading by applying despread weights that are different than said spreading gains to each of said received baseband signals and combining said received baseband signals to obtain a baseband signal that compensates for interference and maximizes a signal to noise and interference ratio; and removing at least one of time distortion and frequency distortion that exists in said baseband signal to obtain a recovered digital communication signal that corresponds to said digital communicatior signal.

23. A method according to claim 22 wherein said step of despreading blindly despreads said plurality of received stacked carrier signals.

24. A method according to claim 23 wherein said blind despreading uses a dominant mode of a generalized eigenequation.

25. A method according to claim 23 wherein said blind despreading uses dominant modes of a generalized eigenequation.

26. A method according to claim 25 wherein said eigenequation is a code gated self coherence restoral eigenequation.

27. A method according to claim 24 wherein a maximum code gated self restoral eigenvalue of said generalized eigenequation is decremented by a predicted mean and scaled by a predicted standard deviation during said step of blind despreading.

28. A method according to claims 22 wherein said steps of channelizing, despreading, and removing are each repeatedly performed on each of a sequential plurality of received stacked carrier signals to obtain a recovered sequential plurality of related digital communication signals.

29. A method according to claim 28 wherein said sequential plurality of received stacked carrier signals are asynchronous.

30. A method according to claim 28 wherein each of said sequential plurality of received stacked carrier signals are received during associated time division duplex intervals and a network clock is used to determine said time division duplex intervals.

31. A method according to claim 30 wherein receive time duplex intervals are asymmetric with respect to transmit time duplex intervals.

32. A method according to claim 30 wherein receive time duplex intervals are symmetric with respect to transmit time duplex intervals.

33. A method according to claim 30 wherein said sequential plurality of received stacked carrier signals are received as a plurality of packets during a single time division duplex interval.

34. A method according to claim 30 wherein said sequential plurality of received stacked carrier signals are received as a single packet during a single time division duplex interval.

35. A method according to claim 30 wherein said network clock is derived from a universal time.

36. A method according to claim 30 wherein said network clock is derived from data within said digital communication signal.

37. A method according to claims 22 wherein second spreading gains for a second data communication signal transmitted as a second plurality of stacked carrier signals from said receiver are adaptively determined based upon said despread weights so that minimum radiation is directed at Interfering frequencies.

38. A method according to claim 37 wherein said second spreading gains are set proportional to conjugated despread weights so that a gain pattern of said second plurality of stacked carrier signals is substantially the same as the gain pattern of said plurality of stacked carrier signals.

39. A method according to claim 22 wherein a plurality of recovered digital communication signals are simultaneously recovered from a plurality of received stacked carrier signals, each of said plurality of digital communication signals having an associated distinct code key that is used during said step of despreading to discriminate each of said plurality of received stacked carrier signals.

40. A method according to claim 39 wherein each of said distinct code keys modulates only some of said plurality of received stacked carrier signals.

41. A method according to claim 40 wherein each of said distinct code keys modulates one of even and odd received stacked carrier signals from said plurality of received stacked carrier signals.

42. A method according to claim 22 wherein said digital communication signal is a plurality of symbols, and each of said symbols is modulated onto each of said plurality of stacked carrier signals at a different discrete tone.

43. A method according to claim 22 wherein said digital communication signal is a plurality of bits, and each of said bits is modulated onto each of said plurality of stacked carrier signals at a different discrete tone.

44. A method according to claim 22 wherein said time distortion is due to a doppler frequency offset.

45. A method according to claim 22 wherein said frequency distortion is due to time dispersion.

46. A method according to claim 22 wherein said frequency distortion is a propagation delay.

47. A method according to claim 22 wherein said step of removing removes both time distortion and frequency distortion.

48. A method according to claim 47 wherein said time distortion is due to a doppler frequency offset.

49. A method according to claim 47 wherein said frequency distortion is due to time dispersion.

50. A method according to claim 47 wherein said frequency distortion is a propagation delay.

51. A method according to claim 48 wherein said frequency distortion is a propagation delay.

52. A method according to claim 22 wherein said received stacked carrier signals contain a guard time interval to compensate for unknown propagation delay, and said method does not synchronize said received stacked carrier signals until said step of despreading is complete.

53. A method according to claim 22 wherein said received stacked carrier signals contain a guard frequency band to compensate for unknown doppler frequency offset, and said method does not synchronize said received stacked carrier signals until said step of despreading is complete.

54. A method of recovering a plurality of transmitted symbol that was spread using distinct spreading gains, said symbol being received at a receiver as a plurality of discrete multiple tones having substantial frequency diversity, said method of recovering comprising the steps of:

despreading each of said plurality of discrete multiple tones to obtain a plurality of despread multiple tones, each of said plurality of despread multiple tones corresponding to one of said plurality of symbols; and removing Doppler shift or time delay from said despread multiple tones to obtain a recovered plurality of symbols corresponding to said transmitted plurality of symbols.

55. A method according to claim 54 wherein said transmitted symbols were spread and modulated onto each of a plurality of stacked carrier signals using a distinct spreading gain for each of said plurality of stacked carrier signals, each of said plurality of stacked carrier signals having a channel bandwidth that is separable from said channel bandwidth of other of said plurality of stacked carrier signals.

56. A method according to claim 55 wherein said step of despreading blindly despreads said plurality of received stacked carrier signals.

57. A method according to claim 56 wherein said blind despreading uses a dominant mode of a generalized eigenequation.

58. A method according to claim 57 wherein a maximum code gated self restoral eigenvalue of said generalized eigenequation is decremented by a predicted mean and scaled by a predicted standard deviation during said step of blind despreading.

59. A method according to claim 56 wherein said blind despreading uses dominant modes of a generalized eigenequation.

60. A method according to claim 59 wherein said eigenequation is a code gated self coherence restoral eigenequation.

61. A method of spreading a digital communication signal comprising the steps of:

spectrally spreading said digital communication signal onto a plurality of stacked carrier signals to obtain a plurality of spectrally spread digital communication signals, each of said plurality of stacked carrier signals having a channel bandwidth that is separable from said channel bandwidth of other of said plurality of stacked carrier signals;

spatially spreading each of said plurality of spectrally spread digital communication signals to obtain a plurality of spatially and spectrally spread digital communication signals; and transmitting, from each antennae element of a multi-element antennae array, associated ones of said plurality of spatially and spectrally spread digital communication signals across a wireless medium to a receiver.

62. A method of digitally communicating comprising the steps of:

spreading, in a moving transmitter, digital information that was spread using distinct spreading gains onto each of a plurality of stacked carrier signals, each of said plurality of stacked carrier signals having a channel bandwidth that is separable from said channel bandwidth of other of said plurality of stacked carrier signals;

transmitting each of said stacked carrier signals across a wireless medium from said moving transmitter to a receiver;

receiving, at said receiver, said transmitted plurality of stacked carrier signals as received stacked carrier signals;

channelizing each of said received stacked carrier signals to identify a baseband signal for each of said received stacked carrier signals;

despreading by applying despread weights that are different than said spreading gains to each of said received baseband signal and combining said received baseband signals to obtain a baseband signal that compensates for interference and maximizes a signal to noise and interference ratio; and processing said baseband signal to obtain recovered digital information that corresponds to said transmitted digital information.

63. A method according to claim 62 wherein said processing step removes Doppler shift or time delay from said baseband signal.

64. A method according to claim 63 wherein frequency division multiple access is employed to differentiate different ones of said transmitters.

65. A method according to claim 62 wherein:

a plurality of moving transmitters each perform said step of spreading and transmitting said digital information, each moving transmitter spreading said digital information using a random, distinct, non-orthogonal spreading gain to spread said digital information onto each of said plurality of stacked carrier signals;

said step of receiving said transmitted plurality of stacked carrier signals receives said transmitted stacked carrier signals from each of said transmitters at a receiver;

said step of channelizing channelizes each of said received stacked carrier signals;

said despreading step combines each of said separately channelized plurality of received stacked carrier signals to obtain, for each of said plurality of transmitters, one baseband signal corresponding to said digital information transmitted by one of said plurality of transmitters; and said step of processing processes each of said baseband signals to obtain said recovered digital communication signal that corresponds to said transmitted digital communication signal for each of said moving transmitters.

66. A method according to claim 65 wherein said processing step removes Doppler shift or time delay that exists in each of said baseband signals.

67. A method according to claim 66 wherein said plurality of moving transmitters are geographically separated and each present a distinct transmission path to said receiver.

68. A method according to claim 66 wherein a multi-element antenna array is used at said receiver, different ones of said elements are used to differentiate zones, and space division multiple access is employed to differentiate different ones of said transmitters.

69. A method according to claim 66 wherein code division multiple access is employed to differentiate different ones of said transmitters.

70. A method according to claim 69 further including the step of modulating a distinct code key onto some of said plurality of stacked carrier signals associated with each of said transmitters.

71. A method of digitally communicating comprising the steps of:

spreading digital information, at a first station having a multi-element antenna array, using distinct spreading gains, onto each of a plurality of stacked carrier signals, each of said plurality of stacked carrier signals having a channel bandwidth that is separable from said channel bandwidth of other of said plurality of stacked carrier signals and each of said antenna elements being used to transmit different ones of said stacked carrier signals;

transmitting each of said stacked carrier signals across a wireless medium from said first station to a second station;

receiving, at said second station using a second multi-element antenna array, said transmitted plurality of stacked carrier signals as received stacked carrier signals, each of said second antenna elements being used to receive different ones of said received stacked carrier signals;

channelizing each of said received stacked carrier signals to identify a baseband signal for each of said received stacked carrier signals; and despreading by applying despread weights that are different than said spreading gains to each of said received baseband signal and combining said received baseband signals to obtain a baseband signal that compensates for interference and maximizes a signal to noise and interference ratio.

72. A method according to claim 71 wherein second spreading gains for a second data communication signal transmitted as a second plurality of stacked carrier signals from said multi-element antennae array of said second station are adaptively determined based upon said despread weights so that minimum radiation is directed at interfering frequencies.

73. A method according to claim 72 wherein said second spreading gains are set proportional to conjugated despread weights so that a gain pattern of said second plurality of stacked carrier signals is substantially the same as the gain pattern of said plurality of stacked carrier signals.

74. A method according to claim 71 wherein second spreacing gains for a second data communication signal transmitted from said multi-element antennae array of said second station are adaptively determined so that maximum radiation is directed to an intended station.

75. A method according to claim 74 wherein said second spreading gains are adaptively determined using a combined spatial and spectral steering vector.

76. A method according to claim 71 wherein each of said distinct spreading gains associated with each of said plurality of stacked carrier signals is linearly independent and non-orthogonal.

77. A method of digitally communicating comprising the steps of:

spreading, at a first station, digital information onto each of a plurality of stacked carrier signals using a distinct spreading gain for each stacked carrier signal, each of said plurality of stacked carrier signals having a channel bandwidth that is separable from said channel bandwidth of other of said plurality of stacked carrier signals;

transmitting each of said stacked carrier signals across a wireless medium from said first station to a second station;

receiving, at said second station using a multi-element antenna array, said transmitted plurality of stacked carrier signals as received stacked carrier signals;

channelizing on each element of said array each of said received stacked carrier signals to identify a baseband signal for each of said received stacked carrier signals; and despreading by applying despread weights that are different than said spreading gains to each of said received baseband signal and combining said received baseband signals to obtain a baseband signal that compensates for interference and maximizes a signal to noise and interference ratio, said despreading step using a linear combiner dimensionality which is composed of spectral dimensions and spatial dimensions.

78. A method according to claim 77 wherein second spreading gains for a second data communication signal transmitted as a second plurality of stacked carrier signals from said multi-element antennae array of said second station are adaptively determined based upon said despread weights so that minimum radiation is directed at interfering frequencies.

79. A method according to claim 78 wherein said second spreading gains are set proportional to conjugated despread weights so that a gain pattern of said second plurality of stacked carrier signals is substantially the same as the gain pattern of said plurality of stacked carrier signals.

80. A method according to claim 77 wherein second spreading gains for a second data communication signal transmitted from said multi-element antennae array of said second station are adaptively determined so that maximum radiation is directed to an intended station.

81. A method according to claim 80 wherein said second spreading gains are adaptively determined using a combined spatial and spectral steering vector.

82. A method according to claim 77 wherein said spatial and spectral dimensions is variable for a plurality of different ones of said first stations.

83. A method according to claim 77 wherein each of said distinct spreading gains associated with each of said plurality of stacked carrier signals is linearly independent and non-orthogonal.

84. A method of despreading a digital communication signal received at a receiver from across a wireless medium comprising the steps of:

receiving, at each antennae element of a multi-element antennae array, a plurality of stacked carrier signals, each of said plurality of stacked carrier signals having a channel bandwidth that is separable from said channel bandwidth of other of said plurality of stacked carrier signals;

spatially despreading said plurality of stacked carrier signals to obtain spatially despread digital communication signals; and spectrally despreading each of said plurality of spatially despread digital communication signals to obtain a spatially and spectrally despread digital communication signal.

* * * * *